United States Patent
Paulus et al.

(10) Patent No.: US 7,228,109 B2
(45) Date of Patent: Jun. 5, 2007

(54) DC OFFSET REDUCTION IN RADIO-FREQUENCY APPARATUS AND ASSOCIATED METHODS

(75) Inventors: Tod Paulus, Austin, TX (US); Donald A. Kerth, Austin, TX (US); Richard T. Behrens, Lafayette, CO (US); Jeffrey W. Scott, Austin, TX (US); G. Diwakar Vishakhadatta, Austin, TX (US); G. Tyson Tuttle, Austin, TX (US); Vishnu S. Srinivasan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 378 days.

(21) Appl. No.: 10/074,676

(22) Filed: Feb. 12, 2002

(65) Prior Publication Data

US 2003/0063690 A1 Apr. 3, 2003

Related U.S. Application Data

(63) Continuation-in-part of application No. 09/821,342, filed on Mar. 29, 2001, now Pat. No. 6,804,497.

(60) Provisional application No. 60/333,704, filed on Nov. 27, 2001, provisional application No. 60/273,119, filed on Mar. 2, 2001, provisional application No. 60/261,506, filed on Jan. 12, 2001.

(51) Int. Cl.
*H04B 1/40* (2006.01)

(52) U.S. Cl. .................. 455/74; 455/552.1; 455/236.1; 455/88

(58) Field of Classification Search .................. 455/88, 455/74, 552.1, 86, 78, 87, 553.1, 556.1, 137, 455/139, 234.2, 187.1, 189.1, 190.1, 164.1, 455/255, 239.1, 76, 550.1, 131, 230, 234.1, 455/236.1, 251.1, 333, 334, 260, 208; 375/334, 375/316, 322, 259

See application file for complete search history.

(56) References Cited

U.S. PATENT DOCUMENTS

| 4,070,632 A | 1/1978 | Tuttle |
| 4,236,252 A | 11/1980 | Kominami et al. |
| 4,468,790 A | 8/1984 | Hofelt |
| 4,562,591 A | 12/1985 | Stikvoort |
| 4,584,659 A | 4/1986 | Stikvoort |
| 4,604,720 A | 8/1986 | Stikvoort |
| 4,623,926 A | 11/1986 | Sakamoto |
| 4,627,021 A | 12/1986 | Persoon et al. |

(Continued)

*Primary Examiner*—Edward F. Urban
*Assistant Examiner*—John J. Lee
(74) *Attorney, Agent, or Firm*—Law Offices of Maximilian R. Peterson

(57) ABSTRACT

A radio-frequency receiver circuitry includes a down-converter circuitry, an analog-to-digital converter circuitry, and a DC offset reduction circuitry. The down-converter circuitry accepts a received radio-frequency signal and processes the radio-frequency signal to provide an in-phase down-converted signal and a quadrature down-converted signal to the analog-to-digital converter circuitry. The analog-to-digital converter circuitry converts the in-phase and quadrature down-converted signals to an in-phase digital output signal and a quadrature digital output signal, respectively. The DC offset reduction circuitry couples to the analog-to-digital converter circuitry, and tends to reduce a DC offset transmitted to the in-phase and quadrature digital output signals.

40 Claims, 29 Drawing Sheets

U.S. PATENT DOCUMENTS

| | | |
|---|---|---|
| 4,680,588 A | 7/1987 | Cantwell |
| 4,692,737 A | 9/1987 | Stikvoort et al. |
| 4,713,563 A | 12/1987 | Marshall et al. |
| 4,797,845 A | 1/1989 | Stikvoort |
| 4,857,928 A | 8/1989 | Gailus et al. |
| 4,912,729 A | 3/1990 | Van Rens et al. |
| 4,989,074 A | 1/1991 | Matsumoto |
| 5,050,192 A | 9/1991 | Nawata |
| 5,083,304 A | 1/1992 | Cahill |
| 5,124,705 A | 6/1992 | Voorman |
| 5,142,695 A | 8/1992 | Roberts et al. |
| 5,157,343 A | 10/1992 | Voorman |
| 5,194,826 A | 3/1993 | Huusko |
| 5,235,410 A | 8/1993 | Hurley |
| 5,241,310 A | 8/1993 | Tiemann |
| 5,243,345 A | 9/1993 | Naus et al. |
| 5,267,272 A | 11/1993 | Cai et al. |
| 5,283,578 A | 2/1994 | Ribner et al. |
| 5,341,135 A | 8/1994 | Pearce |
| 5,345,406 A | 9/1994 | Williams |
| 5,430,890 A | 7/1995 | Vogt et al. |
| 5,442,353 A | 8/1995 | Jackson |
| 5,451,948 A | 9/1995 | Jekel |
| 5,469,475 A | 11/1995 | Voorman |
| 5,500,645 A | 3/1996 | Ribner et al. |
| 5,557,642 A | 9/1996 | Williams |
| 5,712,628 A * | 1/1998 | Phillips et al. ............... 455/517 |
| 5,740,524 A | 4/1998 | Pace et al. |
| 5,742,189 A | 4/1998 | Yoshida et al. |
| 5,758,276 A | 5/1998 | Shirakawa et al. |
| 5,764,171 A | 6/1998 | Stikvoort |
| 5,828,955 A | 10/1998 | Lipowski et al. |
| 5,859,878 A | 1/1999 | Phillips et al. |
| 5,862,465 A | 1/1999 | Ou |
| 5,973,601 A | 10/1999 | Campana |
| 6,002,925 A | 12/1999 | Vu et al. |
| 6,035,186 A | 3/2000 | Moore et al. |
| 6,075,979 A | 6/2000 | Holtvoeth et al. |
| 6,148,048 A | 11/2000 | Kerth et al. |
| 6,167,245 A | 12/2000 | Welland |
| 6,321,073 B1 * | 11/2001 | Luz et al. ................ 455/239.1 |
| 6,323,735 B1 | 11/2001 | Welland et al. |
| 6,324,231 B1 * | 11/2001 | Huang ........................ 375/346 |
| 6,343,207 B1 | 1/2002 | Hessel et al. |
| 6,389,078 B1 * | 5/2002 | Hessel et al. ............... 375/259 |
| 6,539,066 B1 | 3/2003 | Heinen |

\* cited by examiner

DC OFFSET REDUCTION IN RADIO-FREQUENCY APPARATUS AND ASSOCIATED METHODS

CROSS-REFERENCE TO RELATED APPLICATIONS

This patent application is a continuation-in-part of U.S. patent application Ser. No. 09/821,342, titled "Partitioned Radio-Frequency Apparatus and Associated Methods," and filed on Mar. 29, 2001 now U.S. Pat. No. 6,804,497. This patent application claims priority to: Provisional U.S. Patent Application Ser. No. 60/261,506, filed on Jan. 12, 2001; Provisional U.S. Patent Application Ser. No. 60/273,119, titled "Partitioned RF Apparatus with Digital Interface and Associated Methods," and filed on Mar. 2, 2001; and Provisional U.S. Patent Application Ser. No. 60/333,704, filed on Nov. 27, 2001.

Furthermore, this patent application incorporates by reference the following patent documents: U.S. patent application Ser. No. 10/075,122, titled "Digital Architecture for Radio-Frequency Apparatus and Associated Methods"; and U.S. patent application Ser. No. 10/075,099, titled "Notch Filter for DC Offset Reduction in Radio-Frequency Apparatus and Associated Methods."

TECHNICAL FIELD OF THE INVENTION

This invention relates to radio-frequency (RF) receivers and transceivers. More particularly, the invention concerns DC offset reduction circuitry and associated methods in the RF receiver or transceiver circuitry.

BACKGROUND

The proliferation and popularity of mobile radio and telephony applications has led to market demand for communication systems with low cost, low power, and small form-factor radio-frequency (RF) transceivers. As a result, recent research has focused on providing monolithic transceivers using low-cost complementary metal-oxide semiconductor (CMOS) technology. One aspect of research efforts has focused on providing an RF transceiver within a single integrated circuit (IC). The integration of transceiver circuits is not a trivial problem, as it must take into account the requirements of the transceiver's circuitry and the communication standards governing the transceiver's operation. From the perspective of the transceiver's circuitry, RF transceivers typically include sensitive components susceptible to noise and interference with one another and with external sources. Integrating the transceiver's circuitry into one integrated circuit may exacerbate interference among the various blocks of the transceiver's circuitry. Moreover, communication standards governing RF transceiver operation outline a set of requirements for noise, inter-modulation, blocking performance, output power, and spectral emission of the transceiver.

Unfortunately, no technique for addressing all of the above issues in high-performance RF receivers or transceivers, for example, RF transceivers used in cellular and telephony applications, has been developed. A need therefore exists for techniques of partitioning and integrating RF receivers or transceivers that would provide low-cost, low form-factor RF transceivers for high-performance applications, for example, in cellular handsets.

A further aspect of RF receivers and transceivers relates to providing high-performance signal processing functions in an integrated form. RF receivers and transceivers typically employ analog front-end circuitry. Analog circuitry, by its nature, is more susceptible to non-ideal circuit behavior, such as component mismatches, parasitic effects, second-order effects, and the like. As a result, front-end analog circuitry produces DC offsets that impact the processing of the desired signal. A further need therefore exists for RF receivers and transceivers that reduce the DC offset or compensate for it.

SUMMARY OF THE INVENTION

This invention relates to DC offset reduction in RF receiver or transceiver circuitries. This invention solves the problems that arise from DC offsets within RF apparatus, which may impact the processing of the desired or in-band signal.

One aspect of the invention concerns apparatus for reducing DC offsets in RF apparatus. In one embodiment, an RF receiver circuitry includes a down-converter circuitry, an analog-to-digital converter (ADC) circuitry, and a DC offset reduction circuitry. The down-converter circuitry accepts a received radio-frequency signal and processes the received radio-frequency signal to provide an in-phase down-converted signal and a quadrature down-converted signal. The ADC circuitry receives the in-phase and quadrature down-converted signals and provides an in-phase digital output signal and a quadrature digital output signal. The DC offset reduction circuitry couples to the analog-to-digital converter circuitry and tends to reduce a DC offset transmitted to the in-phase and quadrature digital output signals.

DESCRIPTION OF THE DRAWINGS

The appended drawings illustrate only exemplary embodiments of the invention and therefore do not limit its scope. The disclosed inventive concepts lend themselves to other equally effective embodiments. In the drawings, the same numerals used in more than one drawing denote the same, similar, or equivalent functionality, components, or blocks.

DETAILED DESCRIPTION OF THE INVENTION

This invention in part contemplates partitioning RF apparatus so as to provide highly integrated, high-performance, low-cost, and low form-factor RF solutions. One may use RF apparatus according to the invention in high-performance communication systems. More particularly, the invention in part relates to partitioning RF receiver or transceiver circuitry in a way that minimizes, reduces, or overcomes interference effects among the various blocks of the RF receiver or transceiver, while simultaneously satisfying the requirements of the standards that govern RF receiver or transceiver performance. Those standards include the Global System for Mobile (GSM) communication, Personal Communication Services (PCS), Digital Cellular System (DCS), Enhanced Data for GSM Evolution (EDGE), and General Packet Radio Services (GPRS). RF receiver or transceiver circuitry partitioned according to the invention therefore overcomes interference effects that would be present in highly integrated RF receivers or transceivers while meeting the requirements of the governing standards at low cost and with a low form-factor. The description of the invention refers to circuit partition and circuit block interchangeably.

Figure 1:
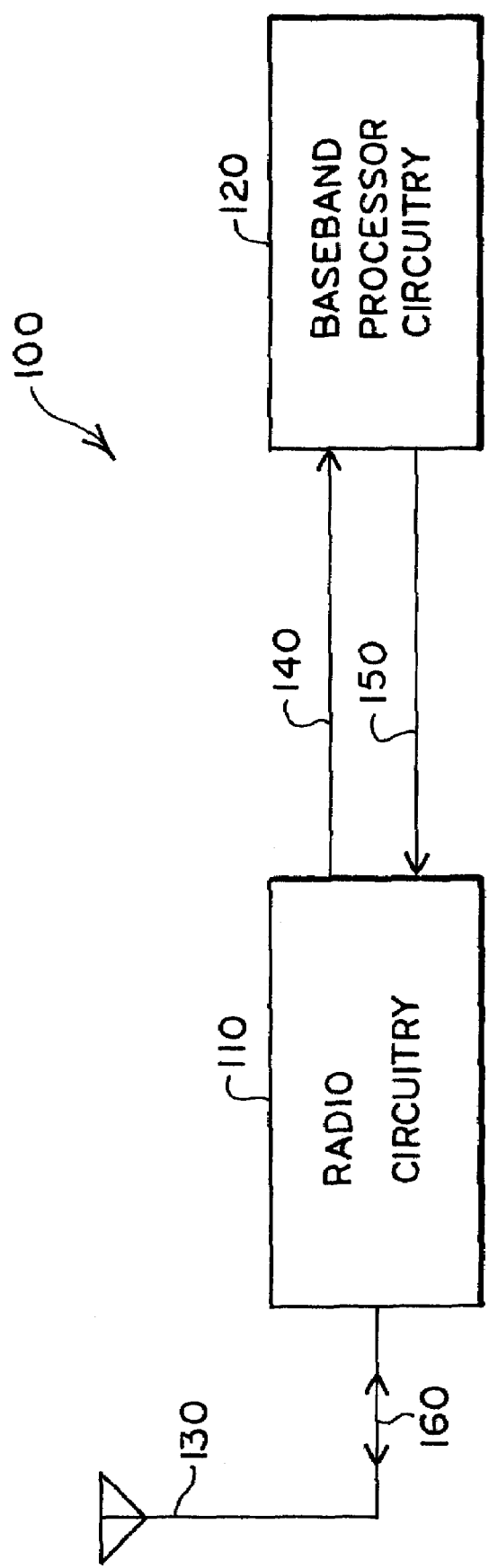
FIG. 1 illustrates the block diagram of an RF transceiver that includes radio circuitry that operates in conjunction with a baseband processor circuitry.

FIG. 1 shows the general block diagram of an RF transceiver circuitry 100 according to the invention. The RF transceiver circuitry 100 includes radio circuitry 110 that couples to an antenna 130 via a bi-directional signal path 160. The radio circuitry 110 provides an RF transmit signal to the antenna 130 via the bidirectional signal path 160 when the transceiver is in transmit mode. When in the receive mode, the radio circuitry 110 receives an RF signal from the antenna 130 via the bi-directional signal path 160.

The radio circuitry 110 also couples to a baseband processor circuitry 120. The baseband processor circuitry 120 may comprise a digital-signal processor (DSP). Alternatively, or in addition to the DSP, the baseband processor circuitry 120 may comprise other types of signal processor, as persons skilled in the art understand. The radio circuitry 110 processes the RF signals received from the antenna 130 and provides receive signals 140 to the baseband processor circuitry 120. In addition, the radio circuitry 110 accepts transmit input signals 150 from the baseband processor 120 and provides the RF transmit signals to the antenna 130.

Figure 2A:
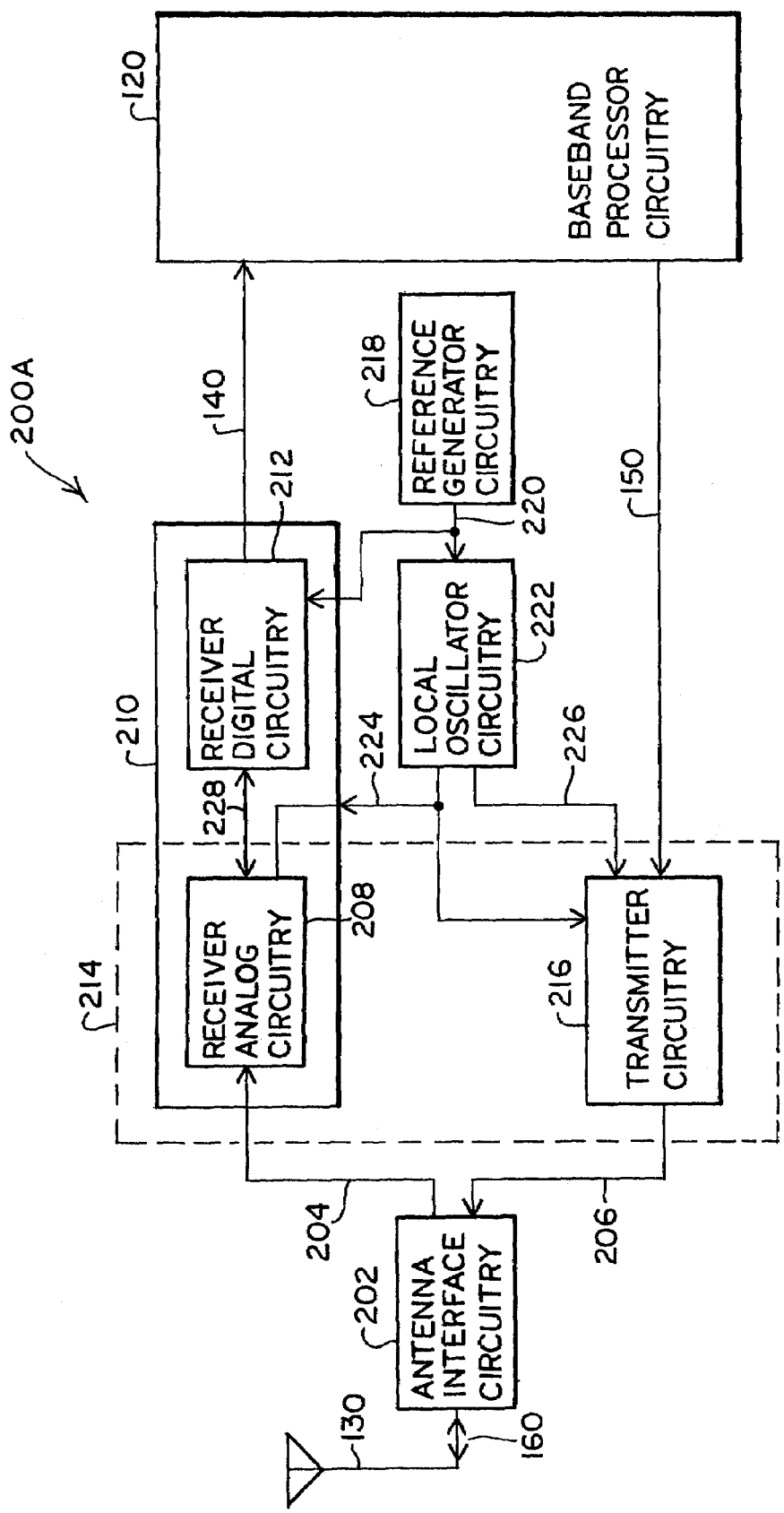
FIG. 2A shows RF transceiver circuitry partitioned according to the invention.

FIGS. 2A–2D show various embodiments of RF transceiver circuitry partitioned according to the invention. FIG. 3 and its accompanying description below make clear the considerations that lead to the partitioning of the RF transceiver circuitry as shown in FIGS. 2A–2D. FIG. 2A illustrates an embodiment 200A of an RF transceiver circuitry partitioned according to the invention. In addition to the elements described in connection with FIG. 1, the RF transceiver 200A includes antenna interface circuitry 202, receiver circuitry 210, transmitter circuitry 216, reference generator circuitry 218, and local oscillator circuitry 222.

The reference generator circuitry 218 produces a reference signal 220 and provides that signal to the local oscillator circuitry 222 and to receiver digital circuitry 212. The reference signal 220 preferably comprises a clock signal, although it may include other signals, as desired. The local oscillator circuitry 222 produces an RF local oscillator signal 224, which it provides to receiver analog circuitry 208 and to the transmitter circuitry 216. The local oscillator circuitry 222 also produces a transmitter intermediate-frequency (IF) local oscillator signal 226 and provides that signal to the transmitter circuitry 216. Note that, in RF transceivers according to the invention, the receiver analog circuitry 208 generally comprises mostly analog circuitry in addition to some digital or mixed-mode circuitry, for example, analog-to-digital converter (ADC) circuitry and circuitry to provide an interface between the receiver analog circuitry and the receiver digital circuitry, as described below.

The antenna interface circuitry 202 facilitates communication between the antenna 130 and the rest of the RF transceiver. Although not shown explicitly, the antenna interface circuitry 202 may include a transmit/receive mode switch, RF filters, and other transceiver front-end circuitry, as persons skilled in the art understand. In the receive mode, the antenna interface circuitry 202 provides RF receive signals 204 to the receiver analog circuitry 208. The receiver analog circuitry 208 uses the RF local oscillator signal 224 to process (e.g., down-convert) the RF receive signals 204 and produce a processed analog signal. The receiver analog circuitry 208 converts the processed analog signal to digital format and supplies the resulting digital receive signals 228 to the receiver digital circuitry 212. The receiver digital circuitry 212 further processes the digital receive signals 228 and provides the resulting receive signals 140 to the baseband processor circuitry 120.

In the transmit mode, the baseband processor circuitry 120 provides transmit input signals 150 to the transmitter circuitry 216. The transmitter circuitry 216 uses the RF local oscillator signal 224 and the transmitter IF local oscillator signal 226 to process the transmit input signals 150 and to provide the resulting transmit RF signal 206 to the antenna interface circuitry 202. The antenna interface circuitry 202 may process the transmit RF signal further, as desired, and provide the resulting signal to the antenna 130 for propagation into a transmission medium.

The embodiment 200A in FIG. 2A comprises a first circuit partition, or circuit block, 214 that includes the receiver analog circuitry 208 and the transmitter circuitry 216. The embodiment 200A also includes a second circuit partition, or circuit block, that includes the receiver digital circuitry 212. The embodiment 200A further includes a third circuit partition, or circuit block, that comprises the local oscillator circuitry 222. The first circuit partition 214, the second circuit partition 212, and the third circuit partition 222 are partitioned from one another so that interference effects among the circuit partitions tend to be reduced. The first, second, and third circuit partitions preferably each reside within an integrated circuit device. In other words, preferably the receiver analog circuitry 208 and the transmitter circuitry 216 reside within an integrated circuit device, the receiver digital circuitry 212 resides within another integrated circuit device, and the local oscillator circuitry 222 resides within a third integrated circuit device.

Figure 2B:
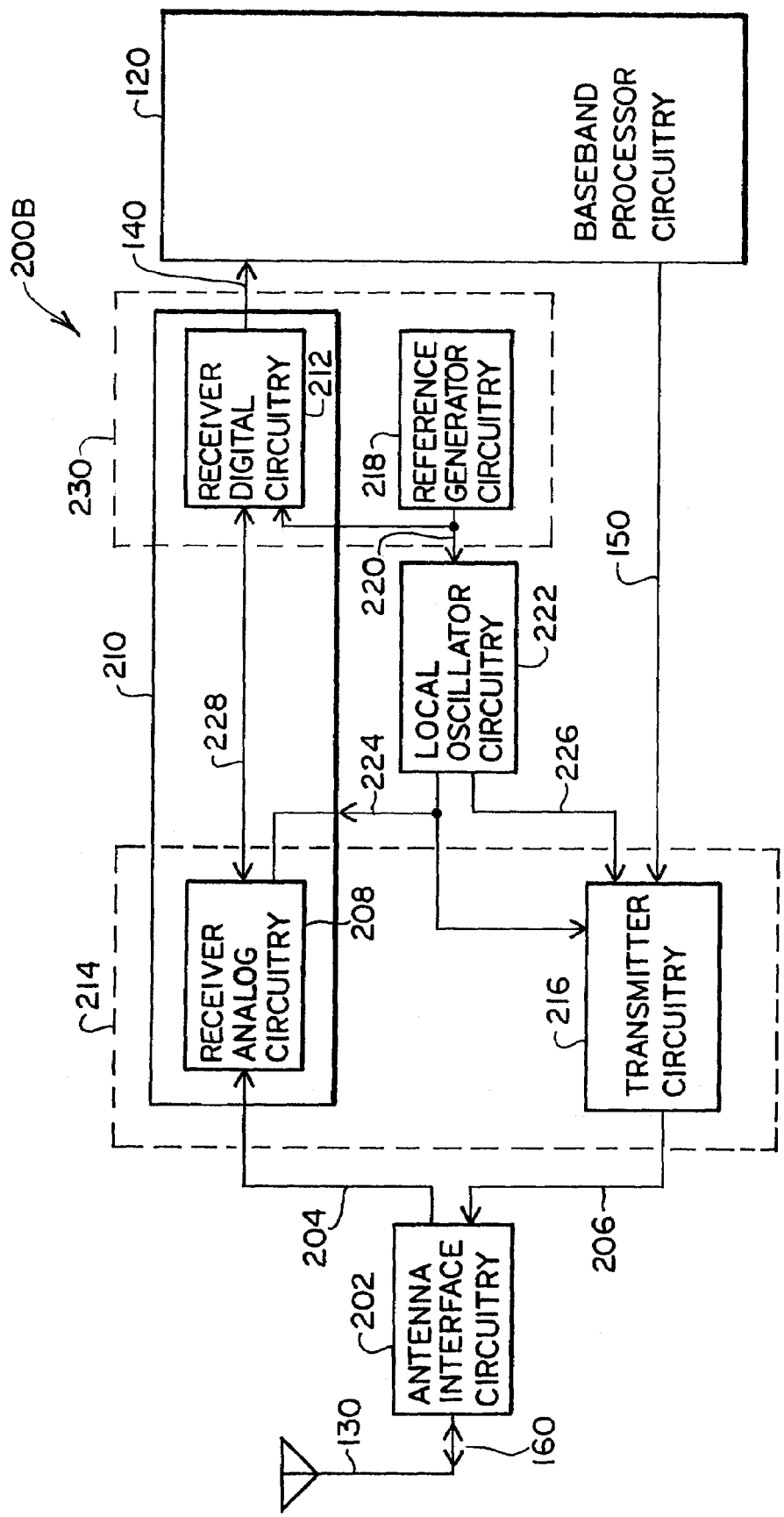
FIG. 2B depicts another embodiment of RF transceiver circuitry partitioned according to the invention, in which the reference generator circuitry resides within the same circuit partition, or circuit block, as does the receiver digital circuitry.
Figure 3:
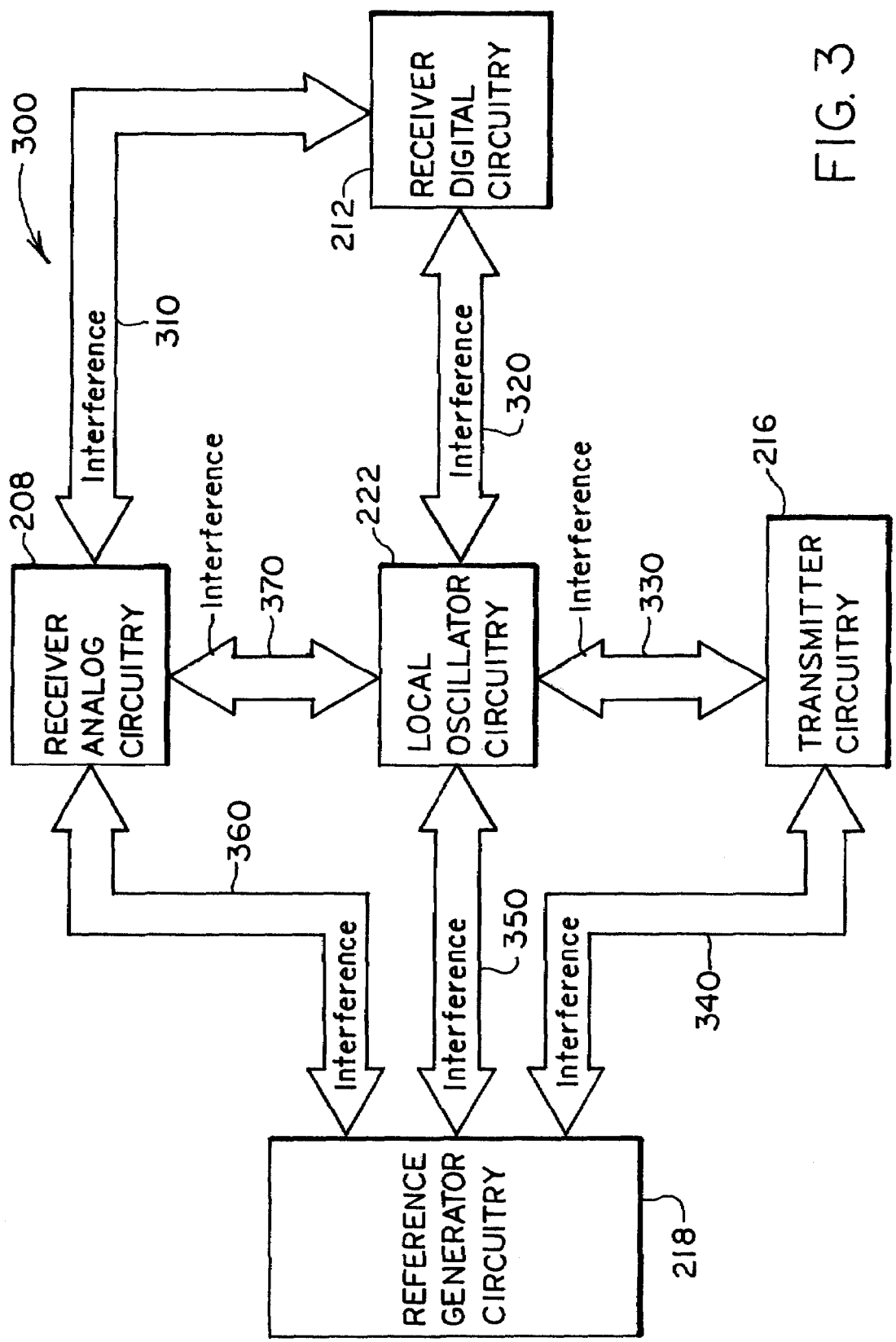
FIG. 3 illustrates interference mechanisms among the various blocks of an RF transceiver, which the embodiments of the invention in FIGS. 2A–2D, depicting RF transceivers partitioned according to the invention, seek to overcome, reduce, or minimize.

FIG. 2B shows an embodiment 200B of an RF transceiver circuitry partitioned according to the invention. The embodiment 200B has the same circuit topology as that of embodiment 200A in FIG. 2A. The partitioning of embodiment 200B, however, differs from the partitioning of embodiment 200A. Like embodiment 200A, embodiment 200B has three circuit partitions, or circuit blocks. The first and the third circuit partitions in embodiment 200B are similar to the first and third circuit partitions in embodiment 200A. The second circuit partition 230 in embodiment 200B, however, includes the reference signal generator 218 in addition to the receiver digital circuitry 212. As in embodiment 200A, embodiment 200B is partitioned so that interference effects among the three circuit partitions tend to be reduced.

Figure 2C:
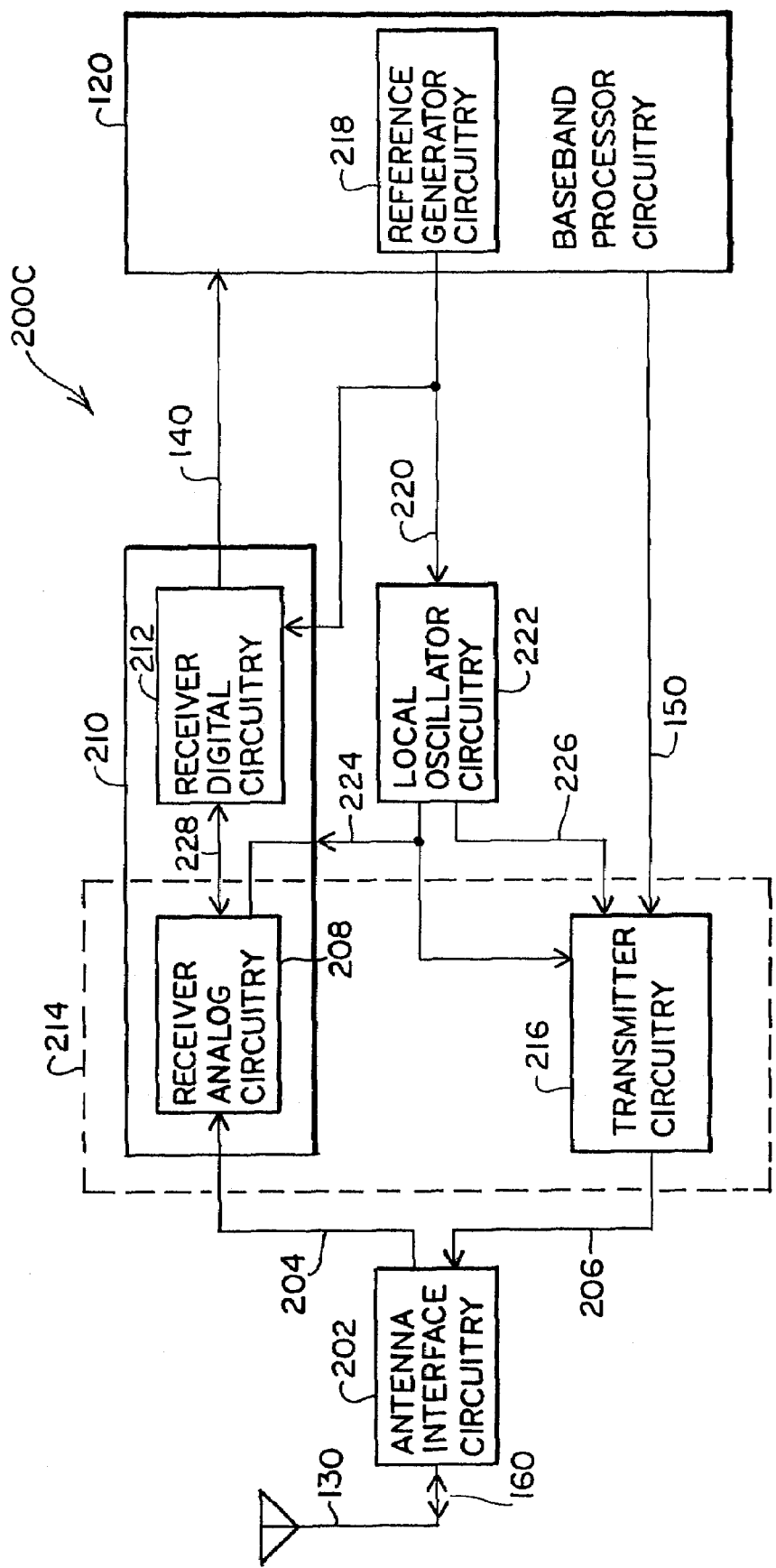
FIG. 2C illustrates yet another embodiment of RF transceiver circuitry partitioned according to invention, in which the reference generator circuitry resides within the baseband processor circuitry.

FIG. 2C illustrates an embodiment 200C, which constitutes a variation of embodiment 200A in FIG. 2A. Embodiment 200C shows that one may place the reference signal generator 218 within the baseband processor circuitry 120, as desired. Placing the reference signal generator 218 within the baseband processor circuitry 120 obviates the need for either discrete reference signal generator circuitry 218 or an additional integrated circuit or module that includes the reference signal generator 218. Embodiment 200C has the same partitioning as embodiment 200A, and operates in a similar manner.

Note that FIGS. 2A–2C show the receiver circuitry 210 as a block to facilitate the description of the embodiments shown in those figures. In other words, the block containing the receiver circuitry 210 in FIGS. 2A–2C constitutes a conceptual depiction of the receiver circuitry within the RF transceiver shown in FIGS. 2A–2C, not a circuit partition or circuit block.

Figure 2D:
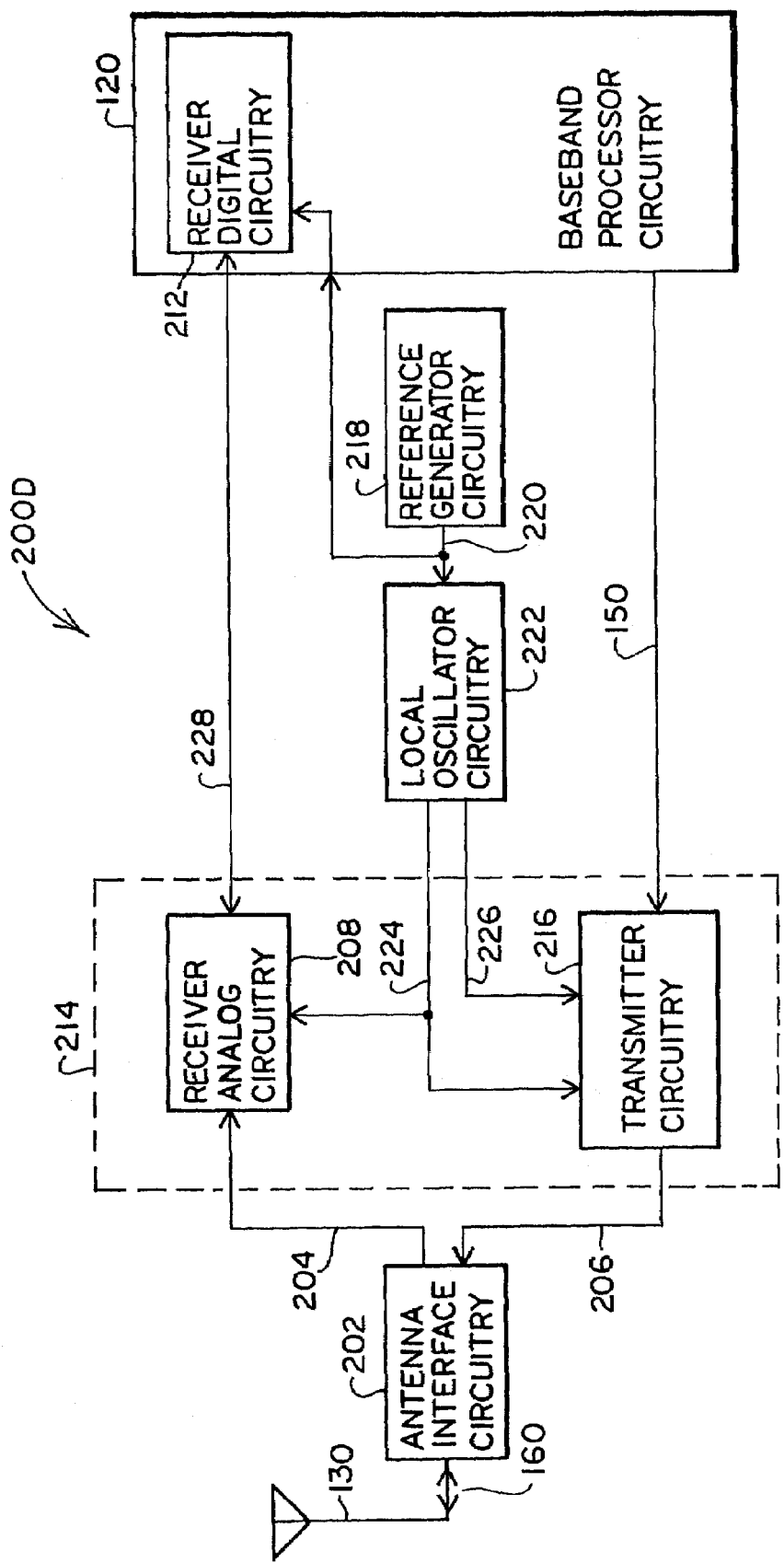
FIG. 2D shows another embodiment of RF transceiver circuitry partitioned according to the invention, in which the receiver digital circuitry resides within the baseband processor circuitry.

FIG. 2D shows an embodiment 200D of an RF transceiver partitioned according to the invention. The RF transceiver in FIG. 2D operates similarly to the transceiver shown in FIG. 2A. The embodiment 200D, however, accomplishes additional economy by including the receiver digital circuitry 212 within the baseband processor circuitry 120. As one alternative, one may integrate the entire receiver digital circuitry 212 on the same integrated circuit device that includes the baseband processor circuitry 120. Note that one may use software (or firmware), hardware, or a combination of software (or firmware) and hardware to realize the functions of the receiver digital circuitry 212 within the baseband processor circuitry 120, as persons skilled in the art who have the benefit of the description of the invention understand. Note also that, similar to the embodiment 200C in FIG. 2C, the baseband processor circuitry 120 in embodiment 200D may also include the reference signal generator 218, as desired.

The partitioning of embodiment 200D involves two circuit partitions, or circuit blocks. The first circuit partition 214 includes the receiver analog circuitry 208 and the transmitter circuitry 216. The second circuit partition includes the local oscillator circuitry 222. The first and second circuit partitions are partitioned so that interference effects between them tend to be reduced.

FIG. 3 shows the mechanisms that may lead to interference among the various blocks or components in a typical RF transceiver, for example, the transceiver shown in FIG. 2A. Note that the paths with arrows in FIG. 3 represent interference mechanisms among the blocks within the transceiver, rather than desired signal paths. One interference mechanism results from the reference signal 220 (see FIGS. 2A–2D), which preferably comprises a clock signal. In the preferred embodiments, the reference generator circuitry produces a clock signal that may have a frequency of 13 MHz (GSM clock frequency) or 26 MHz. If the reference generator produces a 26 MHz clock signal, RF transceivers according to the invention preferably divide that signal by two to produce a 13 MHz master system clock. The clock signal typically includes voltage pulses that have many Fourier series harmonics. The Fourier series harmonics extend to many multiples of the clock signal frequency. Those harmonics may interfere with the receiver analog circuitry 208 (e.g., the low-noise amplifier, or LNA), the local oscillator circuitry 222 (e.g., the synthesizer circuitry), and the transmitter circuitry 216 (e.g., the transmitter's voltage-controlled oscillator, or VCO). FIG. 3 shows these sources of interference as interference mechanisms 360, 350, and 340.

The receiver digital circuitry 212 uses the output of the reference generator circuitry 218, which preferably comprises a clock signal. Interference mechanism 310 exists because of the sensitivity of the receiver analog circuitry 208 to the digital switching noise and harmonics present in the receiver digital circuitry 212. Interference mechanism 310 may also exist because of the digital signals (for example, clock signals) that the receiver digital circuitry 212 communicates to the receiver analog circuitry 208. Similarly, the digital switching noise and harmonics in the receiver digital circuitry 212 may interfere with the local oscillator circuitry 222, giving rise to interference mechanism 320 in FIG. 3.

The local oscillator circuitry 222 typically uses an inductor in an inductive-capacitive (LC) resonance tank (not shown explicitly in the figures). The resonance tank may circulate relatively large currents. Those currents may couple to the sensitive circuitry within the transmitter circuitry 216 (e.g., the transmitter's VCO), thus giving rise to interference mechanism 330. Similarly, the relatively large currents circulating within the resonance tank of the local oscillator circuitry 222 may saturate sensitive components within the receiver analog circuitry 208 (e.g., the LNA circuitry). FIG. 3 depicts this interference source as interference mechanism 370.

The timing of the transmit mode and receive mode in the GSM specifications help to mitigate potential interference between the transceiver's receive-path circuitry and its transmit-path circuitry. The GSM specifications use time-division duplexing (TDD). According to the TDD protocol, the transceiver deactivates the transmit-path circuitry while in the receive mode of operation, and vice-versa. Consequently, FIG. 3 does not show potential interference mechanisms between the transmitter circuitry 216 and either the receiver digital circuitry 212 or the receiver analog circuitry 208.

As FIG. 3 illustrates, interference mechanisms exist between the local oscillator circuitry 222 and each of the other blocks or components in the RF transceiver. Thus, to reduce interference effects, RF transceivers according to the invention preferably partition the local oscillator circuitry 222 separately from the other transceiver blocks shown in FIG. 3. Note, however, that in some circumstances one may include parts or all of the local oscillator circuitry within the same circuit partition (for example, circuit partition 214 in FIGS. 2A–2D) that includes the receiver analog circuitry and the transmitter circuitry, as desired. Typically, a voltage-controlled oscillator (VCO) within the local oscillator circuitry causes interference with other sensitive circuit blocks (for example, the receiver analog circuitry) through undesired coupling mechanisms. If those coupling mechanisms can be mitigated to the extent that the performance characteristics of the RF transceiver are acceptable in a given application, then one may include the local oscillator circuitry within the same circuit partition as the receiver analog circuitry and the transmitter circuitry. Alternatively, if the VCO circuitry causes unacceptable levels of interference, one may include other parts of the local oscillator circuitry within the circuit partition that includes the receiver analog circuitry and the transmitter circuitry, but exclude the VCO circuitry from that circuit partition.

To reduce the effects of interference mechanism 310, RF transceivers according to the invention partition the receiver analog circuitry 208 separately from the receiver digital circuitry 212. Because of the mutually exclusive operation of the transmitter circuitry 216 and the receiver analog circuitry 208 according to GSM specifications, the transmitter circuitry 216 and the receiver analog circuitry 208 may reside within the same circuit partition, or circuit block. Placing the transmitter circuitry 216 and the receiver analog circuitry 208 within the same circuit partition results in a more integrated RF transceiver overall. The RF transceivers shown in FIGS. 2A–2D employ partitioning techniques that take advantage of the above analysis of the interference mechanisms among the various transceiver components. To reduce interference effects among the various circuit partitions or circuit blocks even further, RF transceivers according to the invention also use differential signals to couple the circuit partitions or circuit blocks to one another.

Figure 4:
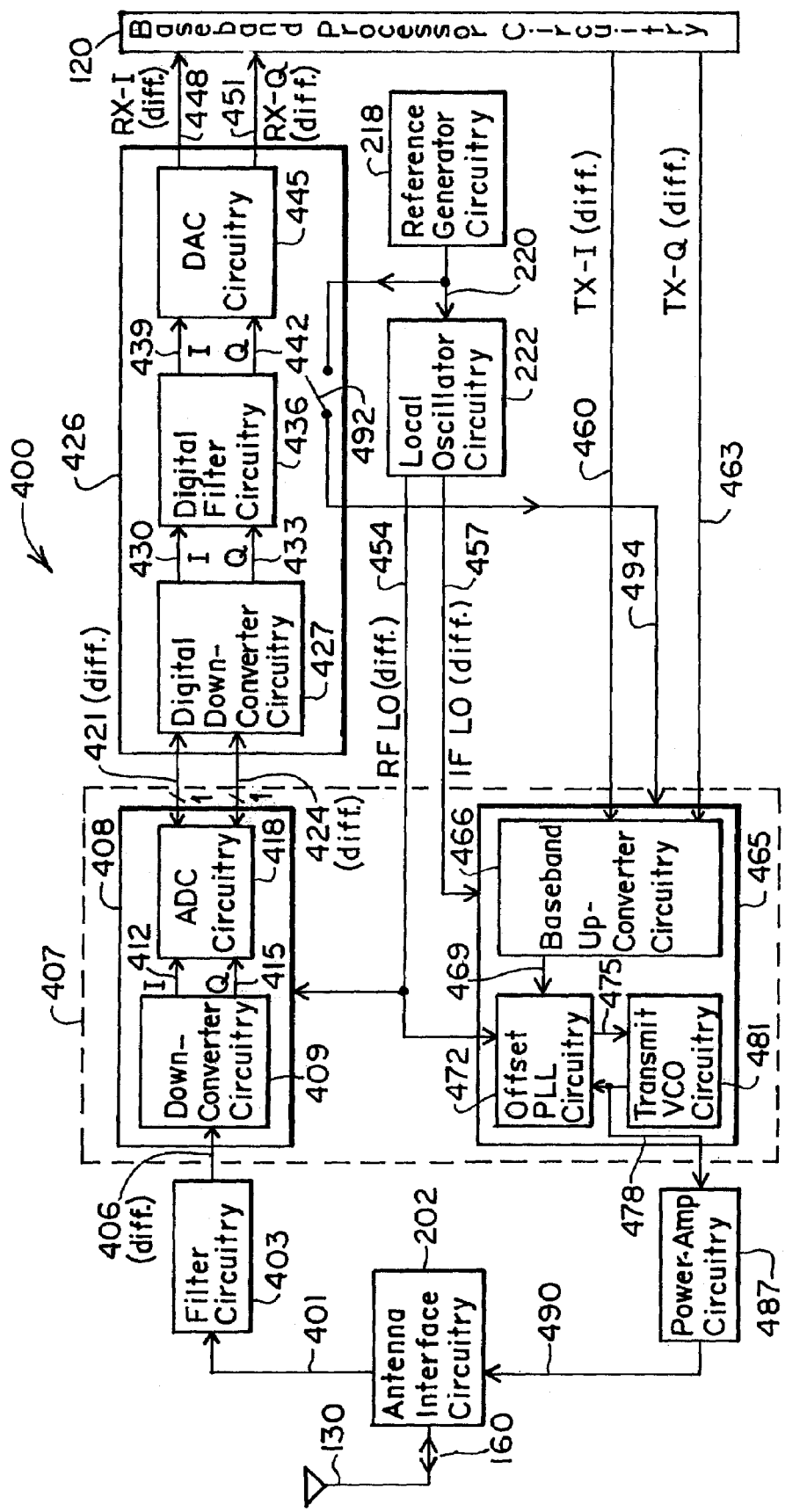
FIG. 4 shows a more detailed block diagram of RF transceiver circuitry partitioned according to the invention.

FIG. 4 shows a more detailed block diagram of an embodiment 400 of an RF transceiver partitioned according to the invention. The transceiver includes receiver analog circuitry 408, receiver digital circuitry 426, and transmitter circuitry 465. In the receive mode, the antenna interface circuitry 202 provides an RF signal 401 to a filter circuitry 403. The filter circuitry 403 provides a filtered RF signal 406 to the receiver analog circuitry 408. The receiver analog circuitry 408 includes down-converter (i.e., mixer) circuitry 409 and analog-to-digital converter (ADC) circuitry 418. The down-converter circuitry 409 mixes the filtered RF signal 406 with an RF local oscillator signal 454, received from the local oscillator circuitry 222. The down-converter circuitry 409 provides an in-phase analog down-converted signal 412 (i.e., I-channel signal) and a quadrature analog down-converted signal 415 (i.e., Q-channel signal) to the ADC circuitry 418.

The ADC circuitry 418 converts the in-phase analog down-converted signal 412 and the quadrature analog down-converted signal 415 into a one-bit in-phase digital receive signal 421 and a one-bit quadrature digital receive signal 424. (Note that FIGS. 4–8 illustrate signal flow, rather than specific circuit implementations; for more details of the circuit implementation, for example, more details of the circuitry relating to the one-bit in-phase digital receive signal 421 and the one-bit quadrature digital receive signal 424, see FIGS. 9–14.) Thus, The ADC circuitry 418 provides the one-bit in-phase digital receive signal 421 and the one-bit quadrature digital receive signal 424 to the receiver digital circuitry 426. As described below, rather than, or in addition to, providing the one-bit in-phase and quadrature digital receive signals to the receiver digital circuitry 426, the digital interface between the receiver analog circuitry 408 and the receiver digital circuitry 426 may communicate various other signals. By way of illustration, those signals may include reference signals (e.g., clock signals), control signals, logic signals, -hand-shaking signals, data signals, status signals, information signals, flag signals, and/or configuration signals. Moreover, the signals may constitute single-ended or differential signals, as desired. Thus, the interface provides a flexible communication mechanism between the receiver analog circuitry and the receiver digital circuitry.

The receiver digital circuitry 426 includes digital down-converter circuitry 427, digital filter circuitry 436, and digital-to-analog converter (DAC) circuitry 445. The digital down-converter circuitry 427 accepts the one-bit in-phase digital receive signal 421 and the one-bit quadrature digital receive signal 424 from the receiver analog circuitry 408.

The digital down-converter circuitry 427 converts the received signals into a down-converted in-phase signal 430 and a down-converted quadrature signal 433 and provides those signals to the digital filter circuitry 436. The digital filter circuitry 436 preferably comprises an infinite impulse response (IIR) channel-select filter that performs various filtering operations on its input signals. The digital filter circuitry 436 preferably has programmable response characteristics. Note that, rather than using an IIR filter, one may use other types of filter (e.g., finite impulse-response, or FIR, filters) that provide fixed or programmable response characteristics, as desired.

The digital filter circuitry 436 provides a digital in-phase filtered signal 439 and a digital quadrature filtered signal 442 to the DAC circuitry 445. The DAC circuitry 445 converts the digital in-phase filtered signal 439 and the digital quadrature filtered signal 442 to an in-phase analog receive signal 448 and a quadrature analog receive signal 451, respectively. The baseband processor circuitry 120 accepts the in-phase analog receive signal 448 and the quadrature analog receive signal 451 for further processing.

The transmitter circuitry 465 comprises baseband up-converter circuitry 466, offset phase-lock-loop (PLL) circuitry 472, and transmit voltage-controlled oscillator (VCO) circuitry 481. The transmit VCO circuitry 481 typically has low-noise circuitry and is sensitive to external noise. For example, it may pick up interference from digital switching because of the high gain that results from the resonant LC-tank circuit within the transmit VCO circuitry 481. The baseband up-converter circuitry 466 accepts an intermediate frequency (IF) local oscillator signal 457 from the local oscillator circuitry 222. The baseband up-converter circuitry 466 mixes the IF local oscillator signal 457 with an analog in-phase transmit input signal 460 and an analog quadrature transmit input signal 463 and provides an up-converted IF signal 469 to the offset PLL circuitry 472.

The offset PLL circuitry 472 effectively filters the IF signal 469. In other words, the offset PLL circuitry 472 passes through it signals within its bandwidth but attenuates other signals. In this manner, the offset PLL circuitry 472 attenuates any spurious or noise signals outside its bandwidth, thus reducing the requirement for filtering at the antenna 130, and reducing system cost, insertion loss, and power consumption. The offset PLL circuitry 472 forms a feedback loop with the transmit VCO circuitry 481 via an offset PLL output signal 475 and a transmit VCO output signal 478. The transmit VCO circuitry 481 preferably has a constant-amplitude output signal.

The offset PLL circuitry 472 uses a mixer (not shown explicitly in FIG. 4) to mix the RF local oscillator signal 454 with the transmit VCO output signal 478. Power amplifier circuitry 487 accepts the transmit VCO output signal 478, and provides an amplified RF signal 490 to the antenna interface circuitry 202. The antenna interface circuitry 202 and the antenna 130 operate as described above. RF transceivers according to the invention preferably use transmitter circuitry 465 that comprises analog circuitry, as shown in FIG. 4. Using such circuitry minimizes interference with the transmit VCO circuitry 481 and helps to meet emission specifications for the transmitter circuitry 465.

The receiver digital circuitry 426 also accepts the reference signal 220 from the reference generator circuitry 218. The reference signal 220 preferably comprises a clock signal. The receiver digital circuitry 426 provides to the transmitter circuitry 465 a switched reference signal 494 by using a switch 492. Thus, the switch 492 may selectively provide the reference signal 220 to the transmitter circuitry 465. Before the RF transceiver enters its transmit mode, the receiver digital circuitry 426 causes the switch 492 to close, thus providing the switched reference signal 494 to the transmitter circuitry 465.

The transmitter circuitry 465 uses the switched reference signal 494 to calibrate or adjust some of its components. For example, the transmitter circuitry 465 may use the switched reference signal 494 to calibrate some of its components, such as the transmit VCO circuitry 481, for example, as described in commonly owned U.S. Pat. No. 6,137,372, incorporated by reference here in its entirety. The transmitter circuitry 465 may also use the switched reference signal 494 to adjust a voltage regulator within its output circuitry so as to transmit at known levels of RF radiation or power.

While the transmitter circuitry 465 calibrates and adjusts its components, the analog circuitry within the transmitter circuitry 465 powers up and begins to settle. When the transmitter circuitry 465 has finished calibrating its internal circuitry, the receiver digital circuitry 426 causes the switch 492 to open, thus inhibiting the supply of the reference signal 220 to the transmitter circuitry 465. At this point, the transmitter circuitry may power up the power amplifier circuitry 487 within the transmitter circuitry 465. The RF transceiver subsequently enters the transmit mode of operation and proceeds to transmit.

Note that FIG. 4 depicts the switch 492 as a simple switch for conceptual, schematic purposes. One may use a variety of devices to realize the function of the controlled switch 492, for example, semiconductor switches, gates, or the like, as persons skilled in the art who have the benefit of the disclosure of the invention understand. Note also that, although FIG. 4 shows the switch 492 as residing within the receiver digital circuitry 426, one may locate the switch in other locations, as desired. Placing the switch 492 within the receiver digital circuitry 426 helps to confine to the receiver digital circuitry 426 the harmonics that result from the switching circuitry.

The embodiment 400 in FIG. 4 comprises a first circuit partition 407, or circuit block, that includes the receiver analog circuitry 408 and the transmitter circuitry 465. The embodiment 400 also includes a second circuit partition, or circuit block, that includes the receiver digital circuitry 426. Finally, the embodiment 400 includes a third circuit partition, or circuit block, that comprises the local oscillator circuitry 222. The first circuit partition 407, the second circuit partition, and the third circuit partition are partitioned from one another so that interference effects among the circuit partitions tend to be reduced. That arrangement tends to reduce the interference effects among the circuit partitions by relying on the analysis of interference effects provided above in connection with FIG. 3. Preferably, the first, second, and third circuit partitions each reside within an integrated circuit device. To further reduce interference effects among the circuit partitions, the embodiment 400 in FIG. 4 uses differential signals wherever possible. The notation "(diff.)" adjacent to signal lines or reference numerals in FIG. 4 denotes the use of differential lines to propagate the annotated signals.

Note that the embodiment 400 shown in FIG. 4 uses an analog-digital-analog signal path in its receiver section. In other words, the ADC circuitry 418 converts analog signals into digital signals for further processing, and later conversion back into analog signals by the DAC circuitry 445. RF transceivers according to the invention use this particular signal path for the following reasons. First, the ADC circuitry 418 obviates the need for propagating signals from the receiver analog circuitry 408 to the receiver digital circuitry 426 over an analog interface with a relatively high dynamic range. The digital interface comprising the one-bit in-phase digital receive signal 421 and the one-bit quadrature digital receive signal 424 is less susceptible to the effects of noise and interference than would be an analog interface with a relatively high dynamic range.

Second, the RF transceiver in FIG. 4 uses the DAC circuitry 445 to maintain compatibility with interfaces commonly used to communicate with baseband processor circuitry in RF transceivers. According to those interfaces, the baseband processor accepts analog, rather than digital, signals from the receive path circuitry within the RF transceiver. In an RF transceiver that meets the specifications of those interfaces, the receiver digital circuitry 426 would provide analog signals to the baseband processor circuitry 120. The receiver digital circuitry 426 uses the DAC circuitry 445 to provide analog signals (i.e., the in-phase analog receive signal 448 and the quadrature analog receive signal 451) to the baseband processor circuitry 120. The DAC circuitry 445 allows programming the common-mode level and the full-scale voltage, which may vary among different baseband processor circuitries.

Third, compared to an analog solution, the analog-digital-analog signal path may result in reduced circuit size and area (for example, the area occupied within an integrated circuit device), thus lower cost. Fourth, the digital circuitry provides better repeatability, relative ease of testing, and more robust operation than its analog counterpart. Fifth, the digital circuitry has less dependence on supply voltage variation, temperature changes, and the like, than does comparable analog circuitry.

Sixth, the baseband processor circuitry 120 typically includes programmable digital circuitry, and may subsume the functionality of the digital circuitry within the receiver digital circuitry 426, if desired. Seventh, the digital circuitry allows more precise signal processing, for example, filtering, of signals within the receive path. Eighth, the digital circuitry allows more power-efficient signal processing. Finally, the digital circuitry allows the use of readily programmable DAC circuitry and PGA circuitry that provide for more flexible processing of the signals within the receive path. To benefit from the analog-digital-analog signal path, RF transceivers according to the invention use a low-IF signal (for example, 100 KHz for GSM applications) in their receive path circuitry, as using higher IF frequencies may lead to higher performance demands on the ADC and DAC circuitry within that path. The low-IF architecture also eases image-rejection requirements, and allows on-chip integration of the digital filter circuitry 436. Moreover, RF transceivers according to the invention use the digital down-converter circuitry 427 and the digital filter circuitry 436 to implement a digital-IF path in the receive signal path. The digital-IF architecture facilitates the implementation of the digital interface between the receiver digital circuitry 426 and the receiver analog circuitry 408.

If the receiver digital circuitry 426 need not be compatible with the common analog interface to baseband processors, one may remove the DAC circuitry 445 and use a digital interface to the baseband processor circuitry 120, as desired. In fact, similar to the RF transceiver shown in FIG. 2D, one may realize the function of the receiver digital circuitry 426 within the baseband processor circuitry 120, using hardware, software, or a combination of hardware and software. In that case, the RF transceiver would include two circuit partitions, or circuit blocks. The first circuit partition, or circuit block, 407 would include the receiver analog circuitry 408 and the transmitter circuitry 465. A second circuit partition, or circuit block, would comprise the local oscillator circuitry 222. Note also that, similar to the RF transceiver shown in FIG. 2C, one may include within the baseband processor circuitry 120 the functionality of the reference generator circuitry 218, as desired.

Figure 5:
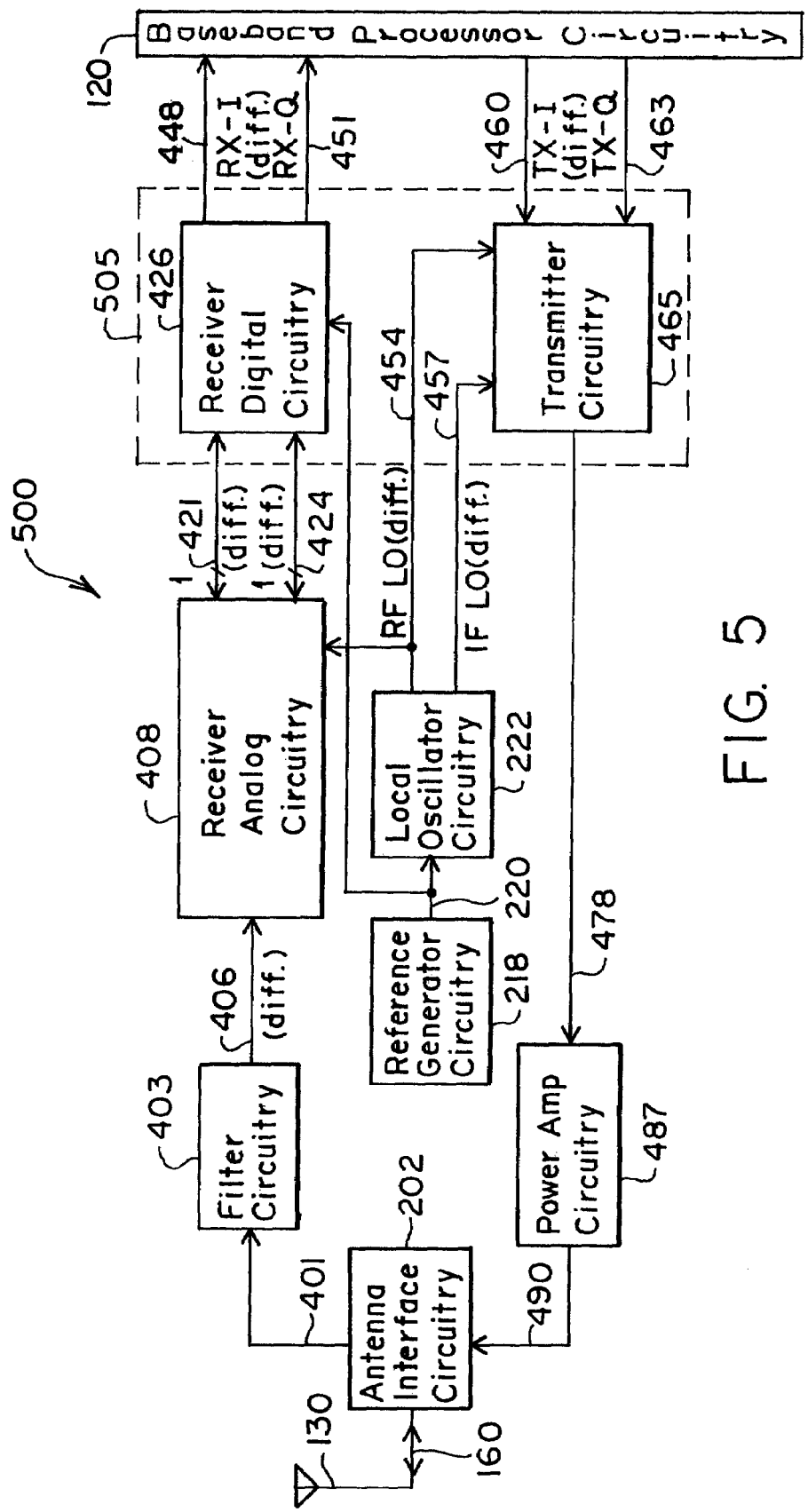
FIG. 5 illustrates an alternative technique for partitioning RF transceiver circuitry.
Figure 6:
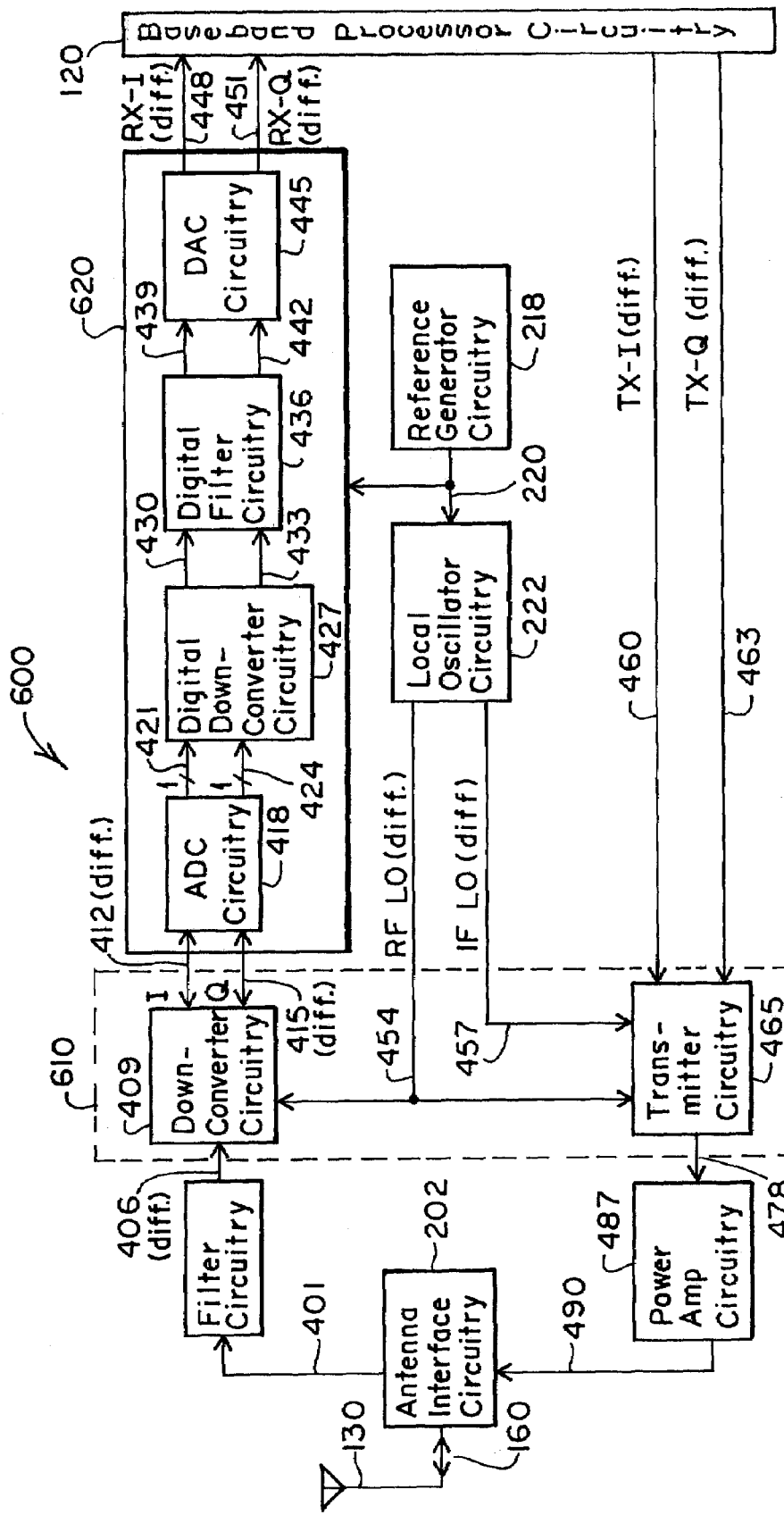
FIG. 6 shows yet another alternative technique for partitioning RF transceiver circuitry.

One may partition the RF transceiver shown in FIG. 4 in other ways. FIGS. 5 and 6 illustrate alternative partitioning of the RF transceiver of FIG. 4. FIG. 5 shows an embodiment 500 of an RF transceiver that includes three circuit partitions, or circuit blocks. A first circuit partition includes the receiver analog circuitry 408. A second circuit partition 505 includes the receiver digital circuitry 426 and the transmitter circuitry 465. As noted above, the GSM specifications provide for alternate operation of RF transceivers in receive and transmit modes. The partitioning shown in FIG. 5 takes advantage of the GSM specifications by including the receiver digital circuitry 426 and the transmitter circuitry 465 within the second circuit partition 505. A third circuit partition includes the local oscillator circuitry 222. Preferably, the first, second, and third circuit partitions each reside within an integrated circuit device. Similar to embodiment 400 in FIG. 4, the embodiment 500 in FIG. 5 uses differential signals wherever possible to further reduce interference effects among the circuit partitions.

FIG. 6 shows another alternative partitioning of an RF transceiver. FIG. 6 shows an embodiment 600 of an RF transceiver that includes three circuit partitions, or circuit blocks. A first circuit partition 610 includes part of the receiver analog circuitry, i.e., the down-converter circuitry 409, together with the transmitter circuitry 465. A second circuit partition 620 includes the ADC circuitry 418, together with the receiver digital circuitry, i.e., the digital down-converter circuitry 427, the digital filter circuitry 436, and the DAC circuitry 445. A third circuit partition includes the local oscillator circuitry 222. Preferably, the first, second, and third circuit partitions each reside within an integrated circuit device. Similar to embodiment 400 in FIG. 4, the embodiment 600 in FIG. 6 uses differential signals wherever possible to further reduce interference effects among the circuit partitions.

Figure 7:
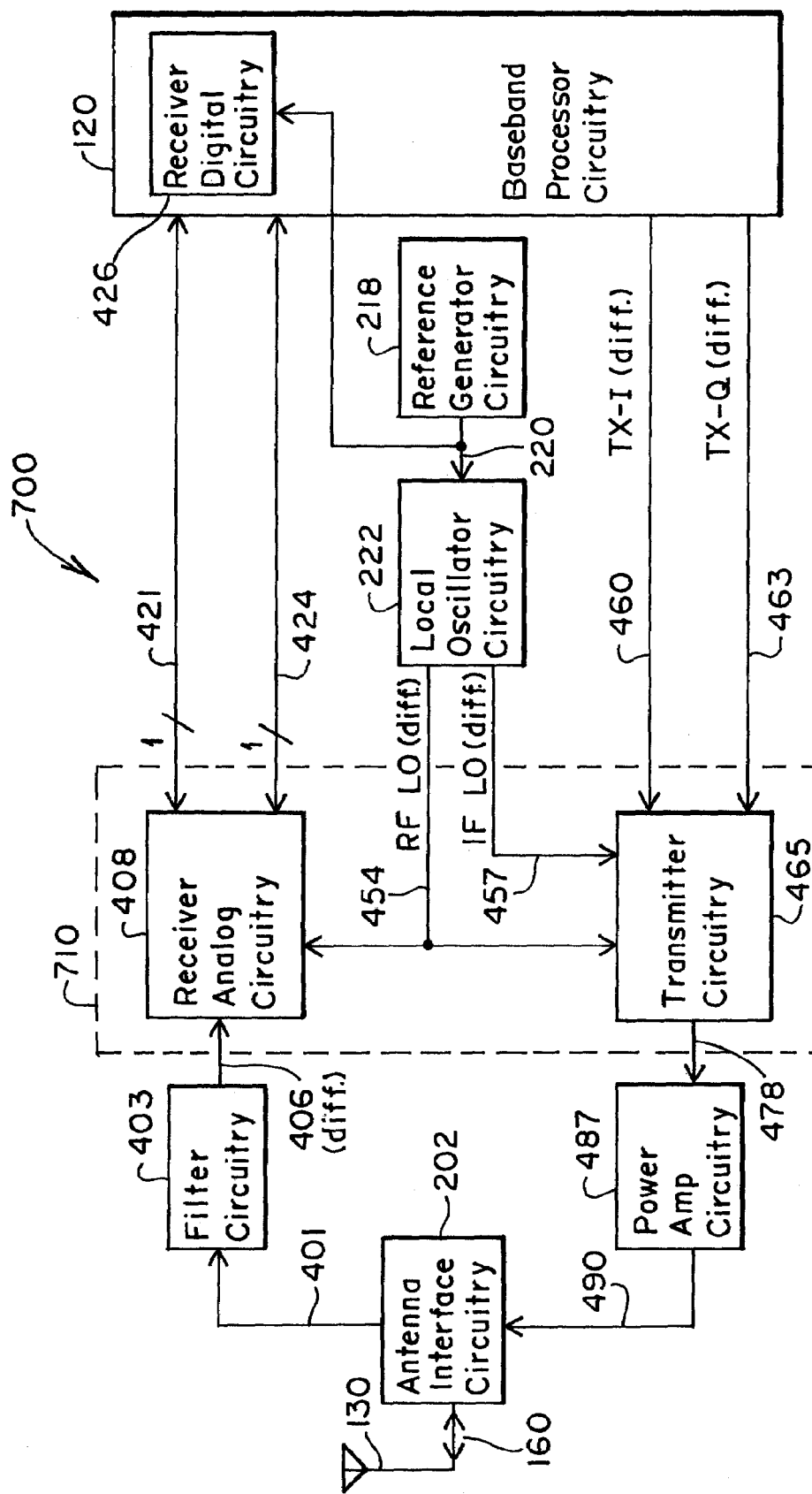
FIG. 7 depicts a more detailed block diagram of RF transceiver circuitry partitioned according to the invention, in which the receiver digital circuitry resides within the baseband processor circuitry.

FIG. 7 shows a variation of the RF transceiver shown in FIG. 4. FIG. 7 illustrates an embodiment 700 of an RF transceiver partitioned according to the invention. Note that, for the sake of clarity, FIG. 7 does not explicitly show the details of the receiver analog circuitry 408, the transmitter circuitry 465, and the receiver digital circuitry 426. The receiver analog circuitry 408, the transmitter circuitry 465, and the receiver digital circuitry 426 include circuitry similar to those shown in their corresponding counterparts in FIG. 4. Similar to the RF transceiver shown in FIG. 2D, the embodiment 700 in FIG. 7 shows an RF transceiver in which the baseband processor 120 includes the function of the receiver digital circuitry 426. The baseband processor circuitry 120 may realize the function of the receiver digital circuitry 426 using hardware, software, or a combination of hardware and software.

Because the embodiment 700 includes the function of the receiver digital circuitry 426 within the baseband processor circuitry 120, it includes two circuit partitions, or circuit blocks. A first circuit partition 710 includes the receiver analog circuitry 408 and the transmitter circuitry 465. A second circuit partition comprises the local oscillator circuitry 222. Note also that, similar to the RF transceiver shown in FIG. 2C, one may also include within the baseband processor circuitry 120 the functionality of the reference generator circuitry 218, as desired.

Figure 8:
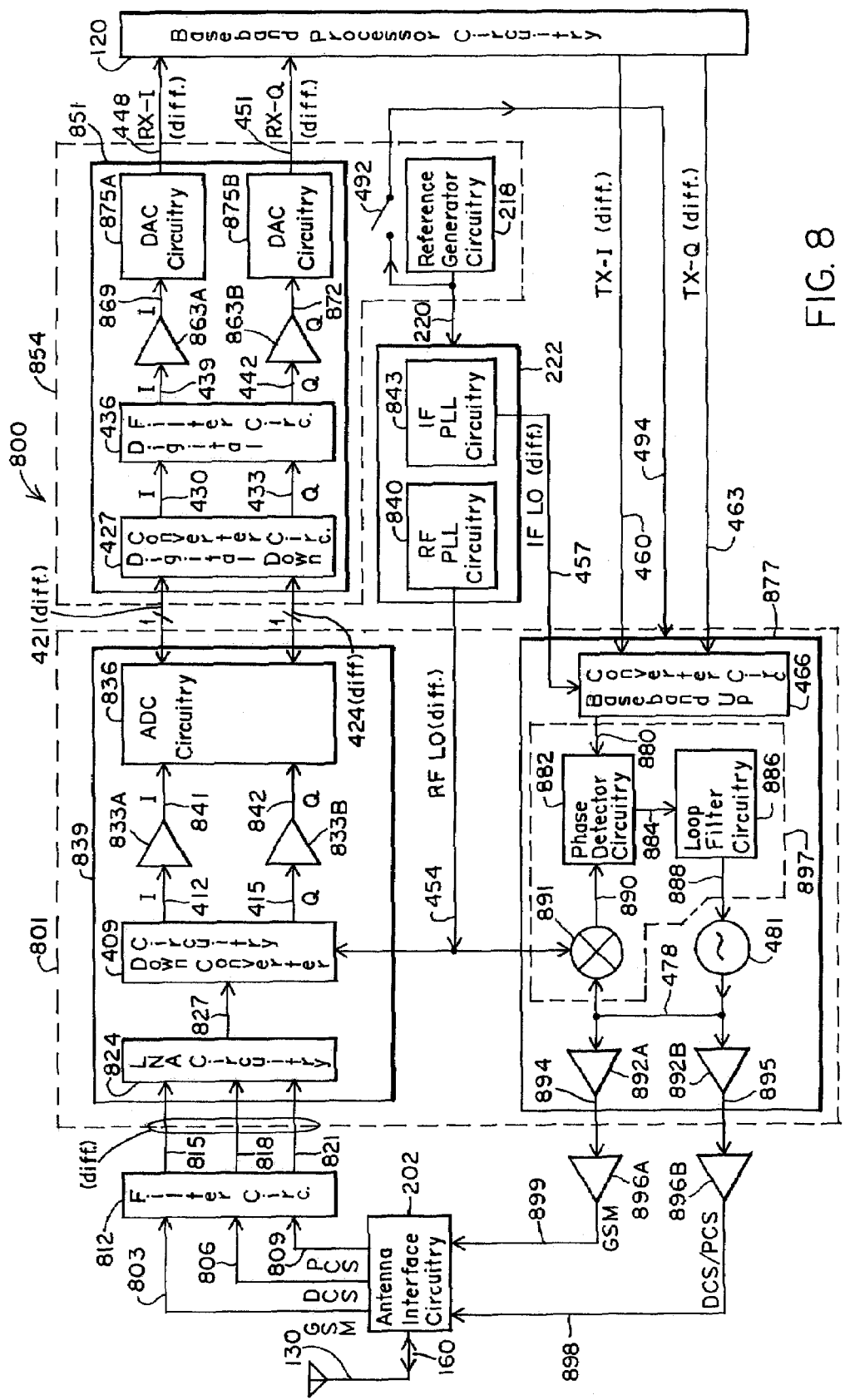
FIG. 8 illustrates a more detailed block diagram of a multi-band RF transceiver circuitry partitioned according to the invention.

FIG. 8 shows an embodiment 800 of a multi-band RF transceiver, partitioned according to the invention. Preferably, the RF transceiver in FIG. 8 operates within the GSM (925 to 960 MHz for reception and 880–915 MHz for transmission), PCS (1930 to 1990 MHz for reception and 1850–1910 MHz for transmission), and DCS (1805 to 1880 MHz for reception and 1710–1785 MHz for transmission) bands. Like the RF transceiver in FIG. 4, the RF transceiver in FIG. 8 uses a low-IF architecture. The embodiment 800 includes receiver analog circuitry 839, receiver digital circuitry 851, transmitter circuitry 877, local oscillator circuitry 222, and reference generator circuitry 218. The local oscillator circuitry 222 includes RF phase-lock loop (PLL) circuitry 840 and intermediate-frequency (IF) PLL circuitry 843. The RF PLL circuitry 840 produces the RF local oscillator, or RF LO, signal 454, whereas the IF PLL circuitry 843 produces the IF local oscillator, or IF LO, signal 457.

Table 1 below shows the preferred frequencies for the RF local oscillator signal 454 during the receive mode:

TABLE 1

| Band | RF Local Oscillator Frequency (MHz) |
| --- | --- |
| GSM | 1849.8–1919.8 |
| DCS | 1804.9–1879.9 |
| PCS | 1929.9–1989.9 |
| All Bands | 1804.9–1989.9 |

Table 2 below lists the preferred frequencies for the RF local oscillator signal 454 during the transmit mode:

TABLE 2

| Band | RF Local Oscillator Frequency (MHz) |
| --- | --- |
| GSM | 1279–1314 |
| DCS | 1327–1402 |
| PCS | 1423–1483 |
| All Bands | 1279–1483 |

During the receive mode, the IF local oscillator signal 457 is preferably turned off. In preferred embodiments, during the transmit mode, the IF local oscillator signal 457 preferably has a frequency between 383 MHz and 427 MHz. Note, however, that one may use other frequencies for the RF and IF local oscillator signals 454 and 457, as desired.

The reference generator 218 provides a reference signal 220 that preferably comprises a clock signal, although one may use other signals, as persons skilled in the art who have the benefit of the description of the invention understand. Moreover, the transmitter circuitry 877 preferably uses high-side injection for the GSM band and low-side injection for the DCS and PCS bands.

The receive path circuitry operates as follows. Filter circuitry 812 accepts a GSM RF signal 803, a DCS RF signal 806, and a PCS RF signal 809 from the antenna interface circuitry 202. The filter circuitry 812 preferably contains a surface-acoustic-wave (SAW) filter for each of the three bands, although one may use other types and numbers of filters, as desired. The filter circuitry 812 provides a filtered GSM RF signal 815, a filtered DCS RF signal 818, and a 15 filtered PCS RF signal 821 to low-noise amplifier (LNA) circuitry 824. The LNA circuitry 824 preferably has programmable gain, and in part provides for programmable gain in the receive path circuitry.

The LNA circuitry 824 provides an amplified RF signal 827 to down-converter circuitry 409. In exemplary embodiments according to the invention, amplified RF signal 827 includes multiple signal lines, which may be differential signal lines, to accommodate the GSM, DCS, and PCS bands. Note that, rather than using the LNA circuitry with a real output, one may use an LNA circuitry that has complex outputs (in-phase and quadrature outputs), together with a poly-phase filter circuitry. The combination of the complex LNA circuitry and the poly-phase filter circuitry provides better image rejection, albeit with a somewhat higher loss. Thus, the choice of using the complex LNA circuitry and the poly-phase filter circuitry depends on a trade-off between image rejection and loss in the poly-phase filter circuitry.

The down-converter circuitry 409 mixes the amplified RF signal 827 with the RF local oscillator signal 454, which it receives from the RF PLL circuitry 840. The down-converter circuitry 409 produces the in-phase analog down-converted signal 412 and the quadrature in-phase analog down-converted signal 415. The down-converter circuitry 409 provides the in-phase analog down-converted signal 412 and the quadrature in-phase analog down-converted signal 415 to a pair of programmable-gain amplifiers (PGAs) 833A and 833B.

The PGA 833A and PGA 833B in part allow for programming the gain of the receive path. The PGA 833A and the PGA 833B supply an analog in-phase amplified signal 841 and an analog quadrature amplified signal 842 to complex ADC circuitry 836 (i.e., both I and Q inputs will affect both I and Q outputs). The ADC circuitry 836 converts the analog in-phase amplified signal 841 into a one-bit in-phase digital receive signal 421. Likewise, the ADC circuitry 836 converts the analog quadrature amplifier signal 842 into a one-bit quadrature digital receive signal 424.

Note that RF transceivers and receivers according to the invention preferably use a one-bit digital interface. One may, however, use a variety of other interfaces, as persons skilled in the art who have the benefit of the description of the invention understand. For example, one may use a multi-bit interface or a parallel interface. Moreover, as described below, rather than, or in addition to, providing the one-bit in-phase and quadrature digital receive signals to the receiver digital circuitry 851, the digital interface between the receiver analog circuitry 839 and the receiver digital circuitry 851 may communicate various other signals. By way of illustration, those signals may include reference signals (e.g., clock signals), control signals, logic signals, hand-shaking signals, data signals, status signals, information signals, flag signals, and/or configuration signals. Furthermore, the signals may constitute single-ended or differential signals, as desired. Thus, the interface provides a flexible communication mechanism between the receiver analog circuitry and the receiver digital circuitry.

The receiver digital circuitry 851 accepts the one-bit in-phase digital receive signal 421 and the one-bit quadrature digital receive signal 424, and provides them to the digital down-converter circuitry 427. The digital down-converter circuitry 427 converts the received signals into a down-converted in-phase signal 430 and a down-converted quadrature signal 433 and provides those signals to the digital filter circuitry 436. The digital filter circuitry 436 preferably comprises an IIR channel-select filter that performs filtering operations on its input signals. Note, however, that one may use other types of filters, for example, FIR filters, as desired.

The digital filter circuitry 436 provides the digital in-phase filtered signal 439 to a digital PGA 863A and the digital quadrature filtered signal 442 to a digital PGA 863B. The digital PGA 863A and PGA 863B in part allow for programming the gain of the receive path circuitry. The digital PGA 863A supplies an amplified digital in-phase signal 869 to DAC circuitry 875A, whereas the digital PGA 863B supplies an amplified digital quadrature signal 872 to DAC circuitry 875B. The DAC circuitry 875A converts the amplified digital in-phase signal 869 to the in-phase analog receive signal 448. The DAC circuitry 875B converts the amplified digital quadrature signal 872 signal into the quadrature analog receive signal 451. The baseband processor circuitry 120 accepts the in-phase analog receive signal 448 and the quadrature analog receive signal 451 for further processing, as desired.

Note that the digital circuit blocks shown in the receiver digital circuitry 851 depict mainly the conceptual functions and signal flow. The actual digital-circuit implementation may or may not contain separately identifiable hardware for the various functional blocks. For example, one may re-use (in time, for instance, by using multiplexing) the same digital circuitry to implement both digital PGA 863A and digital PGA 863B, as desired.

Note also that, similar to the RF transceiver in FIG. 4, the RF transceiver in FIG. 8 features a digital-IF architecture. The digital-IF architecture facilitates the implementation of the one-bit digital interface between the receiver digital circuitry 426 and the receiver analog circuitry 408. Moreover, the digital-IF architecture allows digital (rather than analog) IF-filtering, thus providing all of the advantages of digital filtering.

The transmitter circuitry 877 comprises baseband up-converter circuitry 466, transmit VCO circuitry 481, a pair of transmitter output buffers 892A and 892B, and offset PLL circuitry 897. The offset PLL circuitry 897 includes offset mixer circuitry 891, phase detector circuitry 882, and loop filter circuitry 886. The baseband up-converter circuitry 466 accepts the analog in-phase transmit input signal 460 and the analog quadrature transmit input signal 463, mixes those signals with the IF local oscillator signal 457, and provides a transmit IF signal 880 to the offset PLL circuitry 897. The offset PLL circuitry 897 uses the transmit IF signal 880 as a reference signal. The transmit IF signal 880 preferably comprises a modulated single-sideband IF signal but, as persons skilled in the art who have the benefit of the description of the invention understand, one may use other types of signal and modulation, as desired.

The offset mixer circuitry 891 in the offset PLL circuitry 897 mixes the transmit VCO output signal 478 with the RF local oscillator signal 454, and provides a mixed signal 890 to the phase detector circuitry 882. The phase detector circuitry 882 compares the mixed signal 890 to the transmit IF signal 880 and provides an offset PLL error signal 884 to the loop filter circuitry 886. The loop filter circuitry 886 in turn provides a filtered offset PLL signal 888 to the transmit VCO circuitry 481. Thus, the offset PLL circuitry 897 and the transmit VCO circuitry 481 operate in a feedback loop. Preferably, the output frequency of the transmit VCO circuitry 481 centers between the DCS and PCS bands, and its output is divided by two for the GSM band.

Transmitter output buffers 892A and 892B receive the transmit VCO output signal 478 and provide buffered transmit signals 894 and 895 to a pair of power amplifiers 896A and 896B. The power amplifiers 896A and 896B provide amplified RF signals 899 and 898, respectively, for transmission through antenna interface circuitry 202 and the antenna 130. Power amplifier 896A provides the RF signal 899 for the GSM band, whereas power amplifier 896B supplies the RF signal 898 for the DCS and PCS bands. Persons skilled in the art who have the benefit of the description of the invention, however, understand that one may use other arrangements of power amplifiers and frequency bands. Moreover, one may use RF filter circuitry within the output path of the transmitter circuitry 877, as desired.

The embodiment 800 comprises three circuit partitions, or circuit blocks. A first circuit partition 801 includes the receiver analog circuitry 839 and the transmitter circuitry 877. A second circuit partition 854 includes the receiver digital circuitry 851 and the reference generator circuitry 218. Finally, a third circuit partition comprises the local oscillator circuitry 222. The first circuit partition 801, the second circuit partition 854, and the third circuit partition are partitioned from one another so that interference effects among the circuit partitions tend to be reduced. That arrangement tends to reduce the interference effects among the circuit partitions because of the analysis of interference effects provided above in connection with FIG. 3. Preferably, the first, second, and third circuit partitions each reside within an integrated circuit device. To further reduce interference effects among the circuit partitions, the embodiment 800 in FIG. 8 uses differential signals wherever possible. The notation "(diff.)" adjacent to signal lines or reference numerals in FIG. 8 denotes the use of differential lines to propagate the annotated signals.

Note that, similar to the RF transceiver shown in FIG. 4 and described above, the embodiment 800 shown in FIG. 8 uses an analog-digital-analog signal path in its receiver section. The embodiment 800 uses this particular signal path for reasons similar to those described above in connection with the transceiver shown in FIG. 4.

Like the transceiver in FIG. 4, if the receiver digital circuitry 851 need not be compatible with the common analog interface to baseband processors, one may remove the DAC circuitry 875A and 875B, and use a digital interface to the baseband processor circuitry 120, as desired. In fact, similar to the RF transceiver shown in FIG. 2D, one may realize the function of the receiver digital circuitry 851 within the baseband processor circuitry 120, using hardware, software, or a combination of hardware and software. In that case, the RF transceiver would include two circuit partitions, or circuit blocks. The first circuit partition 801 would include the receiver analog circuitry 839 and the transmitter circuitry 877. A second circuit partition would comprise the local oscillator circuitry 222. Note also that, similar to the RF transceiver shown in FIG. 2C, in the embodiment 800, one may include within the baseband processor circuitry 120 the functionality of the reference generator circuitry 218, as desired.

Another aspect of the invention includes a configurable interface between the receiver digital circuitry and the receiver analog circuitry. Generally, one would seek to minimize digital switching activity within the receiver analog circuitry. Digital switching activity within the receiver analog circuitry would potentially interfere with the sensitive analog RF circuitry, for example, LNAs, or mixers. As described above, the receiver analog circuitry includes analog-to-digital circuitry (ADC), which preferably comprises sigma-delta-type ADCs. Sigma-delta ADCs typically use a clock signal at their output stages that generally has a pulse shape and, thus, contains high-frequency Fourier series harmonics. Moreover, the ADC circuitry itself produces digital outputs that the receiver digital circuitry uses. The digital switching present at the outputs of the ADC circuitry may also interfere with sensitive analog circuitry within the receiver analog circuitry.

Figure 9A:
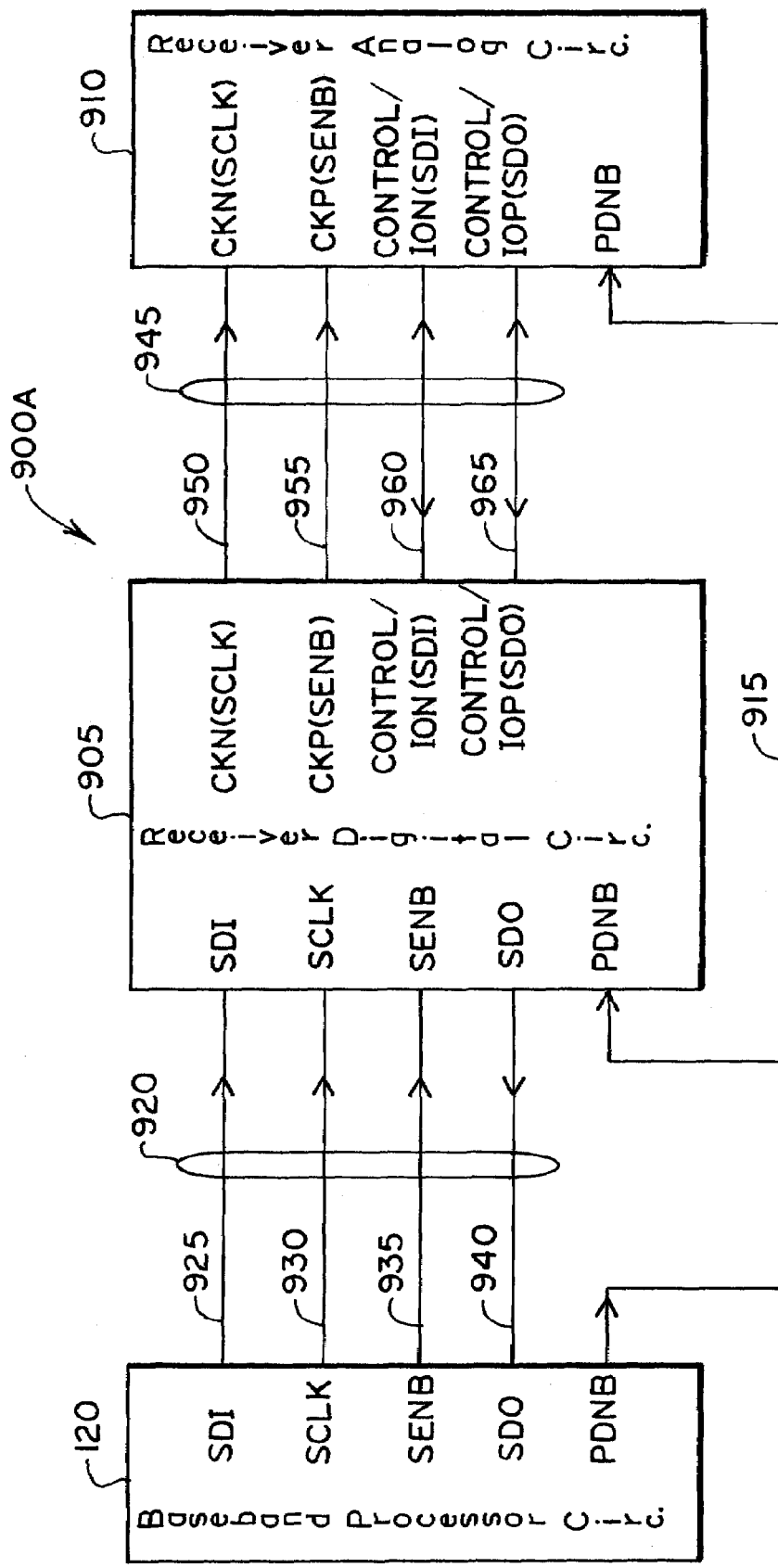
FIG. 9A shows a block diagram of an embodiment of the interface between the receiver digital circuitry and receiver analog circuitry in an RF transceiver according to the invention.

The invention contemplates providing RF apparatus according to the invention, for example, receivers and transceivers, that include an interface circuitry to minimize or reduce the effects of interference from digital circuitry within the RF apparatus. FIG. 9A shows an embodiment 900A of an interface between the receiver digital circuitry 905 and the receiver analog circuitry 910. The interface includes configurable interface signal lines 945. The baseband processor circuitry 120 in the transceiver of FIG. 9A communicates configuration, status, and setup information with both the receiver digital circuitry 905 and the receiver analog circuitry 910. In the preferred embodiments of RF transceivers according to the invention, the baseband processor circuitry 120 communicates with the receiver digital circuitry 905 and the receiver analog circuitry 910 by sending configuration data to read and write registers included within the receiver digital circuitry 905 and the receiver analog circuitry 910.

The receiver digital circuitry 905 communicates with the baseband processor circuitry 120 through a set of serial interface signal lines 920. The serial interface signal lines 920 preferably include a serial data-in (SDI) signal line 925, a serial clock (SCLK) signal line 930, a serial interface enable (SENB) signal line 935, and a serial data-out (SDO) signal line 940. The transceiver circuitry and the baseband processor circuitry 120 preferably hold all of the serial interface signal lines 920 at static levels during the transmit and receive modes of operation. The serial interface preferably uses a 22-bit serial control word that comprises 6 address bits and 16 data bits. Note, however, that one may use other serial interfaces, parallel interfaces, or other types of interfaces, that incorporate different numbers of signal lines, different types and sizes of signals, or both, as desired. Note also that, the SENB signal is preferably an active-low logic signal, although one may use a normal (i.e., an active-high) logic signal by making circuit modifications, as persons skilled in the art understand.

The receiver digital circuitry 905 communicates with the receiver analog circuitry 910 via configurable interface signal lines 945. Interface signal lines 945 preferably include four configurable signal lines 950, 955, 960, and 965, although one may use other numbers of configurable signal lines, as desired, depending on a particular application. In addition to supplying the serial interface signals 920, the baseband processor circuitry 120 provides a control signal 915, shown as a power-down (PDNB) signal in FIG. 9A, to both the receiver digital circuitry 905 and the receiver analog circuitry 910. The receiver digital circuitry 905 and the receiver analog circuitry 910 preferably use the power-down (PDNB) signal as the control signal 915 to configure the functionality of the interface signal lines 945. In other words, the functionality of the interface signal lines 945 depends on the state of the control signal 915. Also, the initialization of the circuitry within the receive path and the transmit path of the transceiver occurs upon the rising edge of the PDNB signal. Note that the PDNB signal is preferably an active-low logic signal, although one may use a normal (i.e., an active-high) logic signal, as persons skilled in the art would understand. Note also that, rather than using the PDNB signal, one may use other signals to control the configuration of the interface signal lines 945, as desired.

In the power-down or serial interface mode (i.e., the control signal 915 (for example, PDNB) is in the logic low state), interface signal line 950 provides the serial clock (SCLK) and interface signal line 955 supplies the serial interface enable signal (SENB). Furthermore, interface signal line 960 provides the serial data-in signal (SDI), whereas interface signal line 965 supplies the serial data-out (SDO) signal. One may devise other embodiments according to the invention in which, during this mode of operation, the transceiver may also perform circuit calibration and adjustment procedures, as desired (for example, the values of various transceiver components may vary over time or among transceivers produced in different manufacturing batches. The transceiver may calibrate and adjust its circuitry to take those variations into account and provide higher performance).

In the normal receive mode of operation (i.e., the control signal, PDNB, is in the logic-high state), interface signal line 950 provides a negative clock signal (CKN) and interface signal line 955 supplies the positive clock signal (CKP). Furthermore, interface signal line 960 provides a negative data signal (ION), whereas interface signal line 965 supplies a positive data signal (IOP).

In preferred embodiments of the invention, the CKN and CKP signals together form a differential clock signal that the receiver digital circuitry 905 provides to the receiver analog circuitry 910. The receiver analog circuitry 910 may provide the clock signal to the transmitter circuitry within the RF transceiver in order to facilitate calibration and adjustment of circuitry, as described above. During the receive mode, the receiver analog circuitry 910 provides the ION and IOP signals to the receiver digital circuitry 905. The ION and IOP signals preferably form a differential data signal. As noted above, the transceiver disables the transmitter circuitry during the receive mode of operation.

In preferred embodiments according to the invention, clock signals CKN and CKP are turned off when the transmitter circuitry is transmitting signals. During the transmit mode, interface signal lines 960 and 965 preferably provide two logic signals from the receiver digital circuitry 905 to the receiver analog circuitry 910. The signal lines may provide input/output signals to communicate data, status, information, flag, and configuration signals between the receiver digital circuitry 905 and the receiver analog circuitry 910, as desired. Preferably, the logic signals control the output buffer of the transmit VCO circuitry. Note that, rather than configuring interface signal lines 960 and 965 as logic signal lines, one may configure them in other ways, for example, analog signal lines, differential analog or digital signal lines, etc., as desired. Furthermore, the interface signal lines 960 and 965 may provide signals from the receiver digital circuitry 905 to the receiver analog circuitry 910, or vice-versa, as desired.

In addition to using differential signals, RF transceivers according to the invention preferably take other measures to reduce interference effects among the various transceiver circuits. Signals CKN, CKP, ION, and IOP may constitute voltage signals, as desired. Depending on the application, the signals CKN, CKP, ION, and IOP (or logic signals in the transmit mode) may have low voltage swings (for example, voltage swings smaller than the supply voltage) to reduce the magnitude and effects of interference because of the voltage switching on those signals.

In preferred embodiments according to the invention, signals CKN, CKP, ION, and IOP constitute current, rather than voltage, signals. Moreover, to help reduce the effects of interference even further, RF transceivers according to the invention preferably use band-limited signals. RF transceivers according to the invention preferably use filtering to remove some of the higher frequency harmonics from those signals to produce band-limited current signals.

Table 3 below summarizes the preferred functionality of the configurable interface signal lines 950, 955, 960, and 965 as a function of the state of the control signal 915 (for example, PDNB):

TABLE 3

| Signal Line | Control = 0 | Control = 1 (During Reception) | Control = 1 (During Transmission) |
|---|---|---|---|
| 950 | SCLK | CKN | (CKN off) |
| 955 | SENB | CKP | (CKP off) |
| 960 | SDI | ION | Logic Signal |
| 965 | SDO | IOP | Logic Signal |

Using configurable interface signal lines 945 in the interface between the receiver digital circuitry 905 and the receiver analog circuitry 910 allows using the same physical connections (e.g., pins on an integrated-circuit device or electrical connectors on a module) to accomplish different functionality. Thus, the configurable interface between the receiver digital circuitry 905 and the receiver analog circuitry 910 makes available the physical electrical connections available for other uses, for example, providing ground pins or connectors around sensitive analog signal pins or connectors to help shield those signals from RF interference. Moreover, the configurable interface between the receiver digital circuitry 905 and the receiver analog circuitry 910 reduces packaging size, cost, and complexity.

Figure 9B:
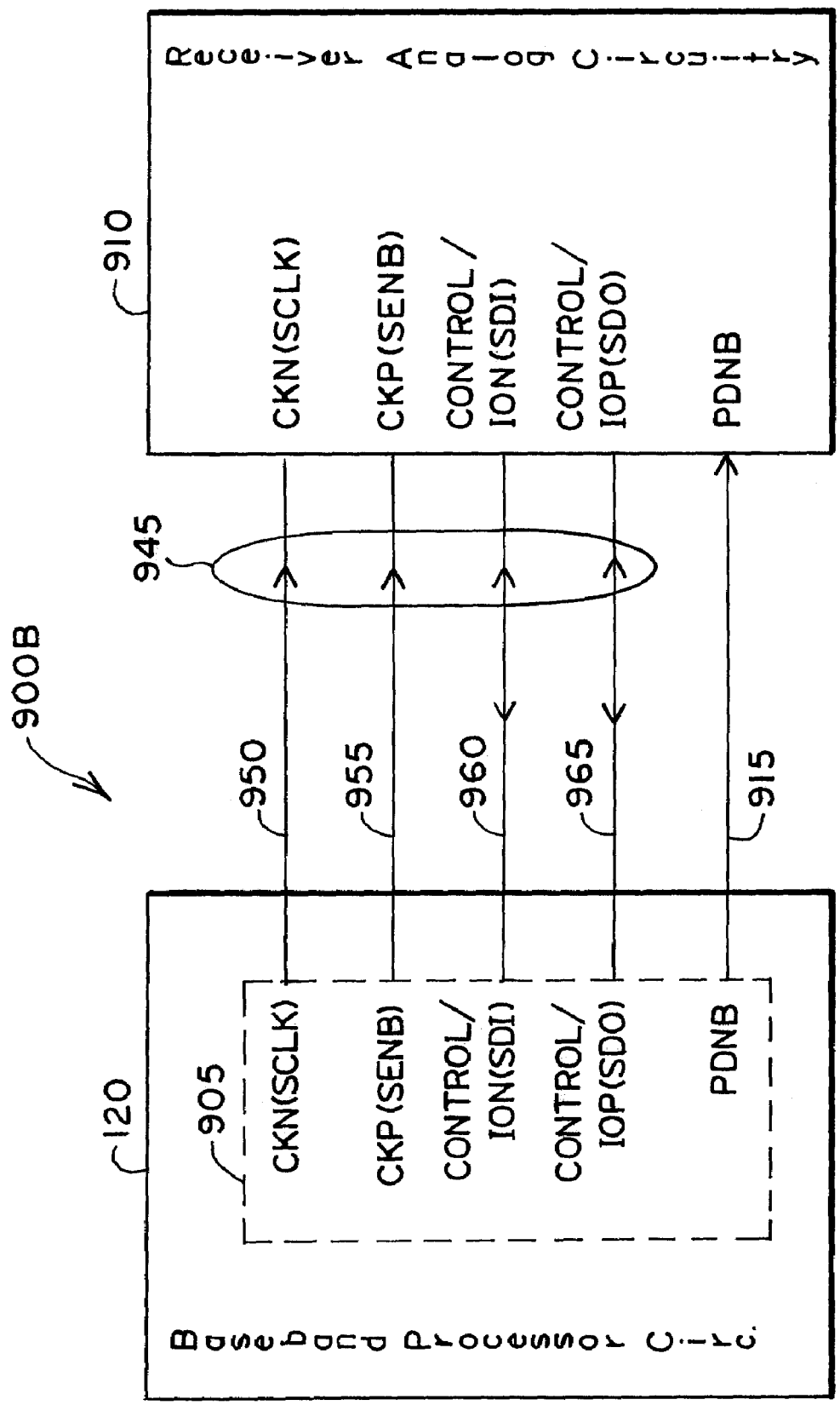
FIG. 9B depicts a block diagram of another embodiment of the interface between the baseband processor circuitry and the receiver analog circuitry in an RF transceiver according to the invention, in which the receiver digital circuitry resides within the baseband processor circuitry.

FIG. 9B shows an embodiment 900B that includes a configurable interface according to the invention. Here, the baseband processor circuitry 120 subsumes the functionality of the receiver digital circuitry 905. The baseband processor circuitry 120 realizes the functionality of the receiver digital circuitry 905, using hardware, software, or both, as desired. Because the baseband processor circuitry 120 has subsumed the receiver digital circuitry 905, the baseband processor circuitry 120 may communicate with the receiver analog circuitry 910 using configurable interface signal lines 945, depending on the state of the control signal 915 (e.g., the PDNB signal). The configurable interface signal lines 945 perform the same functions described above in connection with FIG. 9A, depending on the state of the control signal 915. As noted above, one may reconfigure the interface signal lines 960 and 965 during transmit mode to implement desired functionality, for example, logic signals.

Figure 10:
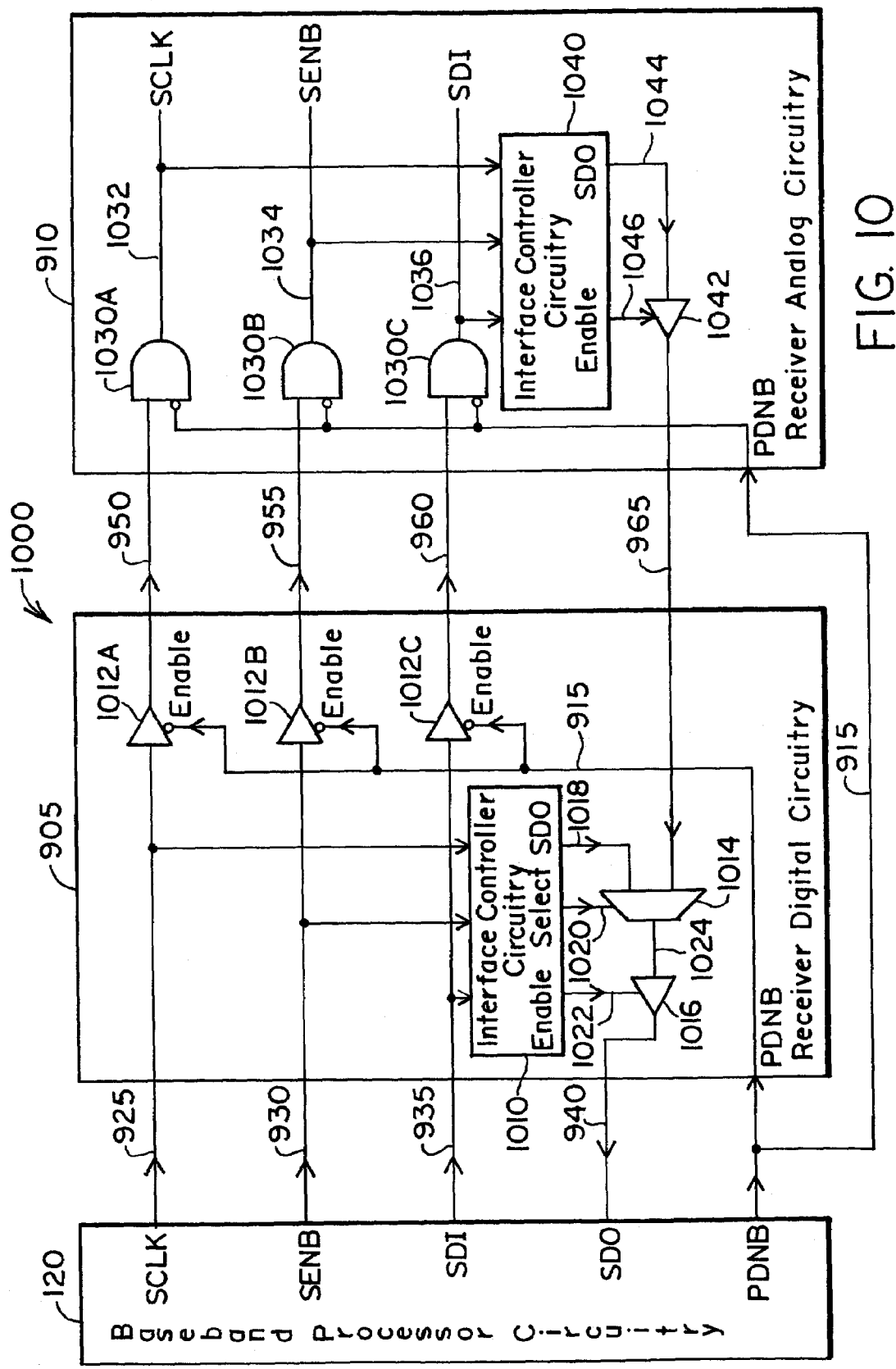
FIG. 10 illustrates a more detailed block diagram of the interface between the receiver analog circuitry and the receiver digital circuitry, with the interface configured as a serial interface.

FIG. 10 shows a conceptual block diagram of an embodiment 1000 of a configurable interface according to the invention within an RF transceiver in the power-down or serial interface mode (i.e., the control signal 915 is in a logic-low state). A logic low state on the control signal 915 enables the driver circuitry 1012A, 1012B, and 1012C, thus providing the configurable serial interface signal lines 950, 955, and 960 to the receiver analog circuitry 910. Similarly, the logic low state on the control signal 915 causes the AND gates 1030A, 1030B, and 1030C to provide configurable interface signal lines 950, 955, and 960 to other circuitry within the receiver analog circuitry 910. The outputs of the AND gates 1030A, 1030B, and 1030C comprise a gated SCLK signal 1032, a gated SENB signal 1034, and a gated SDI signal 1036, respectively.

Interface controller circuitry 1040 accepts as inputs the gated SCLK signal 1032, the gated SENB signal 1034, and the gated SDI signal 1036. The interface controller circuitry 1040 resides within the receiver analog circuitry 910 and produces a receiver analog circuitry SDO signal 1044 and an enable signal 1046. By controlling tri-state driver circuitry 1042, the enable signal 1046 controls the provision of the receiver analog circuitry SDO signal 1044 to the receiver digital circuitry 905 via the configurable interface signal line 965.

Interface controller circuitry 1010 within the receiver digital circuitry 905 accepts the SCLK signal 925, the SENB signal 930, and the SDI signal 935 from the baseband processor circuitry 120. By decoding those signals, the interface controller circuitry 1010 determines whether the baseband processor circuitry 120 intends to communicate with the receiver digital circuitry 905 (e.g., the baseband processor circuitry 120 attempts to read a status or control register present on the receiver digital circuitry 905). If so, the interface controller circuitry 1010 provides the SCLK signal 925, the SENB signal 930, and the SDI signal 935 to other circuitry (not shown explicitly) within the receiver digital circuitry 905 for further processing.

Interface controller circuitry 1010 provides as output signals a receiver digital circuitry SDO signal 1018, a select signal 1020, and an enable signal 1022. The receiver digital circuitry SDO signal 1018 represents the serial data-out signal for the receiver digital circuitry 905, i.e., the serial data-out signal that the receiver digital circuitry 905 seeks to provide to the baseband processor circuitry 120. The interface controller circuitry 1010 supplies the select signal 1020 to multiplexer circuitry 1014. The multiplexer circuitry 1014 uses that signal to selectively provide as the multiplexer circuitry output signal 1024 either the receiver digital circuitry SDO signal 1018 or the receiver analog circuitry SDO signal 1044, which it receives through configurable interface signal line 965. Tri-state driver circuitry 1016 provides the multiplexer circuitry output signal 1024 to the baseband processor circuitry 120 under the control of the enable signal 1022.

Tri-state driver circuitry 1012A, 1012B, and 1012C use an inverted version of the control signal 915 as their enable signals. Thus, a logic high value on the control signal 915 disables the driver circuitry 1012A, 1012B, and 1012C, thus disabling the serial interface between the receiver digital circuitry 905 and the receiver analog circuitry 910. Similarly, AND gates 1030A, 1030B, and 1030C use an inverted version of the control signal 915 to gate interface signal lines 950, 955, and 960. In other words, a logic high value on the control signal 915 inhibits logic switching at the outputs of AND gates 1030A, 1030B, and 1030C, which reside on the receiver analog circuitry 910.

Figure 11A:
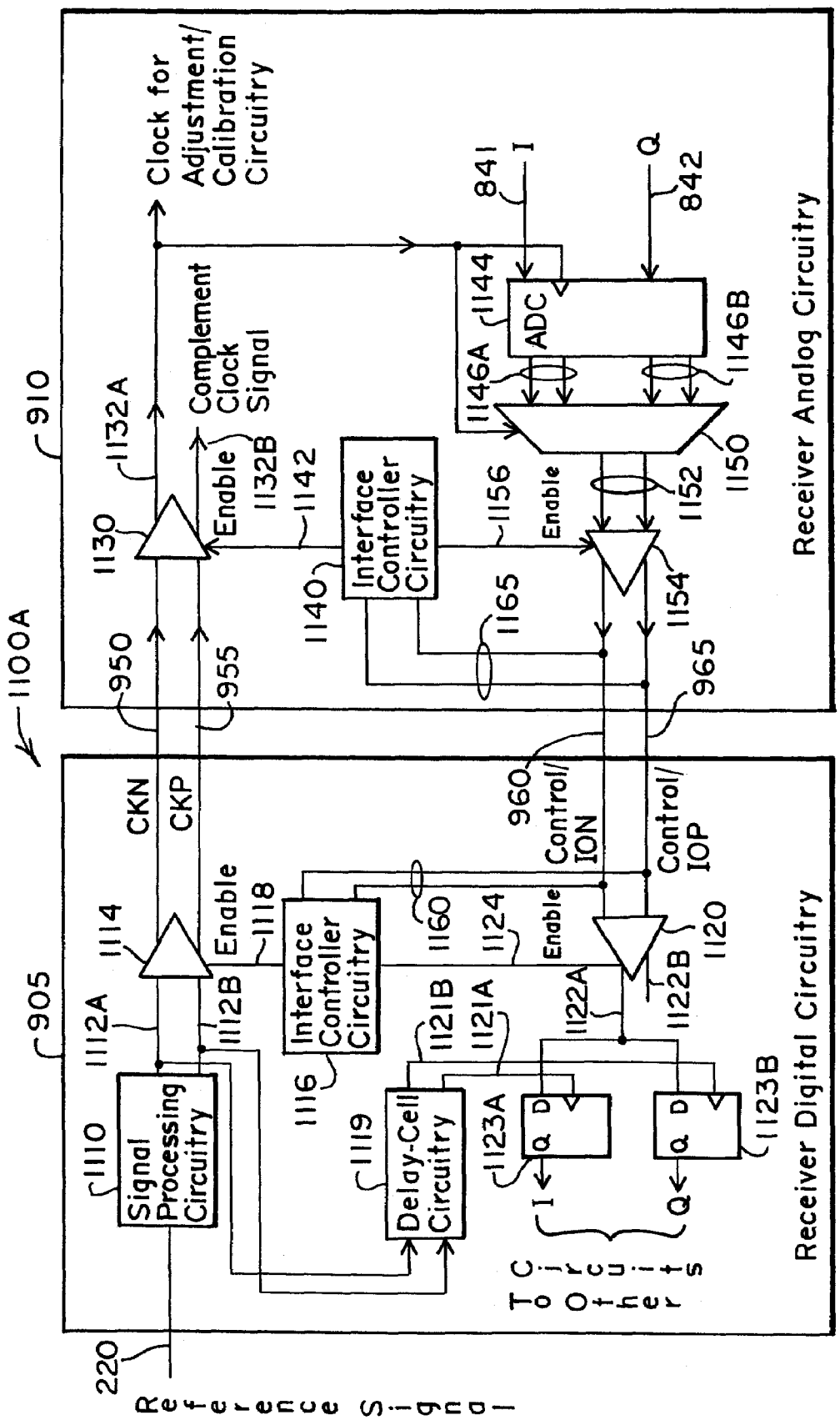
FIG. 11A shows a more detailed block diagram of an embodiment of the interface between the receiver analog circuitry and the receiver digital circuitry, with the interface configured as a data and clock signal interface.

FIG. 11A shows a conceptual block diagram of an embodiment 1100A of a configurable interface according to the invention, in an RF transceiver operating in the normal receive mode of operation (i.e., the control signal 915 is in a logic-high state). As noted above, in this mode, the receiver digital circuitry 905 provides a clock signal to the receiver analog circuitry 910 through the configurable interface signal lines 950 and 955. Configurable interface signal line 950 provides the CKN signal, whereas configurable interface signal line 955 supplies the CKP signal. Also in this mode, the receiver analog circuitry 910 provides a data signal to the receiver digital circuitry 905 through the configurable interface signal lines 960 and 965.

The receiver digital circuitry 905 provides the CKN and CKP signals to the receiver analog circuitry 910 by using clock driver circuitry 1114. The clock driver circuitry 1114 receives a clock signal 1112A and a complement clock signal 1112B from signal processing circuitry 1110. Signal processing circuitry 1110 receives the reference signal 220 and converts it to the clock signal 1112A and complement clock signal 1112B. Interface controller circuitry 1116 provides an enable signal 1118 that controls the provision of the CKN and CKP clock signals to the receiver analog circuitry 910 via the interface signal lines 950 and 955, respectively.

Receiver analog circuitry 910 includes clock receiver circuitry 1130 that receives the CKN and CKP clock signals and provides a clock signal 1132A and a complement clock signal 1132B. Interface controller circuitry 1140 within the receiver analog circuitry 910 provides an enable signal 1142 that controls the operation of the clock receiver circuitry 1130.

The clock signal 1132A clocks the ADC circuitry 1144, or other circuitry (for example, calibration circuitry), or both, as desired. Note that, rather than using the clock signal 1132A, on e may use the complement clock signal 1132B, or both the clock signal 1132A and the complement clock signal 1132B, by making circuit modifications as persons skilled who have the benefit of the description of the invention understand. The ADC circuitry 1144 provides to multiplexer circuitry 1150 a one-bit differential in-phase digital signal 1146A and a one-bit differential quadrature digital signal 1146B. The multiplexer circuitry 1150 provides a one-bit differential digital output signal 1152 to data driver circuitry 1154. The output signal 1152 therefore constitutes multiplexed I-channel data and Q-channel data. The data driver circuitry 1154 supplies the differential data signal comprising ION and IOP to the receiver digital circuitry 905, using the configurable interface signal lines 960 and 965, respectively.

The clock signal 1132A also acts as the select signal of multiplexer circuitry 1150. On alternating edges of the clock signal 1132A, the multiplexer circuitry 1150 selects, and provides to, the data driver circuitry 1154 the one-bit differential in-phase digital signal 1146A (i.e., I-channel data) and the one-bit differential quadrature digital signal 1146B (i.e., Q-channel data). The interface controller circuitry 1140 supplies an enable signal 1156 to the data driver circuitry 1154 that controls the provision of the configurable interface signal 960 and the configurable interface signal 965 to the receiver digital circuitry 905 via the configurable interface signal lines 960 and 965.

The receiver digital circuitry 905 includes data receiver circuitry 1120. Data receiver circuitry 1120 accepts from the receiver analog circuitry 910 the signals provided via the configurable interface signal lines 960 and 965. The data receiver circuitry 1120 provides a pair of outputs 1122A and 1122B. An enable signal 1124, supplied by the interface controller circuitry 1116, controls the operation of the data receiver circuitry 1120.

The receiver digital circuitry 905 also includes a delay-cell circuitry 1119 that accepts as its inputs the clock signal 1112A and the complement clock signal 1112B. The delay-cell circuitry 1119 constitutes a delay-compensation circuit. In other words, ideally, the signal-propagation delay of the delay-cell circuitry 1119 compensates for the delays the signals experience as they propagate from the receiver digital circuitry 905 to the receiver analog circuitry 910, and back to the receiver digital circuitry 905.

The delay-cell circuitry 1119 provides as its outputs a clock signal 1121A and a complement clock signal 1121B. The clock signal 1121A and the complement clock signal 1121B clock a pair of D flip-flop circuitries 1123A and 1123B, respectively. The D flip-flop circuitries 1123A and 1123B latch the output 1122A of the data receiver circuitry 1120 alternately. In other words, the clock signal 1121A causes the latching of the I-channel data by the D flip-flop circuitry 1123A, whereas the complement clock signal 1121B causes the D flip-flop circuitry 1123B to latch the Q-channel data.

The output signals of the delay-cell circuitry 1119 help the receiver digital circuitry 905 to sample the I-channel data and the Q-channel data that it receives from the receiver analog circuitry 910. The receiver digital circuitry 905 receives multiplexed I-channel data and the Q-channel data through the ION signal 960 and the IOP signal 965. Thus, the D flip-flop circuitries 1123A and 1123B perform a de-multiplexing function on the multiplexed I-channel data and Q-channel data.

In the normal receive or transmit modes, (i.e., the control signal 915 is in the logic-high state), interface signal line 950 provides the negative clock signal (CKN) and interface signal line 955 supplies the positive clock signal (CKP). In preferred embodiments of the invention, the CKN and CKP signals together form a differential clock signal that the receiver digital circuitry 905 provides to the receiver analog circuitry 910.

During the receive mode, interface signal line 960 provides the negative data signal (ION), whereas interface signal line 965 supplies the positive data signal (IOP). The ION and IOP signals preferably form a differential data signal.

In the transmit mode, the data signal may function as an input/output signal to communicate data, status, information, flag, and/or configuration signals between the receiver digital circuitry 905 and the receiver analog circuitry 910. Preferably, the interface signal lines 960 and 965 function as two logic signal lines in the transmit mode. As noted above, the transceiver disables the receiver circuitry during the transmit mode of operation. In RF transceivers partitioned according to the invention (see, e.g., FIGS. 2A–2D, 4, and 8), the clock receiver circuitry 1130 may provide the clock signal 1132A, the complement clock signal 1132B, or both, to transmitter circuitry (partitioned together with the receiver analog circuitry 910) for circuit calibration, circuit adjustment, and the like, as described above.

In the transmit mode, once circuit calibration and adjustment has concluded, however, the clock driver circuitry 1114 uses the enable signal 1118 to inhibit the propagation of the CKN and CKP clock signals to the receiver analog circuitry 910. In this manner, the clock driver circuitry 1114 performs the function of the switch 492 in FIGS. 4 and 8. Note that, during the normal transmit mode of operation, the ADC circuitry 1144 does not provide any data to the receiver digital circuitry 905 via the ION and IOP signals because, according to the TDD protocol, the receiver path circuitry is inactive during the normal transmit mode of operation. Instead, the receiver digital circuitry 905 provides control signals to the receiver analog circuitry 910 via interface signal lines 960 and 965.

During the transmit mode, the interface controller circuitry 1116 provides control signals via signal lines 1160 to the interface signal lines 960 and 965. The interface controller circuitry 1140 receives the control signals via signal lines 1165 and provides them to various blocks within the receiver analog circuitry, as desired. During the receive mode, the interface controller circuitry 1116 inhibits (e.g., high-impedance state) the signal lines 1160. Similarly, the interface controller circuitry 1140 inhibits the signal lines 1165 during the receive mode.

For the purpose of conceptual illustration, FIG. 1A shows the interface controller circuitry 1116 and the interface controller circuitry 1140 as two blocks of circuitry distinct from the interface controller circuitry 1010 and the interface controller circuitry 1040 in FIG. 10, respectively. One may combine the functionality of the interface controller circuitry 1116 with the functionality of the interface controller circuitry 1010, as desired. Likewise, one may combine the functionality of interface controller circuitry 1140 with the functionality of the interface controller circuitry 1040, as desired. Moreover, one may combine the functionality of the signal processing circuitries 1110 with the functionality of the interface controller circuitry 1116 and the interface controller circuitry 1140, respectively. Combining the functionality of those circuits depends on various design and implementation choices, as persons skilled in the art understand.

Figure 11B:
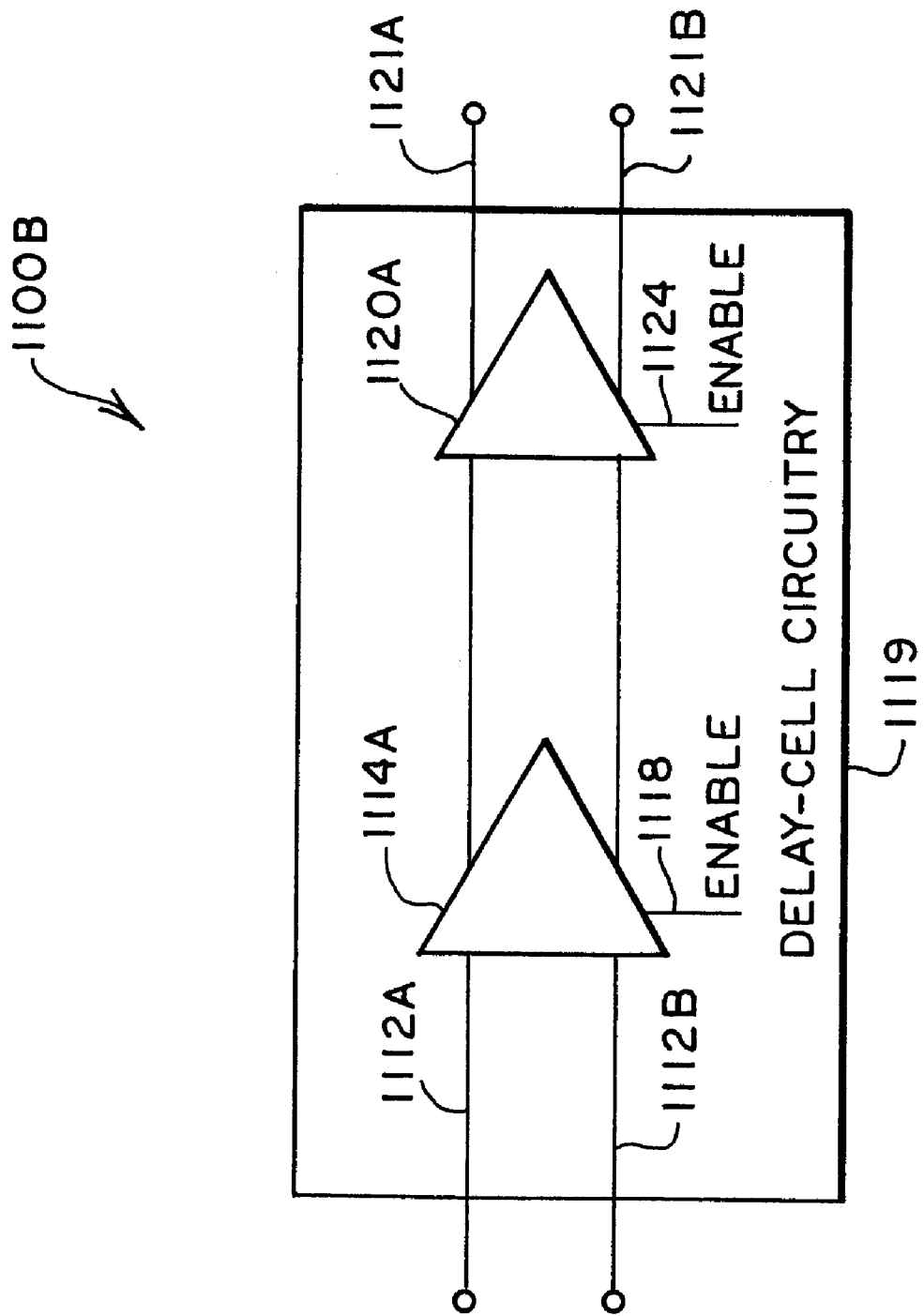
FIG. 11B illustrates a block diagram of an embodiment of a delay-cell circuitry that includes a clock driver circuitry in tandem with a clock receiver circuitry.

FIG. 11B illustrates a block diagram of a preferred embodiment 1100B of a delay-cell circuitry 1119 according to the invention. The delay-cell circuitry 1119 includes a replica of the clock driver circuitry 1114A in tandem with a replica of the data receiver circuitry 1120A. In other words, the block labeled "1114A" is a replica of the clock driver circuitry 1114, and the block labeled "1120A" is a replica of the data receiver circuitry 1120. (Note that the delay-cell circuitry 1119 may alternatively include a replica of the data driver circuitry 1154 in tandem with a replica of the clock receiver circuitry 1130.) The replica of the clock driver circuitry 1114A accepts the clock signal 1112A and the complement clock signal 1112B. The replica of the clock driver circuitry 1114A provides its outputs to the replica of the data receiver circuitry 1120A. The replica of the data receiver circuitry 1120A supplies the clock signal 1121A and the complement clock signal 1121B. The clock signal 1121A and the complement clock signal 1121B constitute the output signals of the delay-cell circuitry 1119. The delay-cell circuitry 1119 also receives as inputs enable signals 1118 and 1124 (note that FIG. 11A does not show those input signals for the sake of clarity). The enable signal 1118 couples to the replica of the clock driver circuitry 1114A, whereas the enable signal 1124 couples to the replica of the data receiver circuitry 1120A.

Note that FIG. 11B constitutes a conceptual block diagram of the delay-cell circuitry 1119. Rather than using distinct blocks 1114A and 1120A, one may alternatively use a single block that combines the functionality of those two blocks, as desired. Moreover, one may use a circuit that provides an adjustable, rather than fixed, delay, as desired. Note also that the embodiment 1100B of the delay-cell circuitry 1119 preferably compensates for the delay in the clock driver circuitry 1114 in FIG. 11A. In other words, the delay-cell circuitry 1119 preferably compensates sufficiently for the round-trip delay in the signals that travel from the receiver digital circuitry 905 to the receiver analog circuitry 910 and back to the receiver digital circuitry 905 to allow for accurate sampling in the receiver digital circuitry of the I-channel data and the Q-channel data. Note that in the embodiment 1100B, the replica of the clock driver circuitry 1114A mainly compensates for the round-trip delay, whereas the replica of the data receiver circuitry 1120A converts low-swing signals at the output of the replica of the clock driver circuitry 1114A into full-swing signals.

The receiver digital circuitry 905 and the receiver analog circuitry 910 preferably reside within separate integrated-circuit devices. Because those integrated-circuit devices typically result from separate semiconductor fabrication processes and manufacturing lines, their process parameters may not match closely. As a result, the preferred embodiment 1100B of the delay-cell circuitry 1119 does not compensate for the delay in the clock receiver circuitry 1130, the data driver circuitry 1154, and the data receiver circuitry 1120 in FIG. 11A.

Note, however, that if desired, the delay-cell circuitry 1119 may also compensate for the signal delays of the clock receiver circuitry 1130, the data driver circuitry 1154, and the data receiver circuitry 1120. Thus, in situations where one may match the process parameters of the receiver digital circuitry 905 and the receiver analog circuitry 910 relatively closely (for example, by using thick-film modules, silicon-on-insulator, etc.), the delay-cell circuitry 1119 may also compensate for the delays of other circuit blocks. As another alternative, one may use a delay-cell circuitry 1119 that provides an adjustable delay and then program the delay based on the delays in the receiver digital circuitry 905 and the receiver analog circuitry 910 (e.g., provide a matched set of receiver digital circuitry 905 and receiver analog circuitry 910), as persons skilled in the art who have the benefit of the description of the invention understand. Furthermore, rather than an open-loop arrangement, one may use a closed-loop feedback circuit implementation (e.g., by using a phase-locked loop circuitry) to control and compensate for the delay between the receiver analog circuitry 910 and the receiver digital circuitry 905, as desired.

Note that the digital circuit blocks shown in FIGS. 11A and 11B depict mainly the conceptual functions and signal flow. The actual circuit implementation may or may not contain separately identifiable hardware for the various functional blocks. For example, one may combine the functionality of various circuit blocks into one circuit block, as desired.

Figure 12:
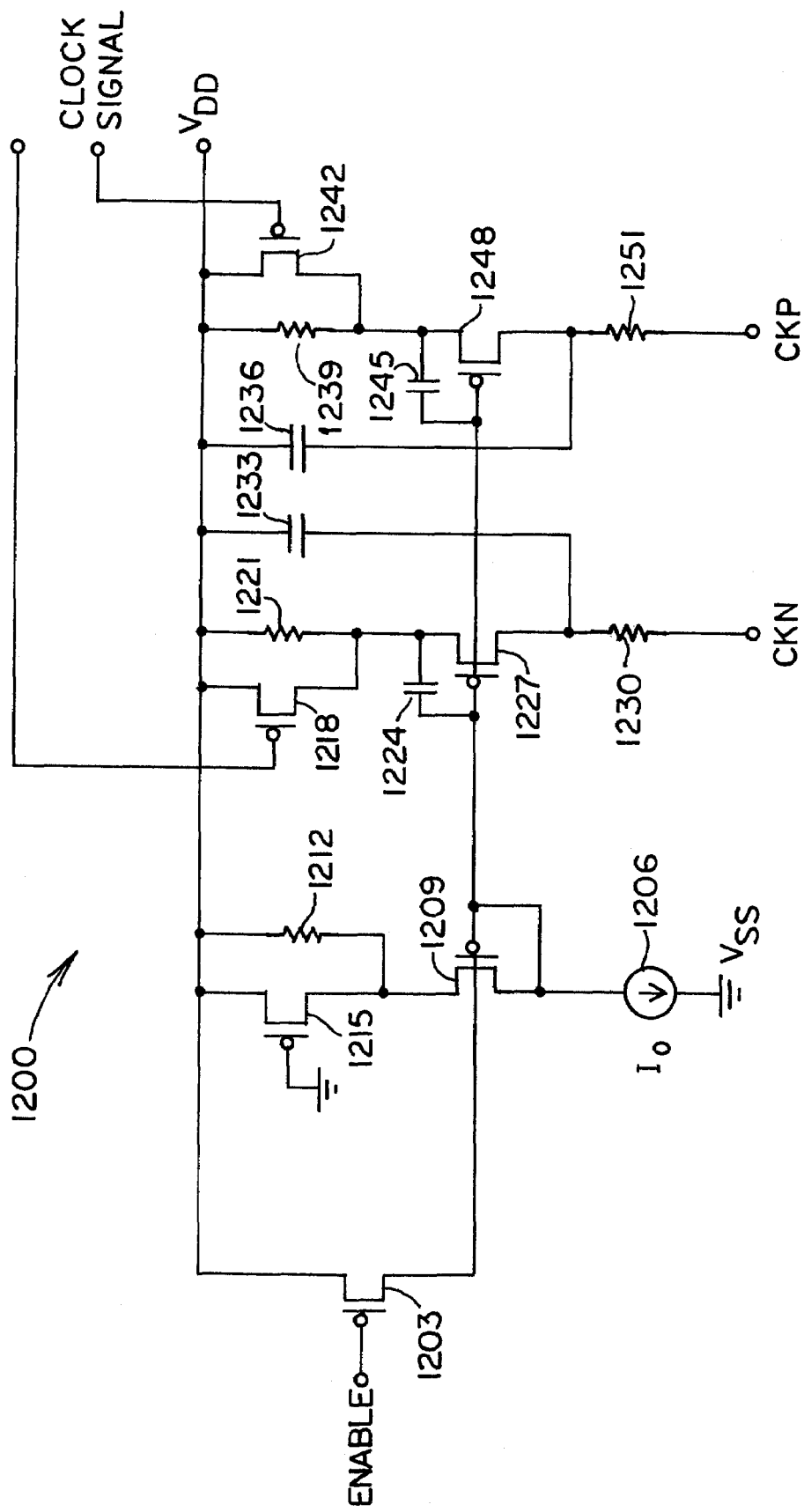
FIG. 12 depicts a schematic diagram of an embodiment of a signal-driver circuitry used to interface the receiver analog circuitry and the receiver digital circuitry according to the invention.

FIG. 12 shows a schematic diagram of a preferred embodiment 1200 of a signal-driver circuitry according to the invention. One may use the signal-driver circuitry as the clock driver circuitry 1114 and the data driver circuitry 1154 in FIG. 11A. In the latter case, the input signals to the signal-driver circuitry constitute the output signals 1152 and the enable signal 1156, whereas the output signals of the signal-receiver circuitry constitute the ION and IOP signals 960 and 965, respectively, in FIG. 11A.

The signal-driver circuitry in FIG. 12 constitutes two circuit legs. One circuit leg includes MOSFET devices 1218 and 1227 and resistor 1230. The second leg includes MOSFET devices 1242 and 1248 and resistor 1251. The input clock signal controls MOSFET devices 1218 and 1242. Current source 1206, MOSFET devices 1209 and 1215, and resistor 1212 provide biasing for the two circuit legs.

MOSFET devices 1227 and 1248 drive the CKN and CKP output terminals through resistors 1230 and 1251, respectively. Depending on the state of the clock signal, one leg of the signal-driver circuitry conducts more current than the other leg. Put another way, the signal-driver circuitry steers current from one leg to the other in response to the clock signal (i.e., in response to the clock signal, one leg of the circuit turns on and the other leg turns off, and vice-versa). As a result, the signal-driver circuitry provides a differential clock signal that includes current signals CKN and CKP.

If the enable signal is high, MOSFET device 1203 is off and therefore does not affect the operation of the rest of the circuit. In that case, a current $I_o$ flows through the current source 1206 and diode-connected MOSFET device 1209. The flow of current generates a voltage at the gate of MOSFET device 1209. MOSFET devices 1227 and 1248 share the same gate connection with MOSFET device 1209. Thus, MOSFET devices 1227 and 1248 have the same gate-source voltage, $V_{gs}$, as MOSFET device 1209 when the appropriate MOSFET devices are in the on state.

MOSFET devices 1218 and 1242 cause current steering between the first and second circuit legs. Only one of the MOSFET devices 1218 and 1242 is in the on state during the operation of the circuit. Depending on which MOSFET device is in the on state, the mirroring current $I_o$ flows through the circuit leg that includes the device in the on state.

Resistors 1221 and 1239 provide a small trickle current to the circuit leg that includes the MOSFET device (i.e., MOSFET device 1218 or MOSFET device 1242) that is in the off state. The small trickle current prevents the diode-connected MOSFET devices in the signal receiver circuitry (see FIG. 13) from turning off completely. The trickle current helps to reduce the delay in changing the state of the circuit in response to transitions in the input clock signal. The trickle currents also help to reduce transient signals at the CKP and CKN terminals and, thus, reduce interference effects.

Capacitors 1224 and 1245 provide filtering so that when MOSFET device 1218 and MOSFET device 1242 switch states, the currents through the first and second circuit legs (CKN and CKP circuit legs) do not change rapidly. Thus, capacitors 1224 and 1245 reduce the high-frequency content in the currents flowing through the circuit legs into the CKN and CKP terminals. The reduced high-frequency (i.e., band-limited) content of the currents flowing through the CKN and CKP terminals helps reduce interference effects to other parts of the circuit, for example, the LNA circuitries, as described above. Capacitors 1233 and 1236 and resistors 1230 and 1251 help to further reduce the high-frequency content of the currents flowing through the CKN and CKP terminals. Thus, the circuit in FIG. 12 provides smooth steering of current between the two circuit legs and therefore reduces interference effects with other circuitry.

When the enable signal goes to the low state, MOSFET device 1203 turns on and causes MOSFET device 1209 to turn off. MOSFET devices 1227 and 1248 also turn off, and the circuit becomes disabled. Note that the enable signal may be derived from the power-down PDNB signal.

Figure 13A:
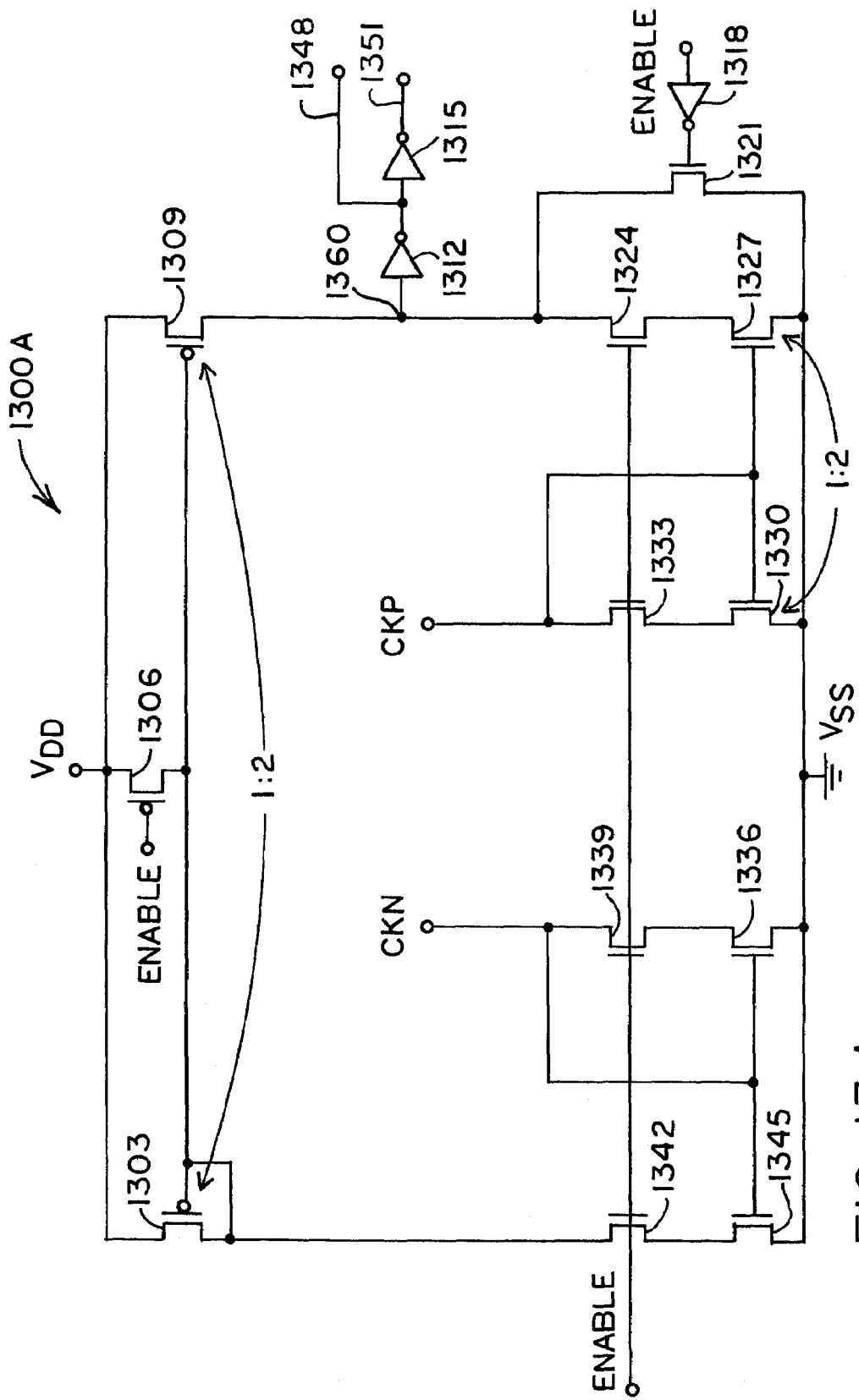
FIGS. 13A and 13B illustrate schematic diagrams of embodiments of signal-receiver circuitries used to interface the receiver analog circuitry and the receiver digital circuitry according to the invention.

FIG. 13A shows a schematic diagram of an exemplary embodiment 1300A of a signal-receiver circuitry according to the invention. One may use the signal-receiver circuitry as the clock receiver circuitry 1130 and the data receiver circuitry 1120 in FIG. 11A. In the latter case, the input signals to the signal-receiver circuitry constitute the ION and IOP signals 960 and 965 and the enable signal 1124, whereas the output signals constitute the signals at the outputs 1122A and 1122B, respectively, in FIG. 11A.

The signal receiver circuitry in FIG. 13A helps to convert differential input currents into CMOS logic signals. The signal-receiver circuitry in FIG. 13A constitutes two circuit legs. The first circuit leg includes MOSFET devices 1303, 1342, and 1345. The second leg includes MOSFET devices 1309, 1324, and 1327. Note that, preferably, the scaling of MOSFET devices 1303 and 1309 provides a current gain of 1:2 between them. Likewise, the scaling of MOSFET devices 1330 and 1327 preferably provides a current gain of 1:2 between them. The current gains help to reduce phase noise in the signal-receiver circuitry.

MOSFET devices 1339, 1342, 1333, and 1324 provide enable capability for the circuit. When the enable input is in the high state, MOSFET devices 1339, 1342, 1333, and 1324 are in the on state. MOSFET devices 1345 and 1336 are current mirrors, as are MOSFET devices 1303 and 1309. MOSFET devices 1330 and 1327 also constitute current mirrors.

The currents flowing through the CKN and CKP terminals mirror to the MOSFET devices 1327 and 1309. The actual current flowing through the second circuit leg depends on the currents that MOSFET device 1327 and MOSFET device 1309 try to conduct; the lower of the two currents determines the actual current that flows through the second circuit leg.

The difference between the currents that MOSFET device 1327 and MOSFET device 1309 try to conduct flows through the parasitic capacitance at node 1360. The current flow charges or discharges the capacitance at node 1360, thus making smaller the drain-source voltage ($V_{ds}$) of whichever of MOSFET devices 1327 and 1309 that seeks to carry the higher current. Ultimately, the lower of the currents that MOSFET devices 1327 and 1309 seek to conduct determines the current through the second leg of the circuit.

A pair of inverters 1312 and 1315 provide true and complement output signals 1351 and 1348, respectively. The signal receiver circuitry therefore converts differential input currents into CMOS logic output signals.

Figure 13B:
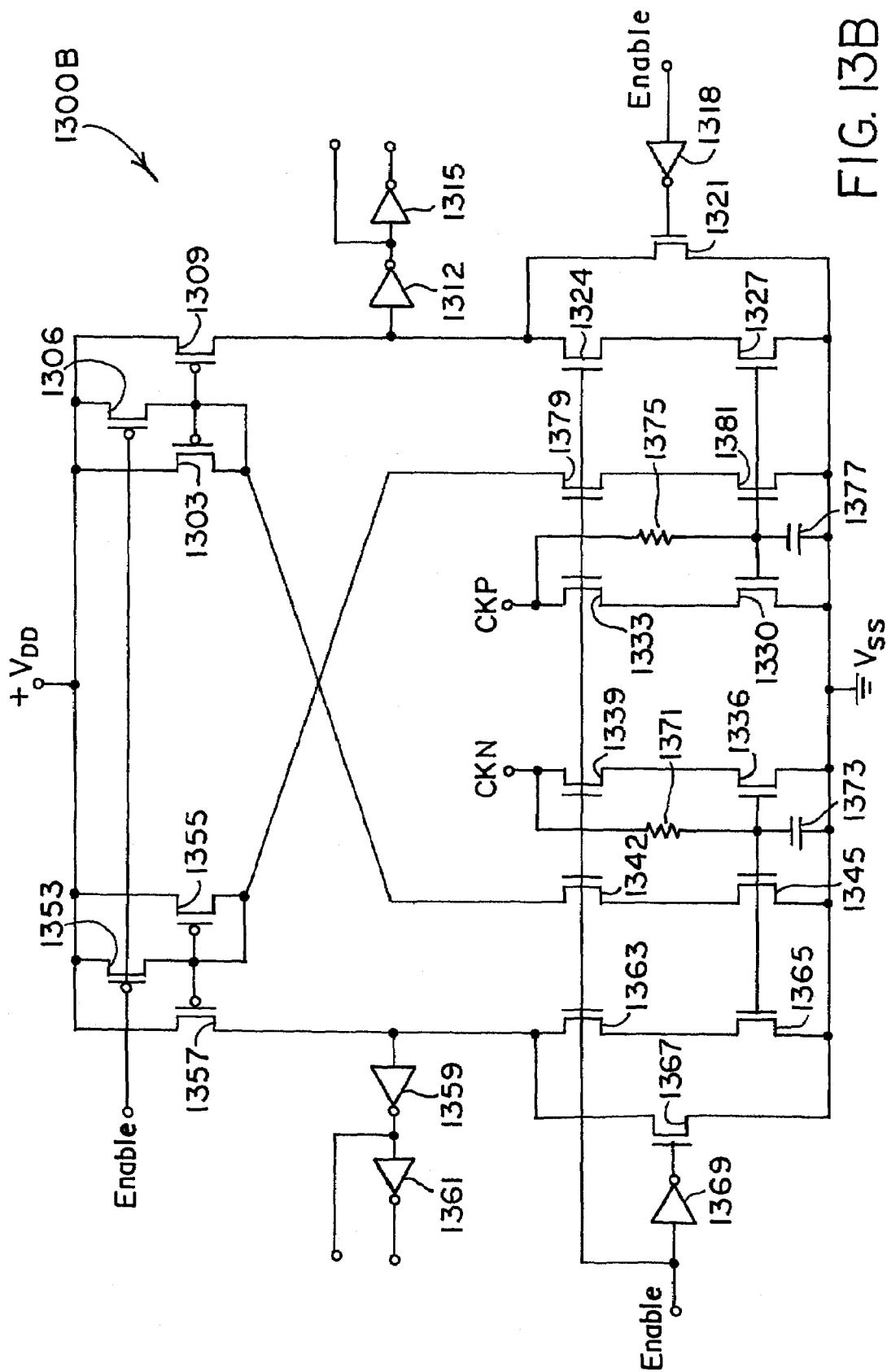

In exemplary embodiments of the invention, the signal receiver circuitry provides fully differential output signals. FIG. 13B shows an embodiment 1300B of such a signal receiver circuitry. One may use embodiment 1300B in a similar manner and application as embodiment 1300A, using the same input signals, as desired. Unlike embodiment 1300A, however, embodiment 1300B includes fully differential circuitry to generate fully differential output signals.

Embodiment 1300B includes the same devices as does embodiment 1300A, and the common devices operate in a similar manner. Furthermore, embodiment 1300B includes additional devices and components. Embodiment 1300B constitutes two circuit legs and replica of those circuit legs. The first circuit leg includes MOSFET devices 1303, 1342, and 1345. The replica of the first circuit leg includes devices 1355, 1379, and 1381. The second circuit leg includes MOSFET devices 1309, 1324, and 1327. The replica of the second circuit leg include devices 1357, 1363, and 1365. The scaling of MOSFET devices 1303 and 1309 provides a current gain of 1:2 between them, as does the scaling of MOSFET devices 1330 and 1327. Likewise, scaling of MOSFET devices 1355 and 1357 provides a current gain of 1:2 between them, as does the scaling of MOSFET devices 1336 and 1365. The current gains help to reduce phase noise in the signal-receiver circuitry.

Embodiment 1300B generally operates similarly to embodiment 1300A. Devices 1381, 1379, 1355, 1353, 1357, 1363, 1365, 1367, 1369, 1359, and 1361 perform the same functions as do devices 1345, 1342, 1303, 1306, 1309, 1324, 1327, 1321, 1318, 1312, and 1315, respectively. The enable function also operates similarly to embodiment 1300A. Resistors 1371 and 1375 and capacitors 1373 and 1377 filter the input clock (e.g., 13 MHz clock). Inverters 1312, 1315, 1361, and 1359 provide fully differential true and complement output signals.

Figure 14:
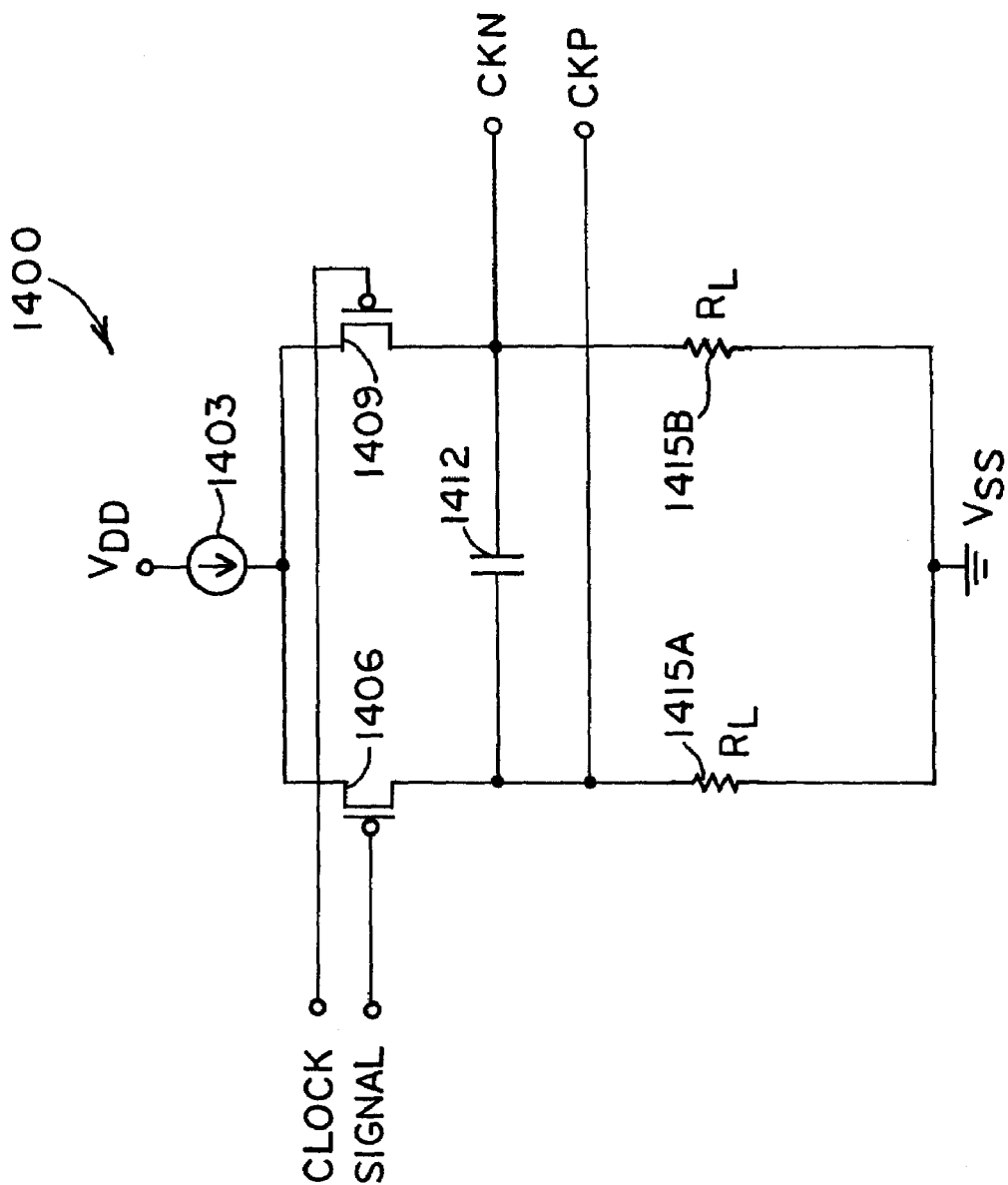
FIG. 14 shows a schematic diagram of another signal-driver circuitry that one may use to interface the receiver analog circuitry and the receiver digital circuitry according to the invention.

FIG. 14 shows an embodiment 1400 of an alternative signal-driver circuitry according to the invention. The signal-driver circuitry in FIG. 14 includes two circuit legs. The first circuit leg includes MOSFET device 1406 and resistor 1415A. The second circuit leg includes MOSFET device 1409 and resistor 1415B. A current source 1403 supplies current to the two circuit legs.

The input clock signal controls MOSFET devices 1406 and 1409. MOSFET devices 1406 and 1409 drive the CKP and CKN output terminals, respectively. Depending on the state of the clock signal, one leg of the signal-driver circuitry conducts current. Put another way, the signal-driver circuitry steers current from one leg to the other in response to the clock signal. As a result, the signal-driver circuitry provides a differential clock signal that includes signals CKN and CKP. Capacitor 1412 filters the output signals CKN and CKP. Put another way, capacitor 1412 provides band-limiting of the output signals CKN and CKP. Note that the current source 1403 supplies limited-amplitude signals by providing current through resistors 1415A and 1415B.

Note that the signal-driver circuitries (clock driver and data driver circuitries) according to the invention preferably provide current signals CKN and CKP. Similarly, signal-receiver circuitries (clock receiver and data receiver circuitries) according to the invention preferably receive current signals. As an alternative, one may use signal-driver circuitries that provide as their outputs voltage signals, as desired. One may also implement signal-receiver circuitries that receive voltage signals, rather than current signals. As noted above, depending on the application, one may limit the frequency contents of those voltage signals, for example, by filtering, as desired.

Generally, several techniques exist for limiting noise, for example, digital switching-noise, in the interface between the receiver analog circuitry and the receiver digital circuitry according to the invention. Those techniques include using differential signals, using band-limited signals, and using amplitude-limited signals. RF apparatus according to the invention may use any or all of those techniques, as desired. Furthermore, one may apply any or all of those techniques to interface circuitry that employs voltage or current signals, as persons of ordinary skill in the art who have the benefit of the description of the invention understand.

Note also that the RF transceiver embodiments according to the invention lend themselves to various choices of circuit implementation, as a person skilled in the art who have the benefit of the description of the invention understand. For example, as noted above, each of the circuit partitions, or circuit blocks, of RF transceivers partitioned according to the invention, resides preferably within an integrated circuit device. Persons skilled in the art, however, will appreciate that the circuit partitions, or circuit blocks, may alternatively reside within other substrates, carriers, or packaging arrangements. By way of illustration, other partitioning arrangements may use modules, thin-film modules, thick-film modules, isolated partitions on a single substrate, circuit-board partitions, and the like, as desired, consistent with the embodiments of the invention described here.

One aspect of the invention contemplates partitioning RF transceivers designed to operate within several communication channels (e.g., GSM, PCS, and DCS). Persons skilled in the art, however, will recognize that one may partition according to the invention RF transceivers designed to operate within one or more other channels, frequencies, or frequency bands, as desired.

Moreover, the partitioning of RF transceivers according to the invention preferably applies to RF apparatus (e.g., receivers or transceivers) with a low-IF, digital-IF architecture. Note, however, that one may apply the partitioning and interfacing concepts according to the invention to other RF receiver or transceiver architectures and configurations, as persons of ordinary skill in the art who have the benefit of the description of the invention understand. By way of illustration, one may use the partitioning and interface concepts according to the invention in RF apparatus that includes:

low-IF receiver circuitry;

low-IF receiver circuitry and offset-PLL transmitter circuitry;

low-IF receiver circuitry and direct up-conversion transmitter circuitry;

direct-conversion receiver circuitry;

direct-conversion receiver circuitry and offset-PLL transmitter circuitry; or direct-conversion receiver circuitry and direct up-conversion transmitter circuitry.

As an example of the flexibility of the partitioning concepts according to the invention, one may include the LO circuitry in one partition, the receiver digital circuitry in a second partition, and the transmitter up-converter circuitry and the receiver analog circuitry in a third partition. As another illustrative alternative, one may include the LO circuitry and the transmitter up-converter circuitry within one circuit partition, depending on the noise and interference characteristics and specifications for a particular implementation.

Note that, in a typical direct-conversion RF receiver or transceiver implementation, the receiver digital circuitry would not include the digital down-converter circuitry (the receiver analog circuitry, however, would be similar to the embodiments described above). Furthermore, in a typical direct up-conversion transmitter circuitry, one would remove the offset PLL circuitry and the transmit VCO circuitry from the transmitter circuitry. The LO circuitry would supply the RF LO signal to the up-conversion circuitry of the transmitter circuitry, rather than the offset-PLL circuitry. Also, in a direct up-conversion implementation, the LO circuitry typically does not provide an IF LO signal.

Furthermore, as noted above, one may use the partitioning and interface concepts according to the invention not only in RF transceivers, but also in RF receivers for high-performance applications. In such RF receivers, one may partition the receiver as shown in FIGS. 2A–2D and 4–8, and as described above. In other words, the RF receiver may have a first circuit partition that includes the receiver analog circuitry, and a second circuit partition that includes the receiver digital circuitry.

The RF receiver may also use the digital interface between the receiver analog circuitry and the receiver digital circuitry, as desired. By virtue of using the receiver analog circuitry and the receiver digital circuitry described above, the RF receiver features a low-IF, digital-IF architecture. In addition, as noted above with respect to RF transceivers according to the invention, depending on performance specifications and design goals, one may include all or part of the local oscillator circuitry within the circuit partition that includes the receiver analog circuitry, as desired. Partitioning RF receivers according to the invention tends to reduce the interference effects between the circuit partitions.

As noted above, although RF apparatus according to the invention use a serial interface between the receiver analog circuitry and the receiver digital circuitry, one may use other types of interface, for example, parallel interfaces, that incorporate different numbers of signal lines, different types and sizes of signals, or both, as desired. Moreover, the clock driver circuitries and the data driver circuitries may generally constitute signal-driver circuitries that one may use in a variety of digital interfaces between the receiver analog circuitry and the receiver digital circuitry according to the invention.

Likewise, the clock receiver circuitries and data receiver circuitries may generally constitute signal-receiver circuitries that one may use in a variety of digital interfaces between the receiver analog circuitry and the receiver digital circuitry according to the invention. In other words, one may use signal-driver circuitries and signal-receiver circuitries to implement a wide variety of digital interfaces, as persons of ordinary skill who have the benefit of the description of the invention understand.

Another aspect of RF apparatus according to the invention relates to reduction or cancellation of DC offsets. DC offsets typically arise in the front-end analog circuitry of RF receivers and transceivers. DC offsets result from non-ideal circuit behavior. In an ideal circuit, all components match and therefore produce no DC offset. In a real implementation of a circuit, however, characteristics of various components, such as transistors, do not match perfectly. The component mismatches give rise to circuit imbalances and, hence, DC offsets. Self mixing in a local-oscillator circuitry, such as LO circuitry 222 in FIGS. 2–8, may also contribute to DC offsets. Regardless of its source, DC offset may degrade the performance of the RF apparatus.

The front-end circuitry of an RF receiver or the front-end circuitry of the receiver portion of an RF transceiver typically receives relatively small desired signals, sometimes on the order of micro-volts. The presence of DC offsets may mask the desired signal, thus making its proper detection difficult or even impossible. DC offset reduction according to the invention operates in the presence of interference signals (e.g., interferers and blockers) and the desired signal.

To reduce or cancel DC offsets, RF apparatus according to the invention use two complementary techniques. First, the RF apparatus according to the invention include a DC offset reduction circuitry within the analog receiver circuitry. The DC offset reduction circuitry tends to reduce the DC offsets to relatively small levels. Residual amounts of DC offset, however, may transmit to the output signals of the receiver analog circuitry and therefore appear within the receiver digital circuitry. To combat the residual offsets, RF apparatus according to the invention also include residual offset reduction circuitry within the receiver digital circuitry. Concurrently filed, commonly owned U.S. patent application Ser. No. 10/075,099, titled "Notch Filter for Residual Offset Reduction in Radio-Frequency Apparatus and Associated Methods," referenced above, describes in detail the residual offset reduction in the receiver digital circuitry.

Figure 15:
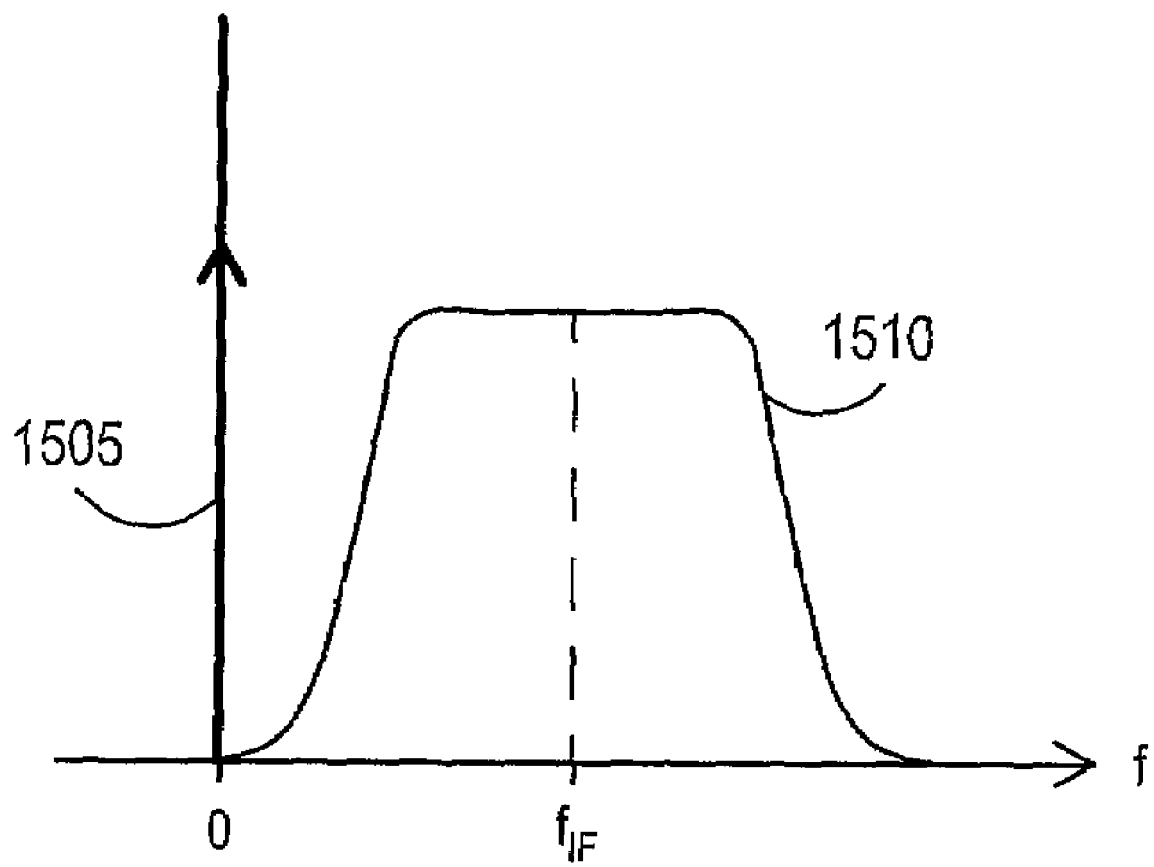
FIG. 15 depicts a typical spectrum of the input signals of the ADC circuitry in exemplary embodiments of the invention.

DC offset reduction circuitry in the analog receiver circuitry tends to reduce the DC offsets to a level that does not dominate the dynamic range of the ADC circuitry. FIG. 15 shows a typical spectrum of the input signals of the ADC circuitry in exemplary embodiments of the invention, which includes a DC offset 1505. The DC offset 1505 appears as a component at zero frequency, or DC. In exemplary embodiments, the desired signal 1510 centers around the IF frequency (100 kHz), $f_{IF}$, and occupies a spectrum between DC and $2f_{IF}$ (i.e., between 0 and 200 kHz).

One may filter the DC offset by using a high-pass filter circuitry. RF apparatus according to the invention use DC offset reduction circuitry that forms a feedback loop in a circuit arrangement that includes the ADC circuitry. The DC offset reduction circuitry acts to subtract the DC offset from the input signals of the ADC circuitry. As a result, the DC offset reduction circuitry tends to reduce the DC component at the outputs of the ADC circuitry. Consequently, the overall circuit arrangement realizes a high-pass filter that tends to reduce the DC offsets.

FIGS. 16–18 illustrate conceptual block diagrams of several exemplary embodiments of the invention. In the figures, the in-phase and quadrature digital receive signals 421A and 424A constitute single-ended versions of the one-bit in-phase and quadrature digital receive signals 421 and 424, respectively. Furthermore, the figures include a DC offset reduction circuitry 1610, which has in-phase and quadrature output signals 1615 and 1620, respectively. The in-phase and quadrature output signals 1615 and 1620, respectively, of the DC offset reduction circuitry 1610 constitute an estimate of the DC offset. Subtracting the estimated DC offset from the input signals tends to reduce the DC offset.

Figure 16A:
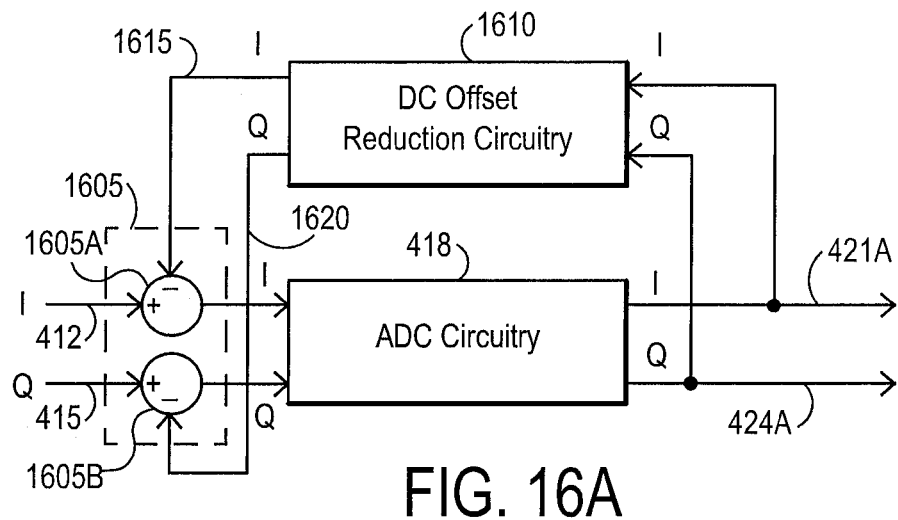
FIGS. 16A–16C illustrate conceptual block diagrams of several exemplary embodiments of the invention.

FIG. 16A depicts a circuit arrangement suitable for use in exemplary embodiments of the invention, such as the embodiment shown in FIG. 4. The circuit arrangement in FIG. 16A includes combiner circuitry 1605, ADC circuitry 418, and DC offset reduction circuitry 1610. The DC offset reduction circuitry 1610 receives the in-phase digital receive signal 421A and the quadrature digital receive signal 424A. The DC offset reduction circuitry 1610 provides an in-phase output signal 1615 and a quadrature output signal 1620 to combiner circuitry 1605.

Combiner circuitry 1605 includes an in-phase subtracter circuitry 1605A and a quadrature subtracter circuitry 1605B. Subtracter circuitry 1605A subtracts the in-phase output signal 1615 of the DC offset reduction circuitry from the in-phase analog down-converted signal 412 and provides the result to the in-phase input of the ADC circuitry 418. Similarly, subtracter circuitry 1605B subtracts the quadrature output signal 1620 of the DC offset reduction circuitry from the quadrature analog down-converted signal 415 and provides the difference to the quadrature input of the ADC circuitry 418.

Figure 16B:
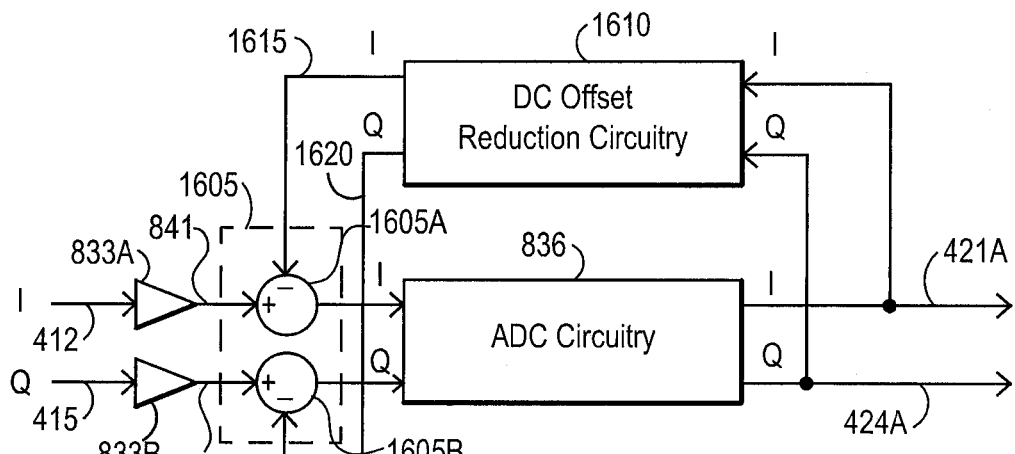
Figure 16C:
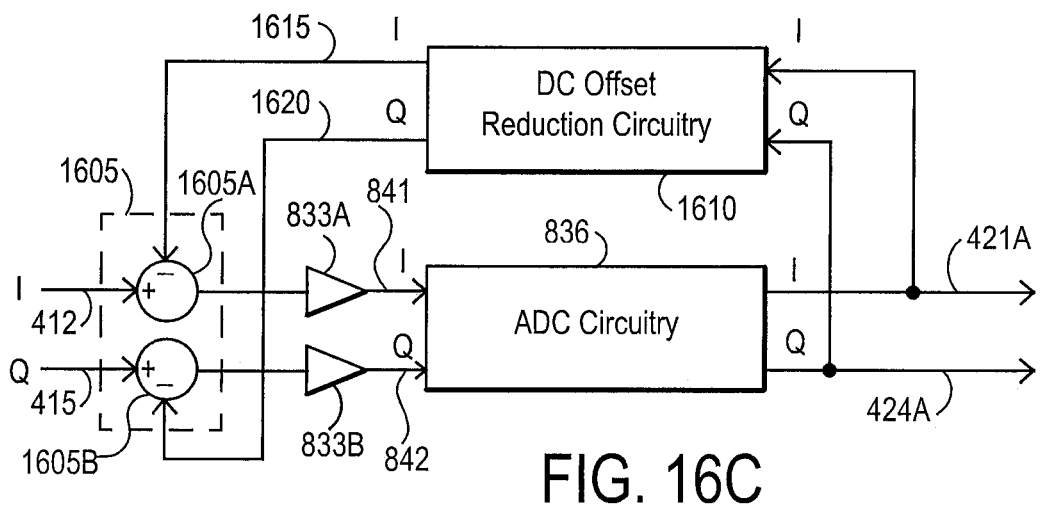

FIGS. 16B and 16C illustrate circuit arrangements suitable for use in other exemplary embodiments of the invention, such as the embodiment shown in FIG. 8. The circuit arrangement in FIG. 16B includes combiner circuitry 1605, ADC circuitry 836, and DC offset reduction circuitry 1610. In addition, the circuit arrangement includes PGAs 833A and 833B. The DC offset reduction circuitry 1610 receives the in-phase digital receive signal 421A and the quadrature digital receive signal 424A. The DC offset reduction circuitry 1610 provides in-phase output signal 1615 and quadrature output signal 1620 to combiner circuitry 1605. PGA 833A receives the in-phase analog down-converted signal 412 and provides the analog in-phase amplified signal 841 to combiner circuitry 1605. PGA 833B accepts the quadrature analog down-converted signal 415 and outputs the analog quadrature amplified signal 842 to combiner circuitry 1605.

Combiner circuitry 1605 includes in-phase subtracter circuitry 1605A and quadrature subtracter circuitry 1605B. Subtracter circuitry 1605A subtracts the in-phase output signal 1615 of the DC offset reduction circuitry from the analog in-phase amplified signal 841 and provides the result to the in-phase input of the ADC circuitry 836. Similarly, subtracter circuitry 1605B subtracts the quadrature output signal 1620 of the DC offset reduction circuitry from the analog quadrature amplified signal 842 and provides the difference to the quadrature input of the ADC circuitry 836.

FIG. 16C illustrates another circuit arrangement suitable for use in exemplary embodiments of the invention, such as the embodiment shown in FIG. 8. The circuit arrangement in FIG. 16C includes combiner circuitry 1605, ADC circuitry 836, and DC offset reduction circuitry 1610. Furthermore, the circuit arrangement includes PGAs 833A and 833B. The DC offset reduction circuitry 1610 receives the in-phase digital receive signal 421A and the quadrature digital receive signal 424A. The DC offset reduction circuitry 1610 provides in-phase output signal 1615 and quadrature output signal 1620 to combiner circuitry 1605.

Combiner circuitry 1605 includes in-phase subtracter circuitry 1605A and quadrature subtracter circuitry 1605B.

Subtracter circuitry 1605A subtracts the in-phase output signal 1615 of the DC offset reduction circuitry from the in-phase analog down-converted signal 412 and provides the result to PGA 833A. PGA 833A receives the output signal of subtracter circuitry 1605A and provides the analog in-phase amplified signal 841 to ADC circuitry 836. Similarly, subtracter circuitry 1605B subtracts the quadrature output signal 1620 of the DC offset reduction circuitry from the quadrature analog down-converted signal 415 and provides the difference to PGA 833B. PGA 833B accepts the output signal of the subtracter circuitry 1605B and outputs the analog quadrature amplified signal 842 to ADC circuitry 836.

Note that FIG. 16C differs from FIG. 16B in the placement of the PGAs 833A and 833B relative to other components and blocks. The circuit arrangement in FIG. 16B places the PGAs 833A and 833B before the combiner circuitry 1605. In contrast, the circuit arrangement in FIG. 16C places the combiner circuitry 1605 before the PGAs 833A and 833B. Depending on design specifications and the characteristics of a particular implementation, one may use either the circuit arrangement in FIG. 16B or the circuit arrangement in FIG. 16C, as desired.

Figure 17A:
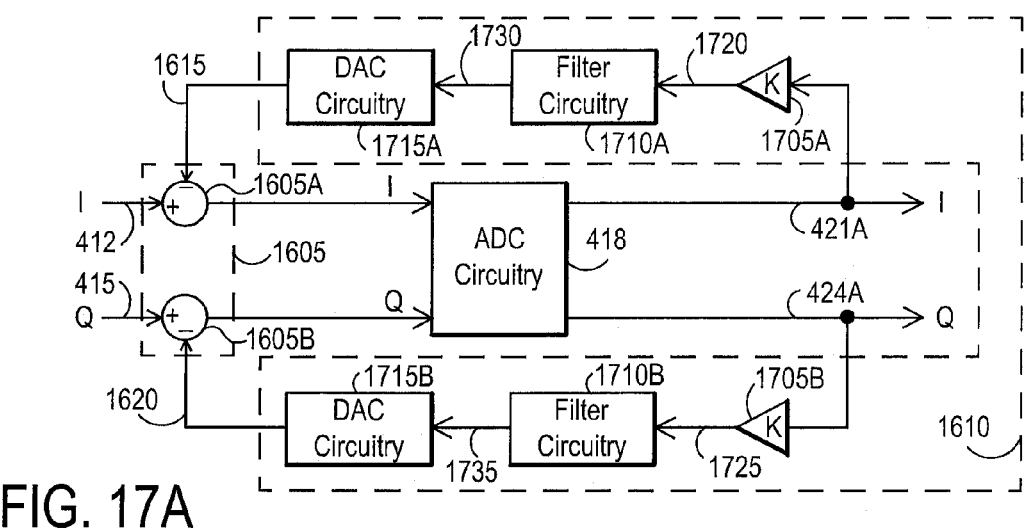
FIGS. 17A–17C show conceptual block diagrams that provide more details of the embodiments shown in FIGS. 16A–16C.
Figure 17C:
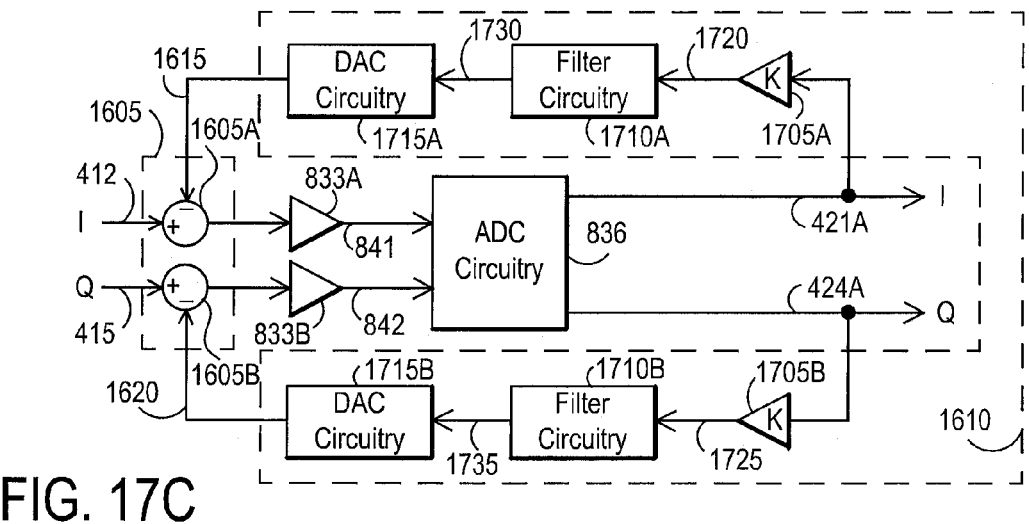
Figure 17B:
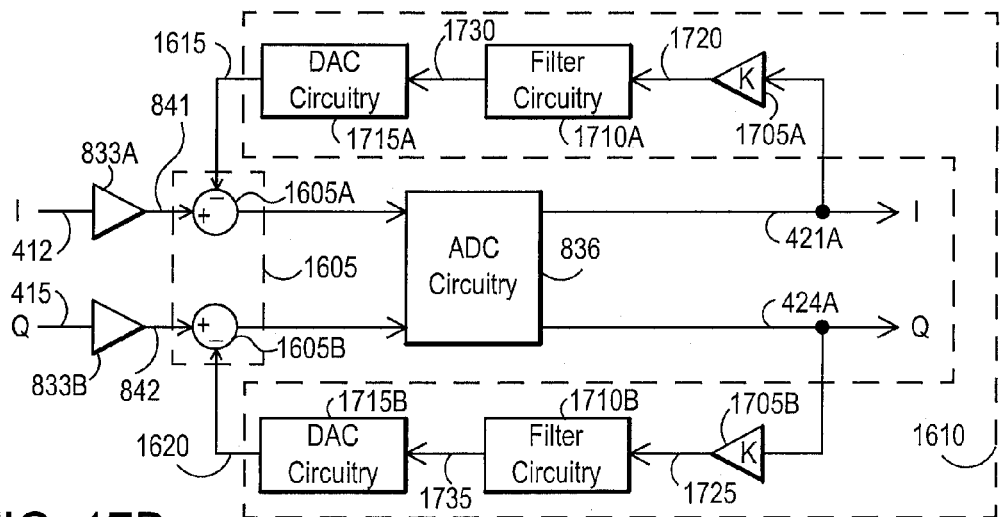

FIGS. 17A–17C provide more details of the conceptual block diagrams shown in FIGS. 16A–16C, respectively. In particular, FIGS. 17A–17C illustrate more details of the DC offset reduction circuitry 1610. The circuit arrangement in FIG. 17A includes combiner circuitry 1605, ADC circuitry 418, and DC offset reduction circuitry 1610. The DC offset reduction circuitry 1610 in turn includes gain circuitries 1705A and 1705B, filter circuitries 1710A and 1710B, and DAC circuitries 1715A and 1715B. Gain circuitries 1705A–1705B and filter circuitries 1710A–1710B receive digital input signals and provide digital output signals.

Gain circuitry 1705A receives the in-phase digital receive signal 421A and provides an scaled in-phase digital receive signal 1720 to filter circuitry 1710A. Filter circuitry 1710A filters the scaled in-phase digital receive signal 1720 and provides a filtered in-phase signal 1730 to DAC circuitry 1715A. DAC circuitry 1715A converts the filtered in-phase signal 1730 into analog in-phase output signal 1615, which it provides to combiner circuitry 1605. Gain circuitry 1705B receives the quadrature digital receive signal 424A and provides an scaled quadrature digital receive signal 1725 to filter circuitry 1710B. Filter circuitry 1710B filters the scaled quadrature digital receive signal 1725 and provides a filtered quadrature signal 1735 to DAC circuitry 1715B. DAC circuitry 1715B converts the filtered quadrature signal 1735 into analog quadrature output signal 1620. DAC circuitry 1715B provides the quadrature output signal 1620 to combiner circuitry 1605.

Combiner circuitry 1605 includes in-phase subtracter circuitry 1605A and quadrature subtracter circuitry 1605B. Subtracter circuitry 1605A subtracts the in-phase output signal 1615 from the in-phase analog down-converted signal 412 and provides the result to the in-phase input of the ADC circuitry 418. Similarly, subtracter circuitry 1605B subtracts the quadrature output signal 1620 from the quadrature analog down-converted signal 415 and provides the difference to the quadrature input of the ADC circuitry 418.

The circuit arrangement in FIG. 17B includes combiner circuitry 1605, ADC circuitry 836, PGAs 833A and 833B, and DC offset reduction circuitry 1610. The DC offset reduction circuitry 1610 in turn includes gain circuitries 1705A and 1705B, filter circuitries 1710A and 1710B, and DAC circuitries 1715A and 1715B. Gain circuitries 1705A–1705B and filter circuitries 1710A–1710B receive digital input signals and provide digital output signals.

Gain circuitry 1705A receives the in-phase digital receive signal 421A and provides the scaled in-phase digital receive signal 1720 to filter circuitry 1710A. Filter circuitry 1710A filters the scaled in-phase digital receive signal 1720 and provides the filtered in-phase signal 1730 to DAC circuitry 1715A. DAC circuitry 1715A converts the filtered in-phase signal 1730 into analog in-phase output signal 1615, which it provides to combiner circuitry 1605. Gain circuitry 1705B receives the quadrature digital receive signal 424A and provides the scaled quadrature digital receive signal 1725 to filter circuitry 1710B. Filter circuitry 1710B filters the scaled quadrature digital receive signal 1725 and provides the filtered quadrature signal 1735 to DAC circuitry 1715B. DAC circuitry 1715B converts the filtered quadrature signal 1735 into analog quadrature output signal 1620. DAC circuitry 1715B provides the quadrature output signal 1620 to combiner circuitry 1605.

PGA 833A receives the in-phase analog down-converted signal 412 and provides the analog in-phase amplified signal 841 to combiner circuitry 1605. PGA 833B accepts the quadrature analog down-converted signal 415 and outputs the analog quadrature amplified signal 842 to combiner circuitry 1605. Combiner circuitry 1605 includes in-phase subtracter circuitry 1605A and quadrature subtracter circuitry 1605B. Subtracter circuitry 1605A subtracts the in-phase output signal 1615 from the analog in-phase amplified signal 841 and provides the result to the in-phase input of the ADC circuitry 836. Similarly, subtracter circuitry 1605B subtracts the quadrature output signal 1620 from the analog quadrature amplified signal 842 and provides the difference to the quadrature input of the ADC circuitry 836.

The circuit arrangement in FIG. 17C includes combiner circuitry 1605, ADC circuitry 836, PGAs 833A and 833B, and DC offset reduction circuitry 1610. The DC offset reduction circuitry 1610 in turn includes gain circuitries 1705A and 1705B, filter circuitries 1710A and 1710B, and DAC circuitries 1715A and 1715B. Gain circuitries 1705A–1705B and filter circuitries 1710A–1710B receive digital input signals and provide digital output signals.

Gain circuitry 1705A receives the in-phase digital receive signal 421A and provides the scaled in-phase digital receive signal 1720 to filter circuitry 1710A. Filter circuitry 1710A filters the scaled in-phase digital receive signal 1720 and provides the filtered in-phase signal 1730 to DAC circuitry 1715A. DAC circuitry 1715A converts the filtered in-phase signal 1730 into analog in-phase output signal 1615, which it provides to combiner circuitry 1605. Gain circuitry 1705B receives the quadrature digital receive signal 424A and provides the scaled quadrature digital receive signal 1725 to filter circuitry 1710B. Filter circuitry 1710B filters the scaled quadrature digital receive signal 1725 and provides filtered quadrature signal 1735 to DAC circuitry 1715B. DAC circuitry 1715B converts the filtered quadrature signal 1735 into analog quadrature output signal 1620. DAC circuitry 1715B provides the quadrature output signal 1620 to combiner circuitry 1605.

Combiner circuitry 1605 includes in-phase subtracter circuitry 1605A and quadrature subtracter circuitry 1605B. Subtracter circuitry 1605A subtracts the in-phase output signal 1615 of the DC offset reduction circuitry from the in-phase analog down-converted signal 412 and provides the result to PGA 833A. PGA 833A receives the output of the subtracter circuitry 1605A and provides the analog in-phase amplified signal 841 to ADC circuitry 836. Similarly, subtracter circuitry 1605B subtracts the quadrature output signal 1620 of the DC offset reduction circuitry from the quadrature analog down-converted signal 415 and provides the difference to PGA 833B. PGA 833B accepts that difference and outputs the analog quadrature amplified signal 842 to ADC circuitry 836.

Conceptually, the circuit arrangements in FIGS. 17A–17C (and, hence, the circuit arrangements in FIGS. 16A–16C) operate as follows. The filter circuitries 1710A and 1710B are low-pass filters. In other words, they tend to transmit the DC offset present at the output of the ADC circuitry 836, while blocking higher-frequency signals, such as components of the desired signal, quantization noise, interference, etc. Thus, the filtered in-phase and quadrature signals 1730 and 1735 constitute error signals, i.e., they include the undesired DC offsets. The combiner circuitry 1605 (more particularly, subtracter circuitries 1605A and 1605B), subtracts the error signals from the desired signals and provides the results to the ADC circuitry 836. Consequently, the DC offset reduction circuitry 1610 tends to reduce the DC offsets present at the outputs of the ADC circuitry 836. Circuit arrangements in FIGS. 18A–18C, described below in detail, operate in a similar manner.

Exemplary embodiments of the invention use integrator circuitries as the low-pass filter circuitries (e.g., filter circuitries 1710A and 1710B in FIG. 17), which have the following transfer function:

$$H(z) = \frac{z^{-1}}{1-z^{-1}}.$$

Alternatively, for a faster implementation, one may use integrator circuitries with the following transfer function:

$$H(z) = \frac{1}{1-z^{-1}}.$$

Furthermore, rather than using integrator circuitries, one may use other types of filter circuitry, as desired. For example, one may use IIR or FIR types of filter to implement low-pass filters. Furthermore, in exemplary embodiments of the invention, DAC circuitries 1715A and 1715B operate on 5-bit digital signals (i.e., the filtered in-phase and quadrature signals 1730 and 1735 each have a resolution of 5 bits), although one may use other resolutions, as desired.

Figure 18A:
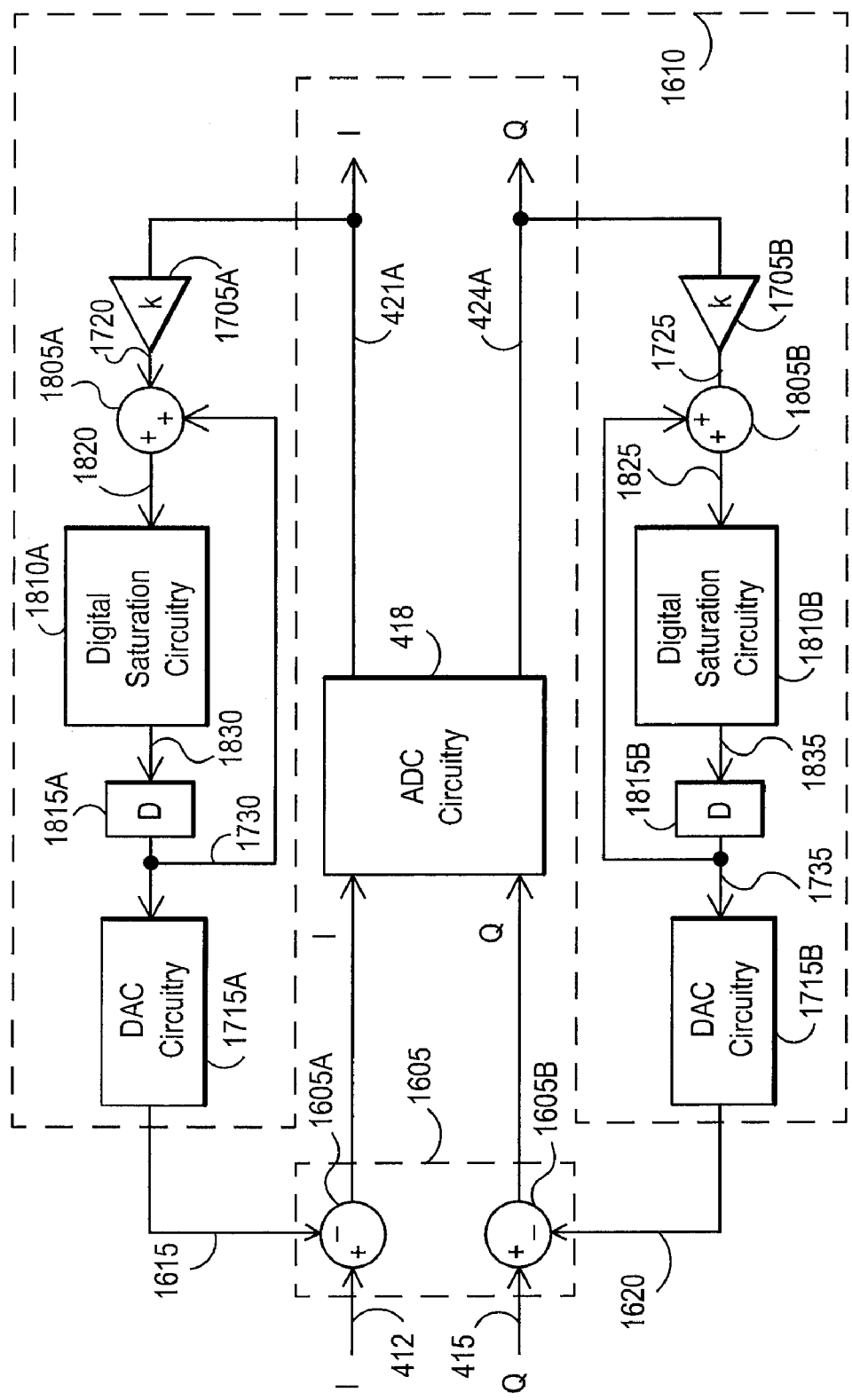
FIGS. 18A–18C depict conceptual block diagrams that provide more details of the embodiments shown in FIGS. 17A–17C.
Figure 18B:
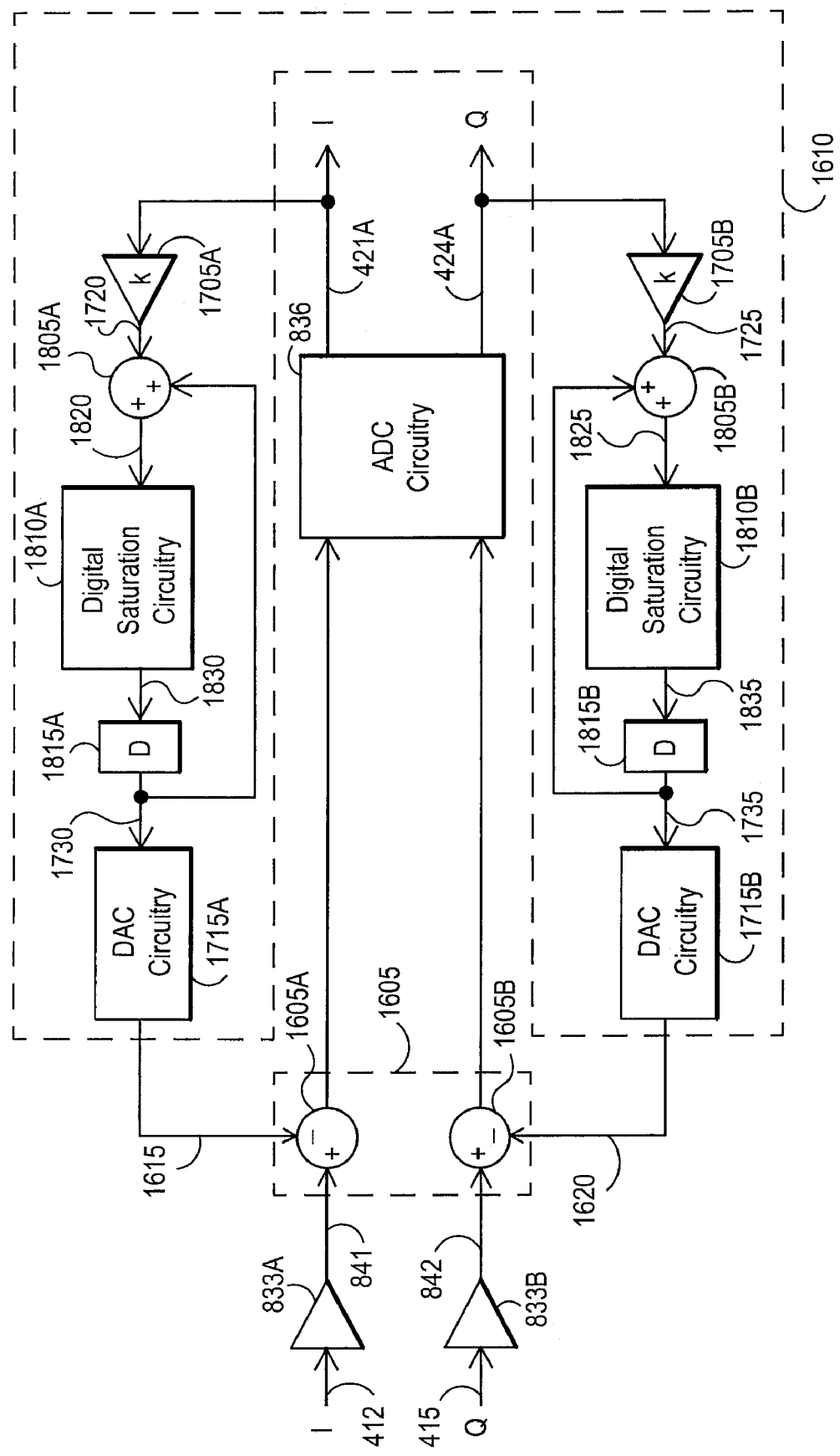
Figure 18C:
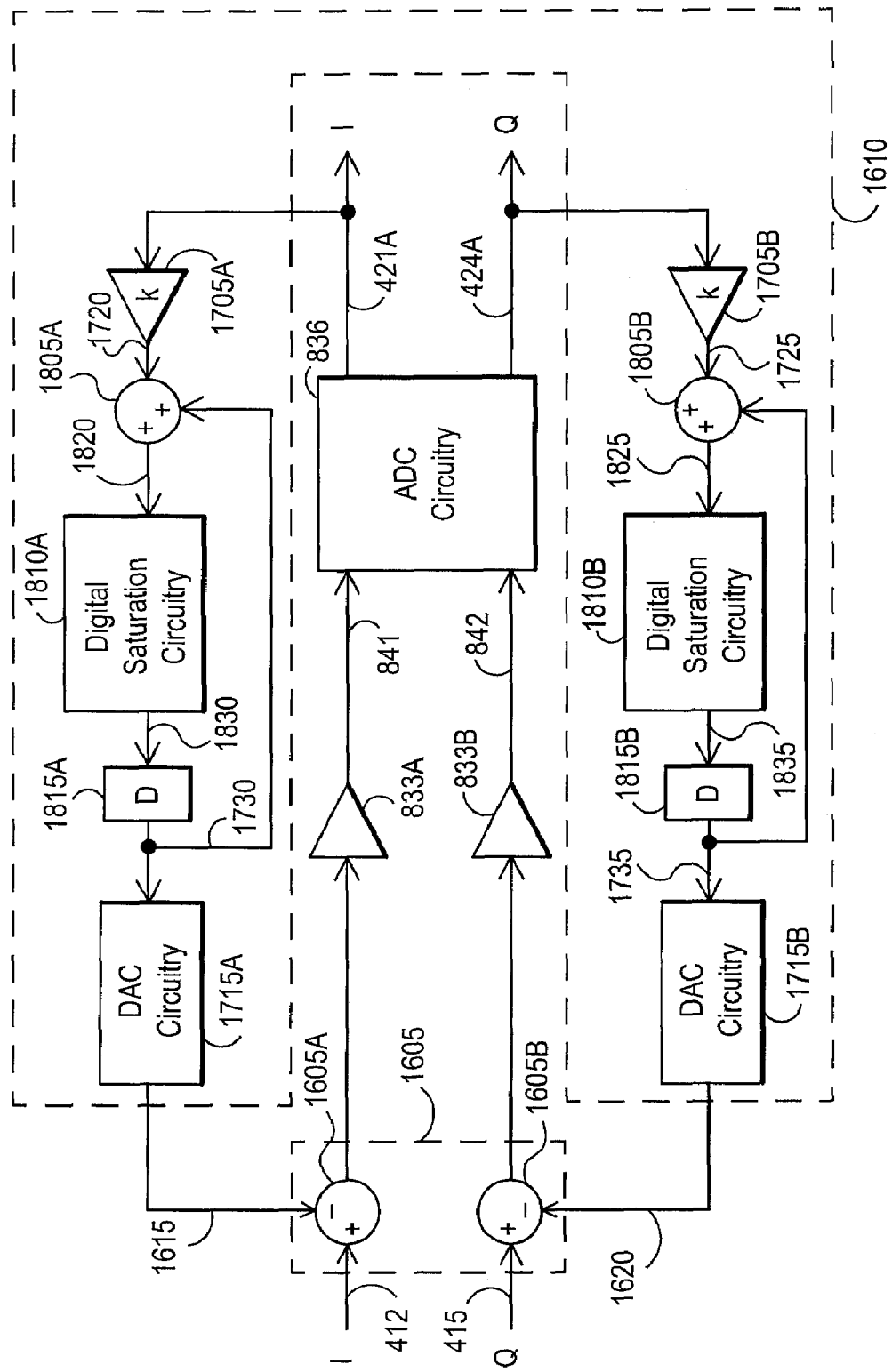

FIGS. 18A–18C provide more details of the conceptual block diagrams shown in FIGS. 17A–17C, respectively. Specifically, FIGS. 18A–18C illustrate the conceptual building blocks of the DC offset reduction circuitry 1610 and, in particular, the filter circuitries 1710A and 1710B. The notation "D" within delay circuitries in FIGS. 18A–18C refers to a delay block that has a transfer function:

$$H(z)=z^{-1}.$$

The circuit arrangement in FIG. 18A includes combiner circuitry 1605, ADC circuitry 418, and DC offset reduction circuitry 1610. The DC offset reduction circuitry 1610 in turn includes gain circuitries 1705A and 1705B, combiner circuitries 1805A and 1805B, digital saturation circuitries 1810A and 1810B, delay circuitries 1815A and 1815B, and DAC circuitries 1715A and 1715B. Gain circuitries 1705A and 1705B, combiner circuitries 1805A and 1805B, digital saturation circuitries 1810A and 1810B, and delay circuitries 1815A and 1815B receive digital input signals and provide digital output signals.

Gain circuitry 1705A receives the in-phase digital receive signal 421A and provides an scaled in-phase digital receive signal 1720 to a first input of combiner circuitry 1805A. Combiner circuitry 1805A adds the scaled in-phase digital receive signal 1720 to filtered in-phase signal 1730 and provides an in-phase sum signal 1820 to digital saturation circuitry 1810A. Digital saturation circuitry 1810A applies a saturation transfer function (described below in detail in connection with FIG. 19) to in-phase sum signal 1820 and outputs an in-phase saturated signal 1830 to delay circuitry 1815A. Delay circuitry 1815A delays the in-phase saturated signal 1830 to generate filtered in-phase signal 1730, and provides the filtered in-phase signal 1730 to both DAC circuitry 1715A and a second input of combiner circuitry 1805A. DAC circuitry 1715A converts the filtered in-phase signal 1730 into analog in-phase output signal 1615, which it provides to combiner circuitry 1605.

Gain circuitry 1705B receives the quadrature digital receive signal 424A and provides an scaled quadrature digital receive signal 1725 to a first input of combiner circuitry 1805B. Combiner circuitry 1805B adds the scaled quadrature digital receive signal 1725 to filtered quadrature signal 1735 and provides a quadrature sum signal 1825 to digital saturation circuitry 1810B. Digital saturation circuitry 1810B applies a saturation transfer function (described below in detail) to quadrature sum signal 1825 and outputs a quadrature saturated signal 1835 to delay circuitry 1815B. Delay circuitry 1815B delays the quadrature saturated signal 1835 to generate filtered quadrature signal 1735, and provides the filtered quadrature signal 1735 to both DAC circuitry 1715B and a second input of combiner circuitry 1805B. DAC circuitry 1715B converts the filtered quadrature signal 1735 into analog quadrature output signal 1620, which it provides to combiner circuitry 1605.

Combiner circuitry 1605 includes an in-phase subtracter circuitry 1605A and a quadrature subtracter circuitry 1605B. Subtracter circuitry 1605A subtracts the in-phase output signal 1615 from the in-phase analog down-converted signal 412 and provides the result to the in-phase input of the ADC circuitry 418. Similarly, subtracter circuitry 1605B subtracts the quadrature output signal 1620 from the quadrature analog down-converted signal 415 and provides the difference to the quadrature input of the ADC circuitry 418.

The circuit arrangement in FIG. 18B includes combiner circuitry 1605, ADC circuitry 836, DC offset reduction circuitry 1610, and PGAs 833A and 833B. The DC offset reduction circuitry 1610 in turn includes gain circuitries 1705A and 1705B, combiner circuitries 1805A and 1805B, digital saturation circuitries 1810A and 1810B, delay circuitries 1815A and 1815B, and DAC circuitries 1715A and 1715B. Gain circuitries 1705A and 1705B, combiner circuitries 1805A and 1805B, digital saturation circuitries 1810A and 1810B, and delay circuitries 1815A and 1815B receive digital input signals and provide digital output signals.

Gain circuitry 1705A receives the in-phase digital receive signal 421A and provides an scaled in-phase digital receive signal 1720 to a first input of combiner circuitry 1805A. Combiner circuitry 1805A adds the scaled in-phase digital receive signal 1720 to filtered in-phase signal 1730 and provides an in-phase sum signal 1820 to digital saturation circuitry 1810A. Digital saturation circuitry 1810A applies a saturation transfer function (described below in detail in connection with FIG. 19) to in-phase sum signal 1820 and outputs an in-phase saturated signal 1830 to delay circuitry 1815A. Delay circuitry 1815A delays the in-phase saturated signal 1830 to generate filtered in-phase signal 1730, and provides the filtered in-phase signal 1730 to both DAC circuitry 1715A and a second input of combiner circuitry 1805A. DAC circuitry 1715A converts the filtered in-phase signal 1730 into analog in-phase output signal 1615, which it provides to combiner circuitry 1605.

Gain circuitry 1705B receives the quadrature digital receive signal 424A and provides an scaled quadrature digital receive signal 1725 to a first input of combiner circuitry 1805B. Combiner circuitry 1805B adds the scaled quadrature digital receive signal 1725 to filtered quadrature signal 1735 and provides a quadrature sum signal 1825 to digital saturation circuitry 1810B. Digital saturation circuitry 1810B applies a saturation transfer function (described below in detail) to quadrature sum signal 1825 and outputs a quadrature saturated signal 1835 to delay circuitry 1815B. Delay circuitry 1815B delays the quadrature saturated signal 1835 to generate filtered quadrature signal 1735, and provides the filtered quadrature signal 1735 to both DAC circuitry 1715B and a second input of combiner circuitry 1805B. DAC circuitry 1715B converts the filtered quadrature signal 1735 into analog quadrature output signal 1620, which it provides to combiner circuitry 1605.

PGA 833A receives the in-phase analog down-converted signal 412 and provides the analog in-phase amplified signal 841 to combiner circuitry 1605. PGA 833B accepts the quadrature analog down-converted signal 415 and outputs the analog quadrature amplified signal 842 to combiner circuitry 1605. Combiner circuitry 1605 includes an in-phase subtracter circuitry 1605A and a quadrature subtracter circuitry 1605B. Subtracter circuitry 1605A subtracts the in-phase output signal 1615 from the analog in-phase amplified signal 841 and provides the result to the in-phase input of the ADC circuitry 836. Similarly, subtracter circuitry 1605B subtracts the quadrature output signal 1620 from the analog quadrature amplified signal 842 and provides the difference to the quadrature input of the ADC circuitry 836.

Similar to the circuit arrangement in FIG. 18B, the circuit arrangement in FIG. 18C includes combiner circuitry 1605, ADC circuitry 836, DC offset reduction circuitry 1610, and PGAs 833A and 833B. The DC offset reduction circuitry 1610 in turn includes gain circuitries 1705A and 1705B, combiner circuitries 1805A and 1805B, digital saturation circuitries 1810A and 1810B, delay circuitries 1815A and 1815B, and DAC circuitries 1715A and 1715B. Gain circuitries 1705A and 1705B, combiner circuitries 1805A and 1805B, digital saturation circuitries 1810A and 1810B, and delay circuitries 1815A and 1815B receive digital input signals and provide digital output signals.

Gain circuitry 1705A receives the in-phase digital receive signal 421A and provides an scaled in-phase digital receive signal 1720 to a first input of combiner circuitry 1805A. Combiner circuitry 1805A adds the scaled in-phase digital receive signal 1720 to filtered in-phase signal 1730 and provides an in-phase sum signal 1820 to digital saturation circuitry 1810A. Digital saturation circuitry 1810A applies a saturation transfer function (described below in detail in connection with FIG. 19) to in-phase sum signal 1820 and outputs an in-phase saturated signal 1830 to delay circuitry 1815A. Delay circuitry 1815A delays the in-phase saturated signal 1830 to generate filtered in-phase signal 1730, and provides the filtered in-phase signal 1730 to both DAC circuitry 1715A and a second input of combiner circuitry 1805A. DAC circuitry 1715A converts the filtered in-phase signal 1730 into analog in-phase output signal 1615, which it provides to combiner circuitry 1605.

Gain circuitry 1705B receives the quadrature digital receive signal 424A and provides an scaled quadrature digital receive signal 1725 to a first input of combiner circuitry 1805B. Combiner circuitry 1805B adds the scaled quadrature digital receive signal 1725 to filtered quadrature signal 1735 and provides a quadrature sum signal 1825 to digital saturation circuitry 1810B. Digital saturation circuitry 1810B applies a saturation transfer function (described below in detail) to quadrature sum signal 1825 and outputs a quadrature saturated signal 1835 to delay circuitry 1815B. Delay circuitry 1815B delays the quadrature saturated signal 1835 to generate filtered quadrature signal 1735, and provides the filtered quadrature signal 1735 to both DAC circuitry 1715B and a second input of combiner circuitry 1805B. DAC circuitry 1715B converts the filtered quadrature signal 1735 into analog quadrature output signal 1620, which it provides to combiner circuitry 1605.

Combiner circuitry 1605 includes an in-phase subtracter circuitry 1605A and a quadrature subtracter circuitry 1605B. Subtracter circuitry 1605A subtracts the in-phase output signal 1615 of the DC offset reduction circuitry from the in-phase analog down-converted signal 412 and provides the result to PGA 833A. PGA 833A receives the output signal of subtracter circuitry 1605A and provides the analog in-phase amplified signal 841 to ADC circuitry 836. Similarly, subtracter circuitry 1605B subtracts the quadrature output signal 1620 of the DC offset reduction circuitry from the quadrature analog down-converted signal 415 and provides the difference to PGA 833B. PGA 833B accepts the output signal of subtracter circuitry 1605B and outputs the analog quadrature amplified signal 842 to ADC circuitry 836.

Exemplary embodiments shown in FIGS. 16–18 use subtracter circuitries 1605A and 1605B, as described above. Rather than use subtracter circuitries 1605A and 1605B, however, one may use adder circuitries and apply a negated version of the in-phase and quadrature output signals 1615 and 1620 of the DC offset reduction circuitry 1610 to the respective adder circuitries, as desired. One may implement the negation in a suitable part of the DC offset reduction circuitry 1610, for example, in the gain circuitries 1705A–1705B, the filter circuitries 1710A–1710B, or the DAC circuitries 1715A–1715B.

Figure 19:
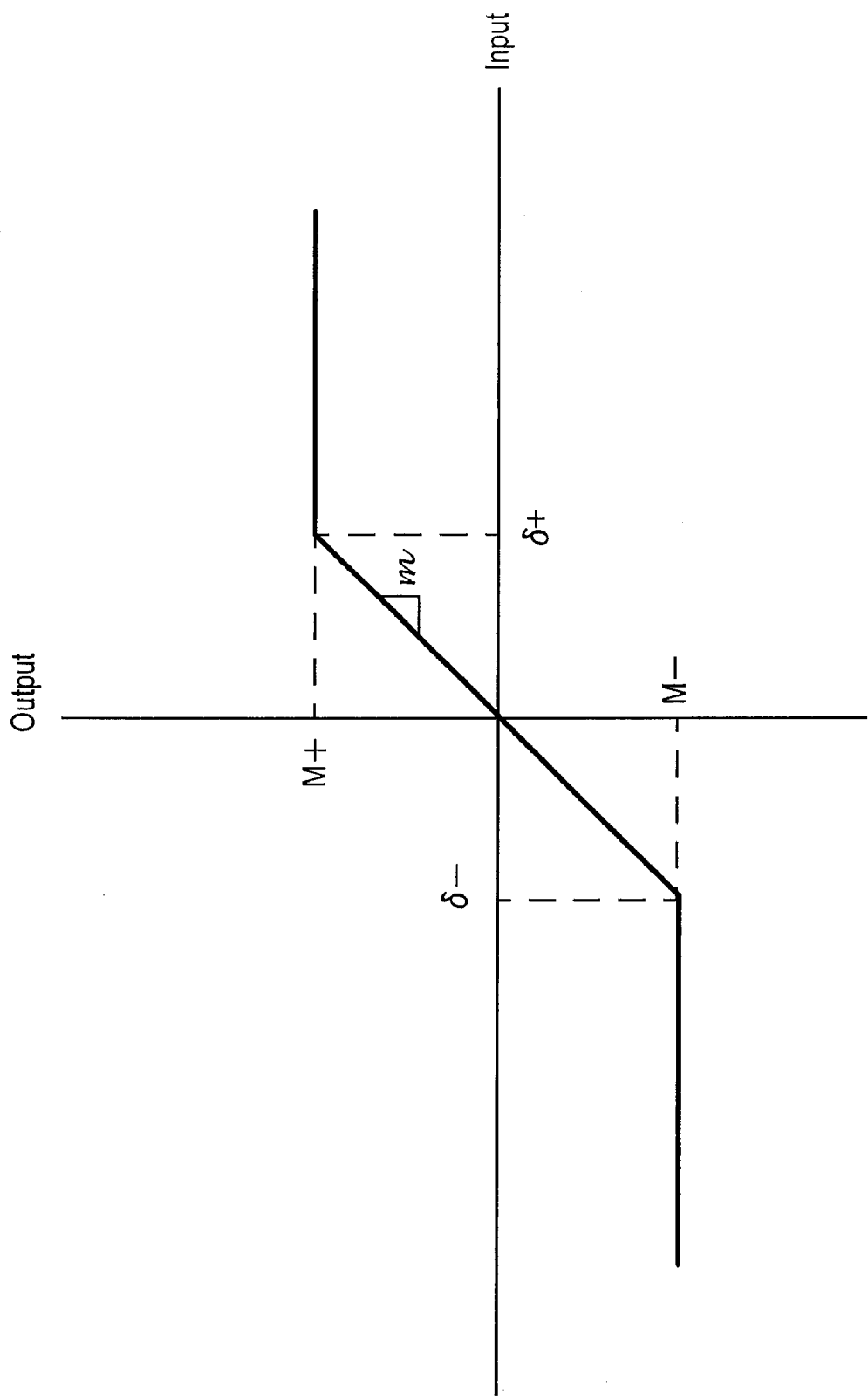
FIG. 19 illustrates a transfer function for digital saturation circuitries in exemplary embodiments of the invention.

FIG. 19 shows a transfer function for the digital saturation circuitries 1810A and 1810B in exemplary embodiments of the invention. The digital saturation circuitries 1810A and 1810B act as limiting circuits. For a range of inputs between a negative threshold value, $\delta-$, and a positive threshold value, $\delta+$, the digital saturation circuitries 1810A and 1810B provide a substantially constant gain, m. The gain m equals the slope of the linear portion of the transfer function in FIG. 19. For input values below the negative threshold value, $\delta-$, the digital saturation circuitries 1810A and 1810B output a substantially constant value, M−. Conversely, input values above the positive threshold value, $\delta+$, cause the digital saturation circuitries 1810A and 1810B to output a substantially constant value, M+. One may use various values of m, such as unity, as desired, depending on the design and performance specifications for a given application, as persons skilled in the art who have the benefit of the description of the invention understand.

Referring to FIGS. 18A–18C, note that the DC offset reduction circuitry 1610 forms a feedback loop around the ADC circuitry 418 or 836. The circuit arrangements include a loop circuitry for the in-phase signal path (i.e., the cascade of gain circuitry 1705A, combiner circuitry 1805A, digital saturation circuitry 1810A, delay circuitry 1815A, and DAC circuitry 1715A) and a loop circuitry for the quadrature signal path (i.e., the cascade of gain circuitry 1705B, combiner circuitry 1805B, digital saturation circuitry 1810B, delay circuitry 1815B, and DAC circuitry 1715B). Each loop circuitry has a transfer function, $H_L(z)$:

$$H_L(z) = k \cdot \frac{mz^{-1}}{1 - mz^{-1}}.$$

Referring to FIG. 18C, assume that m=1, and that, for each of the in-phase and quadrature signal paths, G denotes the product of the gain of the DAC circuitry (1715A or 1715B), the gain of the PGA (833A or 833B), and the gain of the ADC circuitry 836. One may then write the transfer function of the closed loop around the ADC circuitry 836 (from the input to the output of DAC circuitry), $H_C(z)$, as:

$$H_c(z) = \frac{G \cdot H_L(z)}{1 + G \cdot H_L(z)},$$

where k denotes the gain of gain circuitries 1705A or 1705B. Substituting for $H_L(z)$, one obtains:

$$H_c(z) = \frac{G \cdot k \cdot \left(\frac{z^{-1}}{1 - z^{-1}}\right)}{1 + G \cdot k \cdot \left(\frac{z^{-1}}{1 - z^{-1}}\right)},$$

or $$H_c(z) = \frac{G \cdot k \cdot z^{-1}}{1 - (1 - G \cdot k) \cdot z^{-1}}.$$

In exemplary embodiments of the invention, k has values that are inversely proportional to powers of two. In other words, $$k = \frac{1}{2^n},$$

where n denotes an exponent. Note that one may use a variety of choices of k, as desired. For example, one may use a fixed k or a variable k, as desired, depending on the design specifications of a particular implementation, as persons skilled in the art understand. Selecting k as $$\frac{1}{2^n}$$

results in a relatively simple implementation of the gain circuitries 1705A and 1705B, where one may adjust the value of k through shifting operations. Note further that changing k modifies the location of the pole in the transfer function $H_c(z)$.

DC offset reduction circuitries in exemplary embodiments of the invention adjust or "gear-shift" the value of k (by modifying n). Adjusting k according to an adjustment schedule (i.e., adjusting k as a function of time) allows the DC offset reduction circuitry to reduce the DC offset relatively quickly. Consequently, one may power up the receiver analog circuitry relatively close to the beginning of receiving a data burst.

Adjusting k also allows the DC offset reduction circuitry to reduce the DC offset in the presence of undesired signals, while maintaining a relatively fast acquisition of the DC offset. The undesired signals may include interferers, blockers, sweeping spurious signals resulting from the settling of the local oscillator circuitry, and the quantization noise of the ADC circuitry 418 or 836, as described below in detail. By adjusting k, DC offset reduction circuitries in exemplary embodiments of the invention provide a trade-off between performance and acquisition speed at various times during the operation cycle of the DC offset reduction circuitry.

A relatively large initial value of k provides relatively fast acquisition of the DC offset or a quantity approaching the DC offset. The relatively large initial value of k, however, causes more susceptibility to undesired signals, such as noise, interference, quantization noise, blockers, etc. The value of k subsequently reduces. The relatively smaller subsequent values of k provide more noise-resistant, more accurate acquisitions of the DC offset.

According to the GSM specification, an interferer constitutes a signal in the desired signal band of interest. The signal may result from another GSM user's operation of RF apparatus that inject energy within the RF spectrum. Blockers refer to spurious RF signals that may exist either inside or outside the GSM band. Blockers may result from other RF apparatus, such as military radios, global positioning satellite (GPS) systems, and other users of the electromagnetic spectrum.

Figure 20:
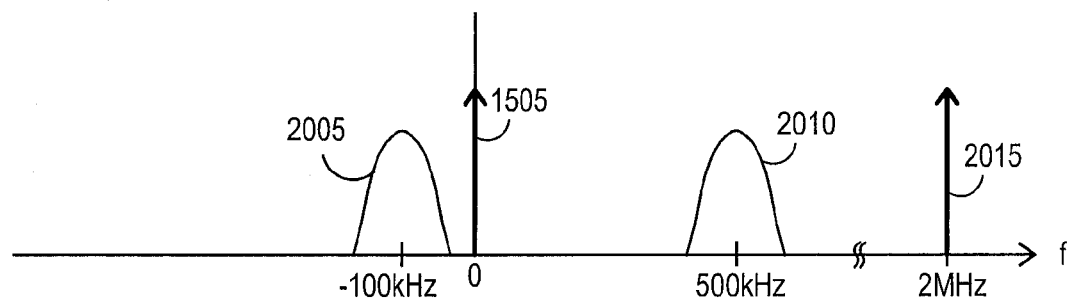
FIG. 20 shows an exemplary spectrum for an environment in which DC offset reduction circuitry according to the invention operates.

FIG. 20 shows an exemplary spectrum for an environment in which DC offset reduction circuitry according to the invention operates. The spectrum includes DC offset 1505, interferers 2005 and 2010, and blocker 2015. Interferer 2005 centers around −100 kHz, whereas interferer 2010 appears as a band of frequencies centered around 500 kHz. Blocker 2015 appears as a tone at 2 MHz. Adjusting k allows DC offset reduction circuitry in exemplary embodiments of the invention to reduce the DC offset 1505 in the presence of interferers 2005 and 2010, and blocker 2015.

Figure 21:
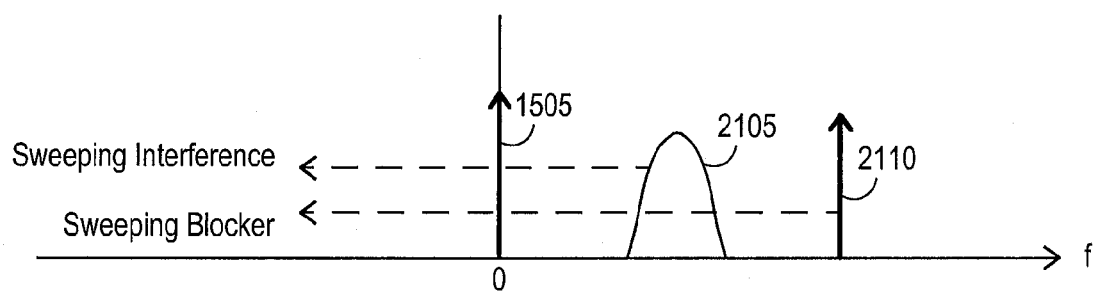
FIG. 21 depicts another exemplary spectrum of an environment in which DC offset reduction circuitry according to the invention operates.

FIG. 21 illustrates another exemplary spectrum of an environment in which DC offset reduction circuitry according to the invention operates. The spectrum includes DC offset 1505, sweeping interference 2105, and sweeping blocker 2110, and the desired signal (not shown explicitly). Although FIG. 21 shows the sweeping interference 2105 as having a fixed band of frequencies, the center frequency of the sweeping interference 2105 changes as a function of time. In other words, the center frequency sweeps through a range of frequencies. Likewise, the sweeping blocker 2110 appears as a tone whose frequency changes as a function of time, i.e., the blocker migrates through a range of frequencies. The blockers and interferers sweep because of the settling of the RF LO, which changes the blocker or interferer down-converted center frequency as the LO frequency settles.

Over time, sweeping interference 2105 and sweeping blocker 2110 migrate through DC, thus potentially affecting the operation of the DC offset reduction circuitry. Adjusting k allows DC offset reduction circuitry in exemplary embodiments of the invention helps to reduce the DC offset 1505 in the presence of sweeping interference 2105, sweeping blocker 2110, and the desired signal (not shown explicitly in FIG. 21).

The quantization noise of the ADC circuitry 418 or 836 may also affect the operation of the DC offset reduction circuitry. To reduce interference with the desired signal band, the sigma-delta ADC circuitry in exemplary embodiments of RF apparatus according to the invention employ noise-shaping techniques. The noise-shaping techniques shape the characteristics of the quantization noise of the ADC circuitry so as to move the quantization noise out of the signal band of interest, e.g., DC to 200 kHz, or twice the intermediate frequency in exemplary embodiments.

Figure 22:
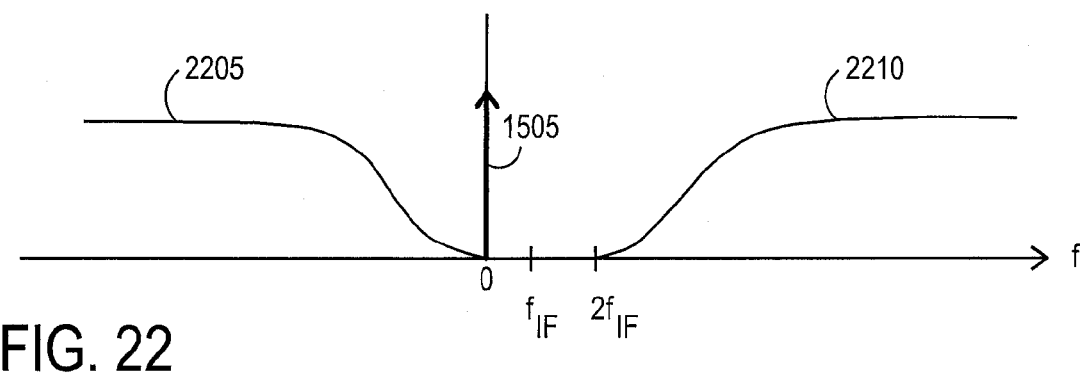
FIG. 22 illustrates a typical spectrum that includes the quantization noise of a sigma-delta ADC circuitry in exemplary embodiments of the invention.

FIG. 22 depicts a typical spectrum that includes the quantization noise of a sigma-delta ADC circuitry in exemplary embodiments of the invention. The spectrum of the signal of interest spans a band of frequencies from DC to about $2f_{IF}$ (200 kHz in exemplary embodiments) and centers around the intermediate frequency, $f_{IF}$.

The quantization noise of the ADC circuitry appears in two main bands. A lower band 2205 appears in a range of frequencies below DC. In low-IF embodiments, an upper band 2210 occupies a range of frequencies above $2f_{IF}$. Note that the quantization noise within the signal band of interest is several orders of magnitude lower than outside the signal band of interest (FIG. 22 does not explicitly show that component of the quantization noise). By adjusting k, DC offset reduction circuitry in exemplary embodiments of the invention can reduce the DC offset 1505 in the presence of quantization noise of the ADC circuitry.

The DC offset reduction circuitry has an adjustment cycle during which the location of its pole varies. In the beginning of the adjustment cycle, the pole resides relatively close to the origin of the z-plane (i.e., a relatively large value of k), thus providing relatively fast acquisition, but with relatively low accuracy. Subsequently in the adjustment cycle, the pole of the DC offset reduction circuitry moves progressively away from the origin of the z-plane towards the unit circle (i.e., decreasing values of k). The movement of the pole progressively increases the accuracy of the DC offset reduction circuitry.

At the end of the adjustment cycle, the outputs of the filter circuitries and, hence, the DAC circuitries within the DC offset reduction circuitry become constant. In other words, the in-phase output signal 1615 and the quadrature output signal 1620 in FIGS. 16–18 become constant. Note, however, that one may continue decreasing the value of k and, hence, moving the pole location progressively closer to the unit circle, as desired. Making the value of k constant "locks in" the DC offset reduction in the analog receiver circuitry. Put another way, the subtracter circuitries 1605A and 1605B subtract constant levels that the in-phase output signal 1615 and the quadrature output signal 1620 dictate. The notch filter circuitry in the digital filter circuitry thereafter operates to reduce the residual DC offset in the receive path circuitry. Thus, the DC offset reduction in the receiver analog circuitry and the notch filter circuitry in the receiver digital circuitry operate in tandem to reduce the DC offset in the receive path circuitry.

The adjustment cycle of the notch filter circuitry ends before the reception of a data burst by the receiver analog circuitry begins. The adjustment of the acquisition speed and accuracy of the DC offset reduction occurs by modifying the value of k. In exemplary embodiments, the time instances at which the value of k changes are fixed. By making modifications within the knowledge of persons skilled in the art who have read the description of the invention, however, one may make those time instances programmable, and provide default values for them, as desired.

Figure 23:
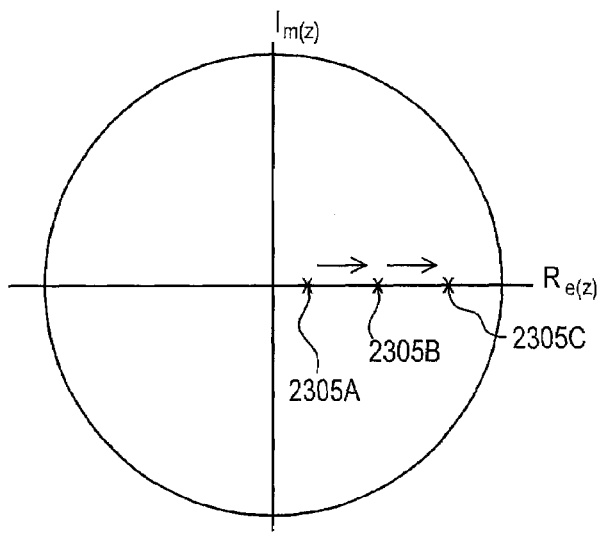
FIG. 23 shows adjustment of a pole location of the DC offset reduction circuitry in exemplary embodiments of the invention.

FIG. 23 illustrates the adjustment of the pole location of the DC offset reduction circuitry as a function of k in exemplary embodiments of the invention. The DC offset circuitry has a pole that progressively occupies positions 2305A, 2305B, and 2305C within the unit circle. During the adjustment process, the value of k decreases as a function of time, thus causing the location of the pole to move towards the periphery of the unit circle.

Initially, the pole resides at location 2305A, relatively close to the origin of the unit circle. The initial location 2305A of the pole corresponds to $k=k_1$. As the value of k decreases from $k_1$ to $k_2$, the pole moves towards the periphery of the unit circle. In other words, the pole moves to location 2305B as k decreases from $k_1$ to $k_2$. A further decrease in the value of k from $k_2$ to $k_3$ causes the pole to migrate to location 2305C, closer to the unit circle. Note that the above description assumes that $k_1 > k_2 > k_3$. For example, in one embodiment, $k_1 = \frac{1}{2}$, $k_2 = \frac{1}{4}$, and $k_3 = \frac{1}{8}$. One, however, may use other values of $k_1 - k_3$, as desired.

As noted above, exemplary embodiments of the invention use fixed time values at which the value of k changes. One, however, may use varying time values at which the value of k changes. Furthermore, one may provide default values of k, as desired. Table 4 below provides the times and the corresponding values of k as a function of the gain of the PGAs 833A and 833B for one embodiment of the invention, as shown in FIG. 18C:

TABLE 4

| Time (µs) | Gain of PGA | | | | |
|---|---|---|---|---|---|
| | 8 dB | 12 dB | 16 dB | 20 dB | 24 dB |
| 0 | 1/2 | 1/2 | 1/4 | 1/8 | 1/8 |
| 6 | 1/4 | 1/4 | 1/8 | 1/16 | 1/16 |
| 12 | 1/8 | 1/8 | 1/16 | 1/32 | 1/32 |

For time values of time larger than 18 µs until the end of the operation cycle of the DC offset reduction circuitry 1610, the output signals 1615 and 1620 of the DC offset reduction circuitry 1610 remain constant or frozen. In other words, the value of k does not affect the output signals 1615 and 1620 of the DC offset reduction circuitry 1610 for time values larger than 18 µs until the end of the operation cycle of the DC offset reduction circuitry 1610.

As Table 4 indicates, in exemplary embodiments the adjustment of the value of k occurs every 6 µs. One, however, may adjust the value of k with different periods, as desired. Furthermore, as persons of ordinary skill in the art who have the benefit of the description of the invention understand, one may use other values of k, depending on the design and performance specifications and the details of a particular implementation, as desired.

Figure 24:
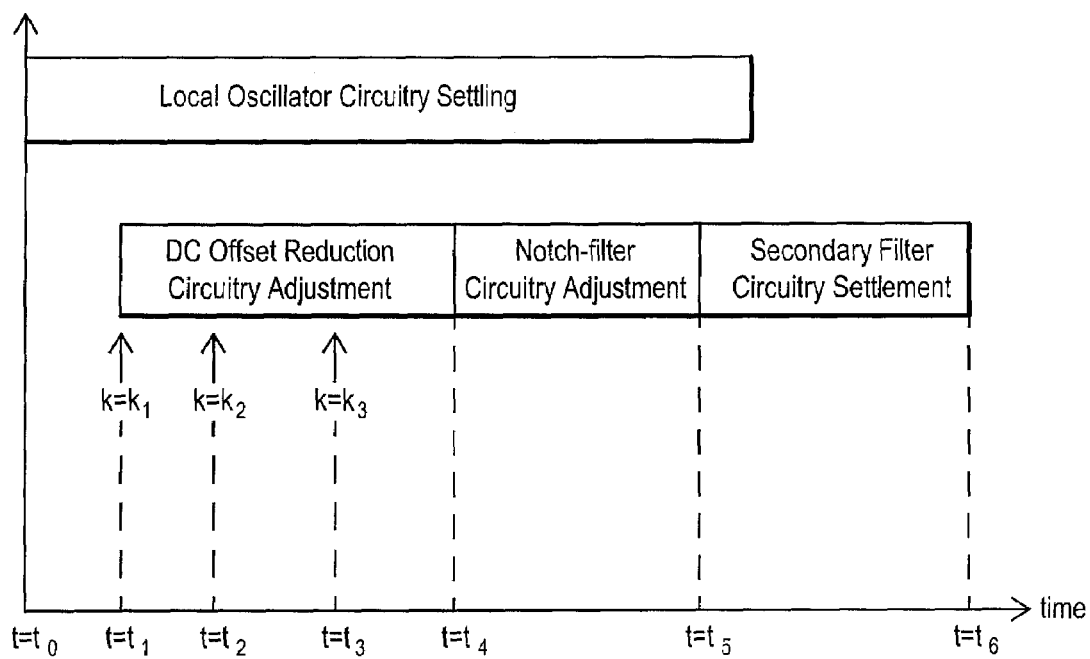
FIG. 24 depicts a timeline for the adjustment of the DC offset reduction circuitry with respect to several other events with RF apparatus according to the invention.

FIG. 24 depicts a timeline for the adjustment of the DC offset reduction circuitry with respect to several other events within RF apparatus according to the invention. In preparation for the commencement of a data reception burst, the local oscillator circuitry powers up and begins to settle. In FIG. 24, the local oscillator circuitry powers up at $t=t_0$. At $t=t_1$, DC offset cancellation or reduction begins in the receiver analog circuitry.

DC offset reduction in the receiver analog circuitry uses an adjustment technique that modifies the value of k, as described above in detail. At $t=t_1$, k has a value $k_1$. Subsequently, the value of k changes to $k_2$ at $t=t_1$. Later, at $t=t_2$, the value of k further changes to $k_3$. One may use various values of $k_1$, $k_2$, and $k_3$, as desired. For example, one may use the values in Table 4 above. In exemplary embodiments, the values of $k_1$, $k_2$, and $k_3$ have the following relationship:

$$k_1 > k_2 > k_3.$$

At $t=t_4$, the outputs 1615 and 1620 of the DC offset reduction circuitry 1610 freeze or become constant, as described above. Thereafter, reduction of the residual DC offset commences in the receiver digital circuitry. The reduction of the residual DC offset uses a process of adjusting a notch filter circuitry within the receiver digital circuitry. For more details of that process, see U.S. patent application Ser. No. 10/075,099, titled "Notch Filter for Residual Offset Reduction in Radio-Frequency Apparatus and Associated Methods," referenced above. At $t=t_5$, the local oscillator circuitry has settled and the data reception burst starts. Also at $t=t_5$, the secondary filter circuitry (part of the digital filter circuitry 436 in FIGS. 4, 6, or 8) begins to settle. Finally, at $t=t_6$, output data becomes available to the DAC circuitry 445 in FIGS. 4 and 6 (or DAC circuitries 875A and 875B in FIG. 8) and, subsequently, to the baseband processor circuitry 120.

Referring to FIGS. 16–18, the various blocks shown in those figures depict mainly the conceptual functions and signal flow. The actual circuit implementation may or may not contain separately identifiable hardware for the various functional blocks. One may combine the functionality of various blocks into one circuit block, as desired. For example, in one embodiment of the invention, the PGA circuitries (see FIGS. 17 and 18) include the functionality of the DAC circuitries and the combiner circuitries, rather than using separate blocks of circuitry. Furthermore, one may realize the functionality of a single block in several circuit blocks, as desired. The choice of circuit implementation depends on various factors, such as particular design and specifications for a given implementation, as persons of ordinary skill in the art who have the benefit of the disclosure of the invention understand.

As noted above, exemplary embodiments of the invention use a combination of DC offset reduction in the receiver analog circuitry and DC offset reduction in the receiver digital circuitry. In other words, DC offset reduction circuitry 1610 in the receiver analog circuitry decreases the DC offset to a residual level. DC offset reduction circuitry in the receiver digital circuitry, as described in patent application Ser. No. 10/075,099, titled "Notch Filter for DC Offset Reduction in Radio-Frequency Apparatus and Associated Methods," referenced above, further reduces any residual DC offset. One, however, may use either the DC offset reduction in the receiver analog circuitry or DC offset reduction in the receiver digital circuitry, as desired.

Furthermore, the inventive concepts described here lend themselves to application in a variety of RF apparatus, as described above in connection with the interfacing and partitioning concepts. To name a few, one may apply the DC offset reduction concepts to RF receivers or RF transceivers, which may incorporate direct-conversion, low-IF, high-IF, or other topologies, as desired. The RF apparatus may use a variety of protocols, such as time division multiple access (TDMA), as desired. Furthermore, the RF transceivers may employ a variety of architectures and circuit arrangements, such as concerns the transmitter circuitry, the local oscillator circuitry, etc., as noted above. The appropriate modifications for applying the inventive concepts to various RF apparatus are within the knowledge of persons of ordinary skill in the art who have read the description of the invention.

Further modifications and alternative embodiments of the invention will be apparent to persons skilled in the art in view of this description of the invention. Accordingly, this description teaches those skilled in the art the manner of carrying out the invention and are to be construed as illustrative only.

The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

We claim:

1. A radio-frequency (RF) receiver circuitry, comprising:
   down-converter circuitry configured to accept a received radio-frequency signal, the down-converter circuitry further configured to process the received radio-frequency signal to provide an in-phase down-converted signal and a quadrature down-converted signal;
   analog-to-digital converter (ADC) circuitry configured to receive the in-phase and quadrature down-converted signals and to provide an in-phase digital output signal and a quadrature digital output signal;
   DC offset reduction circuitry coupled to the analog-to-digital converter circuitry,
   wherein the DC offset reduction circuitry tends to reduce a DC offset transmitted to the in-phase and quadrature digital output signals; and
   a combiner circuitry configured to provide to the analog-to-digital circuitry an in-phase difference signal and a quadrature difference signal,
   wherein the combiner circuitry subtracts an in-phase output signal of the DC offset reduction circuitry from the in-phase down-converted signal to produce the in-phase difference signal, and
   wherein the combiner circuitry subtracts a quadrature output signal of the DC offset reduction circuitry from the quadrature down-converted signal to produce the quadrature difference signal.

2. The radio-frequency receiver circuitry of claim 1, wherein the DC offset reduction circuitry further comprises a digital-to-analog circuitry configured to provide the in-phase and quadrature output signals of the DC offset reduction circuitry.

3. The radio-frequency receiver circuitry of claim 2, wherein the DC offset reduction circuitry further comprises a filter circuitry configured to process the in-phase and quadrature digital output signals to provide an in-phase filtered digital output signal and a quadrature filtered digital output signal, the filter circuitry further configured to provide the in-phase and quadrature filtered digital output signals to the digital-to-analog circuitry.

4. The radio-frequency receiver circuitry of claim 3, wherein a transfer function of the DC offset reduction circuitry has at least one pole the location of which is adjustable over an adjustment cycle of the DC offset reduction circuitry.

5. The radio-frequency receiver circuitry of claim 4, wherein the location of the at least one pole is adjusted in an initial part of the adjustment cycle of the DC offset reduction circuitry so that the DC offset reduction circuitry tends to settle quickly.

6. The radio-frequency receiver circuitry of claim 5, wherein the location of the at least one pole is further adjusted in a later part of the adjustment cycle of the DC offset reduction circuitry so that the DC offset reduction circuitry tends to remove the DC offset more accurately.

7. The radio-frequency receiver circuitry of claim 6, wherein the location of the at least one pole is adjusted by modifying a gain of the DC offset reduction circuitry.

8. The radio-frequency receiver circuitry of claim 7, wherein the location of the at least one pole is adjusted before a reception of a burst of data begins.

9. The radio-frequency receiver circuitry of claim 8, wherein the in-phase and quadrature output signals of the DC offset reduction circuitry become substantially constant before the reception of the burst of data begins.

10. The radio-frequency receiver circuitry of claim 9, wherein the filter circuitry comprises a digital filter circuitry.

11. The radio-frequency receiver circuitry of claim 10, wherein the digital filter circuitry comprises a low-pass filter circuitry.

12. The radio-frequency receiver circuitry of claim 11, wherein the low-pass filter circuitry comprises an integrator circuitry.

13. The radio-frequency receiver circuitry of claim 12, wherein the analog-to-digital converter circuitry comprises a sigma-delta analog-to-digital converter circuitry.

14. The radio-frequency receiver circuitry of claim 13 used in a radio-frequency transceiver circuitry.

15. The radio-frequency receiver circuitry of claim 13 used in a low intermediate-frequency (IF) radio-frequency receiver circuitry.

16. A radio-frequency (RF) receiver circuitry, comprising:
receiver analog circuitry included within a first integrated circuit, the receiver analog circuitry, comprising:
down-converter circuitry configured to receive and down-convert a radio-frequency input signal to generate a down-converted signal;
an analog-to-digital converter circuitry to convert the down-converted signal to a digital output signal; and
DC offset reduction circuitry coupled to the analog-to-digital converter circuitry, wherein the DC offset reduction circuitry tends to reduce a DC offset of the receiver analog circuitry;
receiver digital circuitry included within a second integrated circuit, the receiver digital circuitry configured to receive and process the digital output signal to generate a processed digital signal; and
a combiner circuitry configured to provide a difference signal to the analog-to-digital circuitry, wherein the combiner circuitry subtracts an output signal of the DC offset reduction circuitry from the down-converted signal to produce the difference signal.

17. The radio-frequency receiver circuitry of claim 16, wherein the DC offset reduction circuitry further comprises a feedback loop that includes a cascade coupling of a filter circuitry and a digital-to-analog circuitry, wherein the filter circuitry receives the digital output signal, and wherein the digital-to-analog circuitry provides the output signal of the DC offset reduction circuitry.

18. The radio-frequency receiver circuitry of claim 17, wherein a transfer function of the DC offset reduction circuitry has at least one pole the location of which is adjustable so as to modify the settling time of the DC offset reduction circuitry.

19. The radio-frequency receiver circuitry of claim 18, wherein the location of the at least one pole is adjusted at an initial point in time so that the DC offset reduction circuitry tends to settle quickly.

20. The radio-frequency receiver circuitry of claim 19, wherein the location of the at least one pole is adjusted at least once more after the initial point in time so that the DC offset reduction circuitry tends to reduce the DC offset more accurately.

21. The radio-frequency receiver circuitry of claim 20, wherein the location of the at least one pole is adjustable by modifying a gain of the DC offset reduction circuitry.

22. The radio-frequency receiver circuitry of claim 21, wherein adjustment of the location of the at least one pole completes before a reception of a burst of data by the receiver analog circuitry begins.

23. The radio-frequency receiver circuitry of claim 22, used within a radio-frequency transceiver circuitry.

24. The radio-frequency receiver circuitry of claim 22, further comprising programmable gain amplifier circuitry coupled to the combiner circuitry and to the analog-to-digital circuitry, the programmable gain amplifier circuitry configured to apply a programmable gain to the difference signal to produce an amplified difference signal, the programmable gain amplifier circuitry further configured to provide the amplified difference signal to the analog-to-digital converter circuitry.

25. The radio-frequency receiver circuitry of claim 24, used within a radio-frequency transceiver circuitry.

26. A method of receiving a radio-frequency (RF) signal, comprising:
down-converting the radio-frequency signal within a receiver analog circuitry to generate a down-converted signal;
converting the down-converted signal to a digital output signal by using an analog-to-digital converter circuitry that resides within the receiver analog circuitry; and
feeding back to an input of the analog-to-digital converter circuitry a feedback signal that relates to the digital output signal, by subtracting the feedback signal from the down-converted signal to generate a difference signal and supplying the difference signal to the input of the analog-to-digital converter circuitry,
wherein feeding back the feedback signal to an input of the analog-to-digital converter tends to reduce a DC offset of the receiver analog circuitry.

27. The method of claim 26, wherein feeding back the feedback signal to the input of the analog-to-digital converter circuitry further comprises:
filtering the digital output signal to generate a filtered digital signal; and
converting the filtered digital signal to the feedback signal by using a digital-to-analog converter circuitry.

28. The method of claim 27, wherein feeding back the feedback signal to the input of the analog-to-digital converter circuitry comprises adjusting a location of at least one pole within the receiver analog circuitry.

29. The method of claim 28, wherein feeding back the feedback signal to the input of the analog-to-digital converter circuitry further comprises adjusting at an initial point in time the location of the at least one pole so that the DC offset tends to be reduced quickly.

30. The method of claim 29, wherein feeding back the feedback signal to the input of the analog-to-digital converter circuitry further comprises adjusting the location of the at least one pole at least once more after the initial point in time so that the DC offset tends to be reduced accurately.

31. The method of claim 30, wherein feeding back the feedback signal to the input of the analog-to-digital converter circuitry further comprises adjusting the location of the at least one pole by modifying a gain within the receiver analog circuitry.

32. The method of claim 31, wherein feeding back the feedback signal to the input of the analog-to-digital converter circuitry further comprises completing the adjustment of the location of the at least one pole before a reception of a burst of data by the receiver analog circuitry begins.

33. The method of claim 32, wherein feeding back the feedback signal to the input of the analog-to-digital converter circuitry further comprises holding substantially constant the feedback signal before a reception of a burst of data begins.

34. The method of claim 33, wherein feeding back the feedback signal to the input of the analog-to-digital converter circuitry further comprises:
   applying a programmable gain to the difference signal to produce an amplified difference signal; and
   supplying the amplified difference signal to the input of the analog-to-digital converter circuitry.

35. The method of claim 34, wherein converting the down-converted signal to a digital output signal comprises using a sigma-delta analog-to-digital converter circuitry that resides within the receiver analog circuitry.

36. The method of claim 35, further comprising supplying the digital output signal to a receiver digital circuitry.

37. The method of claim 36, further comprising processing the digital output signal in the receiver digital circuitry to generate a baseband signal.

38. The method of claim 37, further comprising providing the baseband signal to a baseband processor circuitry.

39. The method of claim 38, wherein receiving the radio-frequency signal further comprises receiving the radio-frequency signal within a low intermediate-frequency radio-frequency receiver circuitry.

40. The method of claim 39, wherein receiving the radio-frequency signal further comprises receiving the radio-frequency signal within a radio-frequency transceiver circuitry.

* * * * *